US012748185B2

(12) United States Patent
Maor et al.

(10) Patent No.: US 12,748,185 B2
(45) Date of Patent: Sep. 29, 2026

(54) RADAR APPARATUS, SYSTEM, AND METHOD

(71) Applicant: INTEL CORPORATION, Santa Clara, CA (US)

(72) Inventors: Lior Maor, Petah Tikva (IL); Moshe Teplitsky, Tel-Aviv (IL); Alon Cohen, Modi'in-Maccabim-Reut (IL)

(73) Assignee: INTEL CORPORATION, Santa Clara, CA (US)

( * ) Notice: Subject to any disclaimer, the term of this patent is extended or adjusted under 35 U.S.C. 154(b) by 231 days.

(21) Appl. No.: 18/781,829

(22) Filed: Jul. 23, 2024

(65) Prior Publication Data

US 2024/0385291 A1 Nov. 21, 2024

Related U.S. Application Data

(63) Continuation of application No. 17/392,767, filed on Aug. 3, 2021, now Pat. No. 12,078,751, which is a continuation of application No. PCT/US2020/066996, filed on Dec. 24, 2020.

(51) Int. Cl.

| | |
|---|---|
| ***G01S 7/41*** | (2006.01) |
| ***G01S 7/35*** | (2006.01) |
| ***G01S 13/58*** | (2006.01) |
| ***G01S 13/931*** | (2020.01) |
| ***G01S 13/95*** | (2006.01) |

(52) U.S. Cl.

CPC ............... *G01S 7/411* (2013.01); *G01S 7/354* (2013.01); *G01S 13/584* (2013.01); *G01S 13/931* (2013.01); *G01S 13/95* (2013.01)

(58) Field of Classification Search

CPC ........ G01S 7/411; G01S 7/354; G01S 13/584; G01S 13/931; G01S 13/95; G01S 13/881; G01S 13/42; G01S 13/951

See application file for complete search history.

(56) References Cited

U.S. PATENT DOCUMENTS

| | | | |
|---|---|---|---|
| 9,989,633 | B1 | 6/2018 | Pandey et al. |
| 10,866,304 | B1 | 12/2020 | Hassibi et al. |
| 10,873,830 | B2 | 12/2020 | Markhovsky et al. |

(Continued)

FOREIGN PATENT DOCUMENTS

| | | | | |
|---|---|---|---|---|
| CN | 110389319 A | * 10/2019 | ............. | G01S 7/023 |
| CN | 106788655 B | * 10/2020 | ........... | H04B 7/0857 |

OTHER PUBLICATIONS

CN_110389319_A_I_translate.pdf (Year: 2019).*

(Continued)

*Primary Examiner* — Yonghong Li
(74) *Attorney, Agent, or Firm* — Shichrur & Co.

(57) ABSTRACT

Some demonstrative aspects include radar apparatuses, devices, systems and methods. In one example, an apparatus may include a plurality of Transmit (Tx) antennas to transmit radar Tx signals, a plurality of Receive (Rx) antennas to receive radar Rx signals based on the Tx signals, and a processor to generate radar information based on the radar Rx signals. The apparatus may be implemented, for example, as part of a radar device, for example, as part of a vehicle including the radar device. In other aspects, the apparatus may include any other additional or alternative elements and/or may be implemented as part of any other device.

20 Claims, 37 Drawing Sheets

(56) References Cited

U.S. PATENT DOCUMENTS

| | | | | |
|---|---|---|---|---|
| 11,003,922 | B2 | 5/2021 | Kasuga | |
| 11,762,060 | B2 * | 9/2023 | Zhang | G01S 13/931 342/107 |
| 12,078,751 | B2 | 9/2024 | Yoffe et al. | |
| 2011/0025545 | A1 | 2/2011 | Cook et al. | |
| 2011/0148578 | A1 | 6/2011 | Aloi et al. | |
| 2015/0369912 | A1 | 12/2015 | Kishigami et al. | |
| 2016/0097853 | A1 | 4/2016 | Kamo et al. | |
| 2017/0356991 | A1 | 12/2017 | Yosoku et al. | |
| 2019/0056506 | A1 | 2/2019 | Bialer | |
| 2019/0094353 | A1 | 3/2019 | Davis et al. | |
| 2020/0326423 | A1 | 10/2020 | Maor et al. | |
| 2020/0341134 | A1 | 10/2020 | Roger et al. | |
| 2021/0364616 | A1 | 11/2021 | Wang et al. | |

OTHER PUBLICATIONS

CN_106788655_A_I_translate.pdf (Year: 2017).*

Eckhardt, Johannes M., Niko Joram, Adrian Figueroa, Bastian Lindner, and Frank Ellinger. "FMCW multiple-input multiple-output radar with iterative adaptive beamforming." IET Radar, Sonar & Navigation 12, No. 11 (2018): 1187-1195. (Year: 2018).*

T. Yardibi, J. Li, P. Stoica, M. Xue and A. B. Baggeroer, "Source Localization and Sensing: A Nonparametric Iterative Adaptive Approach Based on Weighted Least Squares," in IEEE Transactions on Aerospace and Electronic Systems, vol. 46, No. 1, pp. 425-443, Jan. 2010, doi: 10.1109/TAES.2010.5417172. (Year: 2010).*

Office Action for Taiwan Patent Application No. 110134047, mailed on Aug. 20, 2025, 18 pages.

Office Action for Taiwan Patent Application No. 110134047, mailed on Aug. 20, 2025, 32 pages (including 14 pages of English translation).

Search Report and Written Opinion for PCT/US2020/066996, mailed on Sep. 17, 2021, 9 pages.

Search Report for Dutch Patent Application No. 2029890, mailed on May 15, 2023, 16 pages.

Sit Yoke Leen et al: "Automotive MIMO OFDM radar: Subcarrier allocation techniques for multiple-user access and DOA estimation", 2014 11th European Radar Conference, European Microwave Association—EUMA, Oct. 8, 2014 (Oct. 8, 2014), pp. 153-156, XP032709654.

International Preliminary Report on Patentability for International Application No. PCT/US2020/066996, mailed on Jul. 6, 2023, 6 pages.

Office Action for U.S. Appl. No. 17/392,767, mailed on Dec. 11, 2023, 49 pages.

Radar-Wikipedia.pdf (from https://web.archive.org/web/20190803143357/https://en.wikipedia.org/wiki/Radar (Year: 2019), 27 pages.

Sparse_Bayesian_Learning.pdf (Liu, Song, Lan Tang, Yechao Bai, and Xinggan Zhang. 2020. "A Sparse Bayesian Learning-Based DOA Estimation Method With the Kalman Filter in MIMO Radar" Electronics 9, No. 2: 347. https://doi.org/10.3390/electronics9020347 from https://www.mdpi.com/2079-9292/9/2/347) (Year: 2020), 17 pages.

Electronic control unit—Wikipedia.pdf from https://web.archive.org/web/20200115232109/https://en.wikipedia.org/wiki/Electronic_control_unit (Year: 2020), 4 pages.

Notice of Allowance for U.S. Appl. No. 17/392,767, mailed on Apr. 24, 2024, 11 pages.

F. Engels, M. Wintermantel and P. Heidenreich, "Automotive MIMO radar angle estimation in the presence of multipath," Proceedings of the 14th European Radar Conference, 2017 European Radar Conference (EURAD), Nuremberg, 2017, pp. 82-85.

* cited by examiner

RADAR APPARATUS, SYSTEM, AND METHOD

TECHNICAL FIELD

Aspects described herein generally relate to radar devices.

BACKGROUND

Various types of devices and systems, for example, autonomous and/or robotic devices, e.g., autonomous vehicles and robots, may be configured to perceive and navigate through their environment using sensor data of one or more sensor types.

Conventionally, autonomous perception relies heavily on light-based sensors, such as image sensors, e.g., cameras, and/or Light Detection and Ranging (LIDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
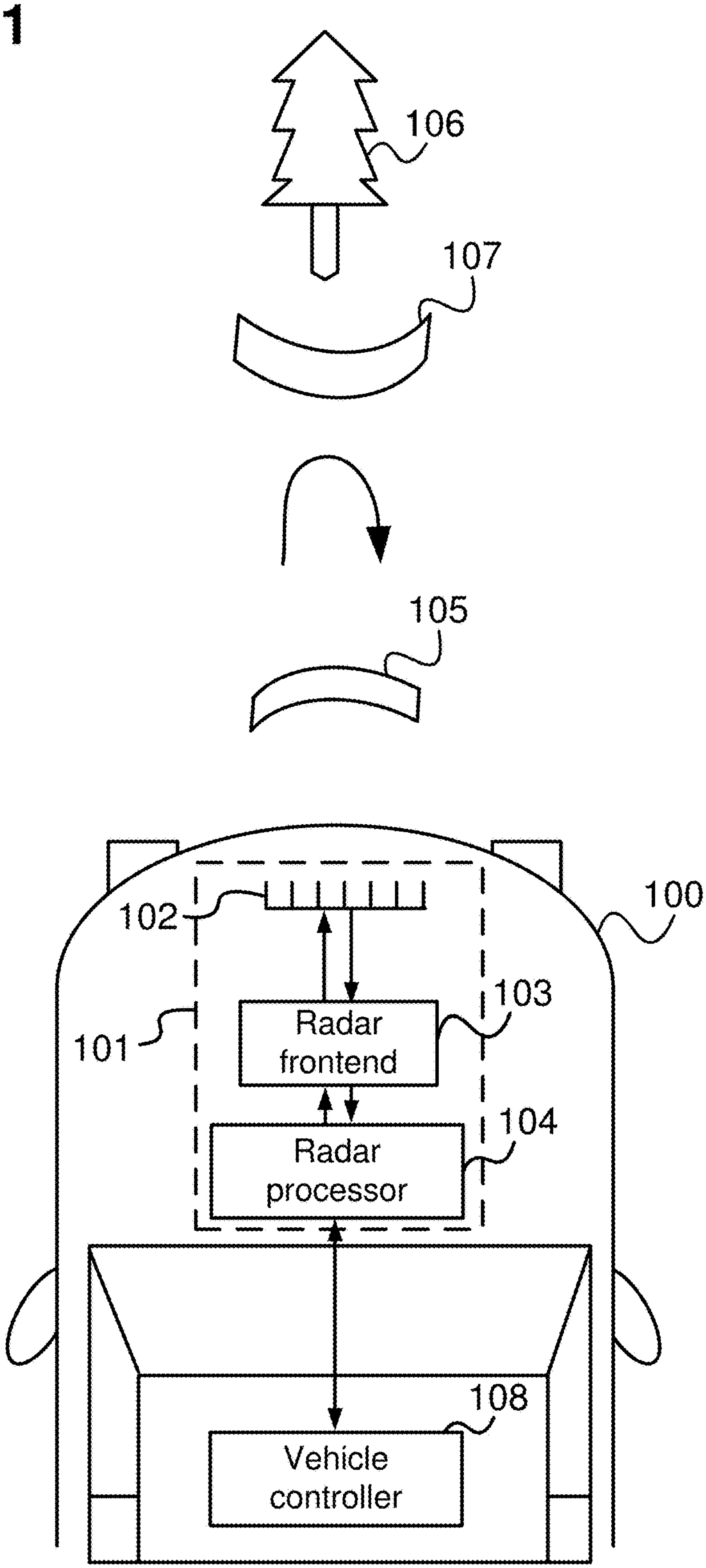
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, embodiment, or design described herein as "exemplary" or "demonstrative" is not necessarily to be construed as preferred or advantageous over other aspects, embodiments, or designs.

References to "one embodiment", "an embodiment", "demonstrative embodiment", "various embodiments" "one aspect", "an aspect", "demonstrative aspect", "various aspects" etc., indicate that the embodiment(s) and/or aspects so described may include a particular feature, structure, or characteristic, but not every embodiment or aspect necessarily includes the particular feature, structure, or characteristic. Further, repeated use of the phrase "in one embodiment" or "in one aspect" does not necessarily refer to the same embodiment or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in *SAE J3016 2018: Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation).

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term “antenna”, as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, a driver assistance and/or support system, and/or the like.

For example, radar device 101 may be installed in vehicle 101 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below. In one example, radar device 101 may be mounted onto, placed, e.g., directly, onto, or attached to, vehicle 100.

In some demonstrative aspects, vehicle 100 may include a single radar device 101. In other aspects, vehicle 100 may include a plurality of radar devices 101, for example, at a plurality of locations, e.g., around vehicle 100.

In some demonstrative aspects, radar device 101 may be implemented as a component in a suite of sensors used for driver assistance and/or autonomous vehicles, for example, due to the ability of radar to operate in nearly all-weather conditions. In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize “spatial filtering” processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
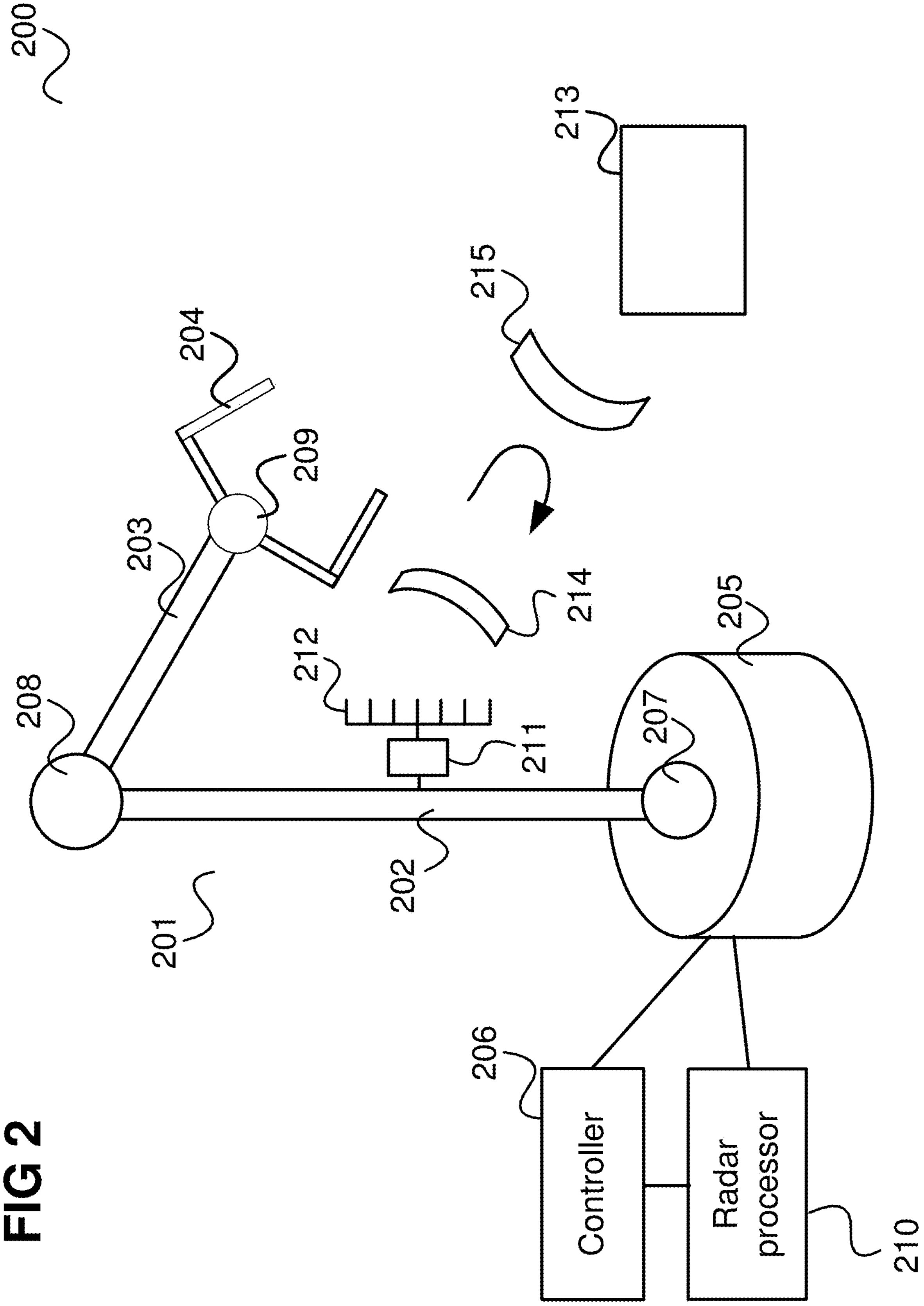
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
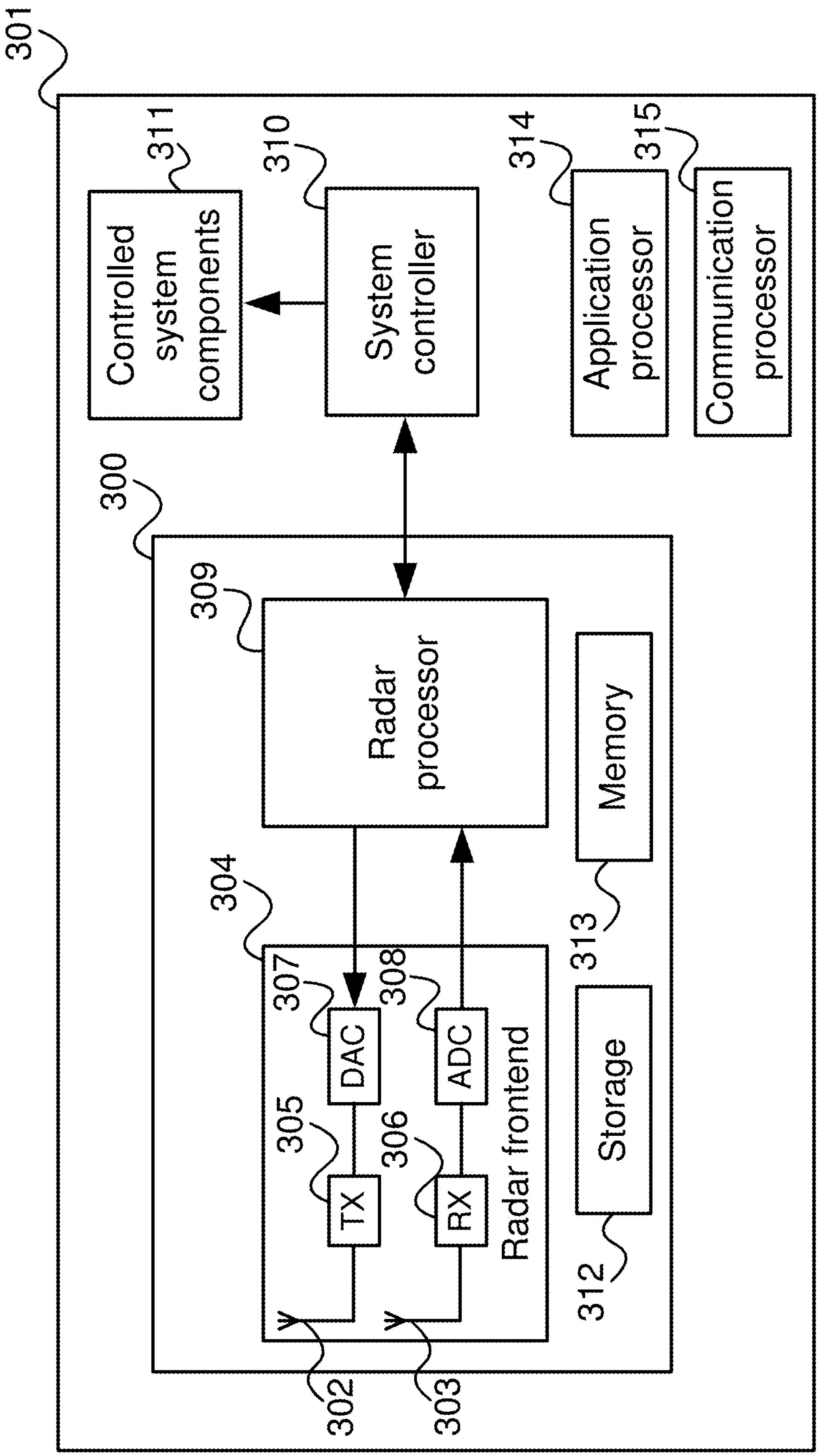
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital (ADC) Converter 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
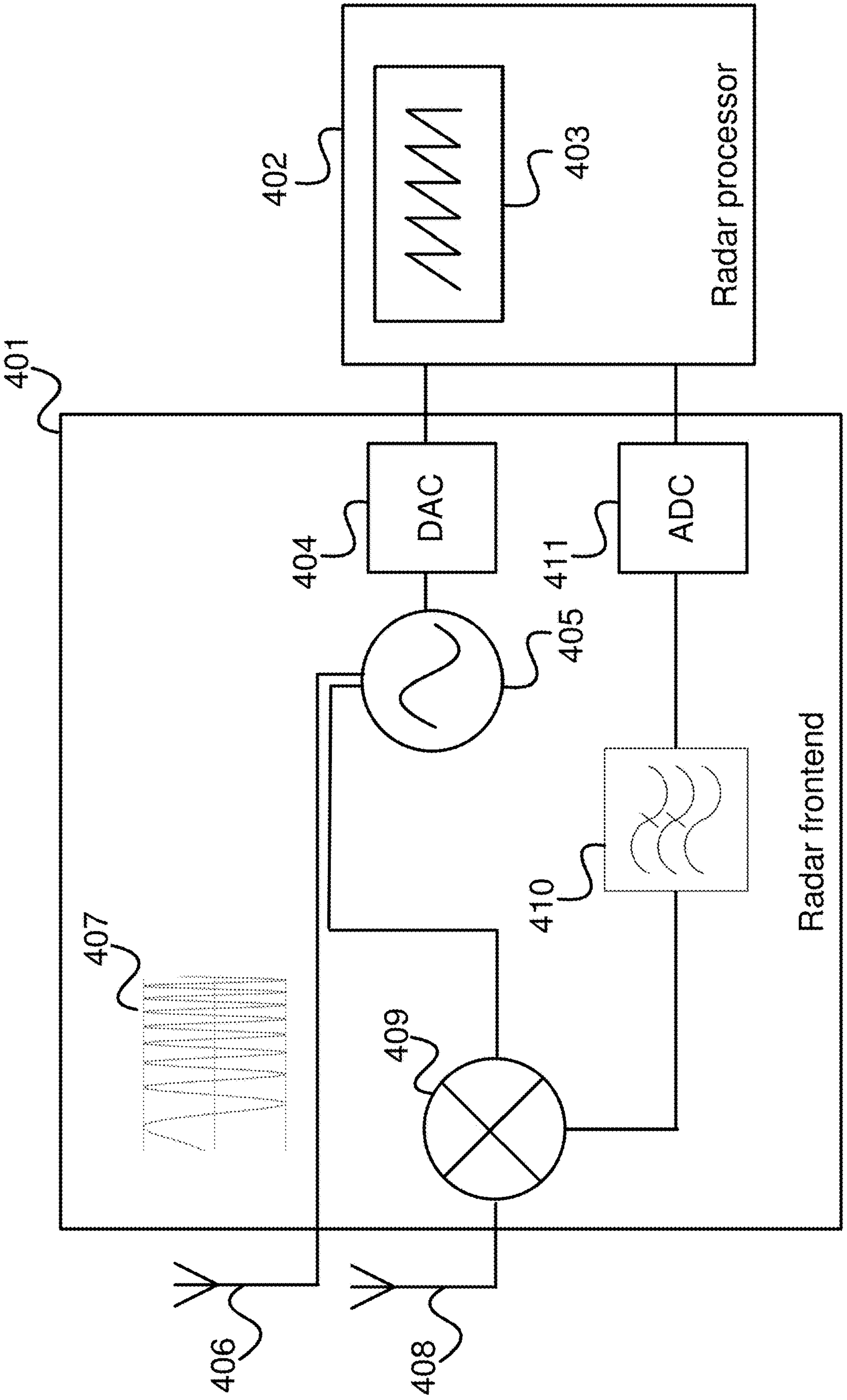
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
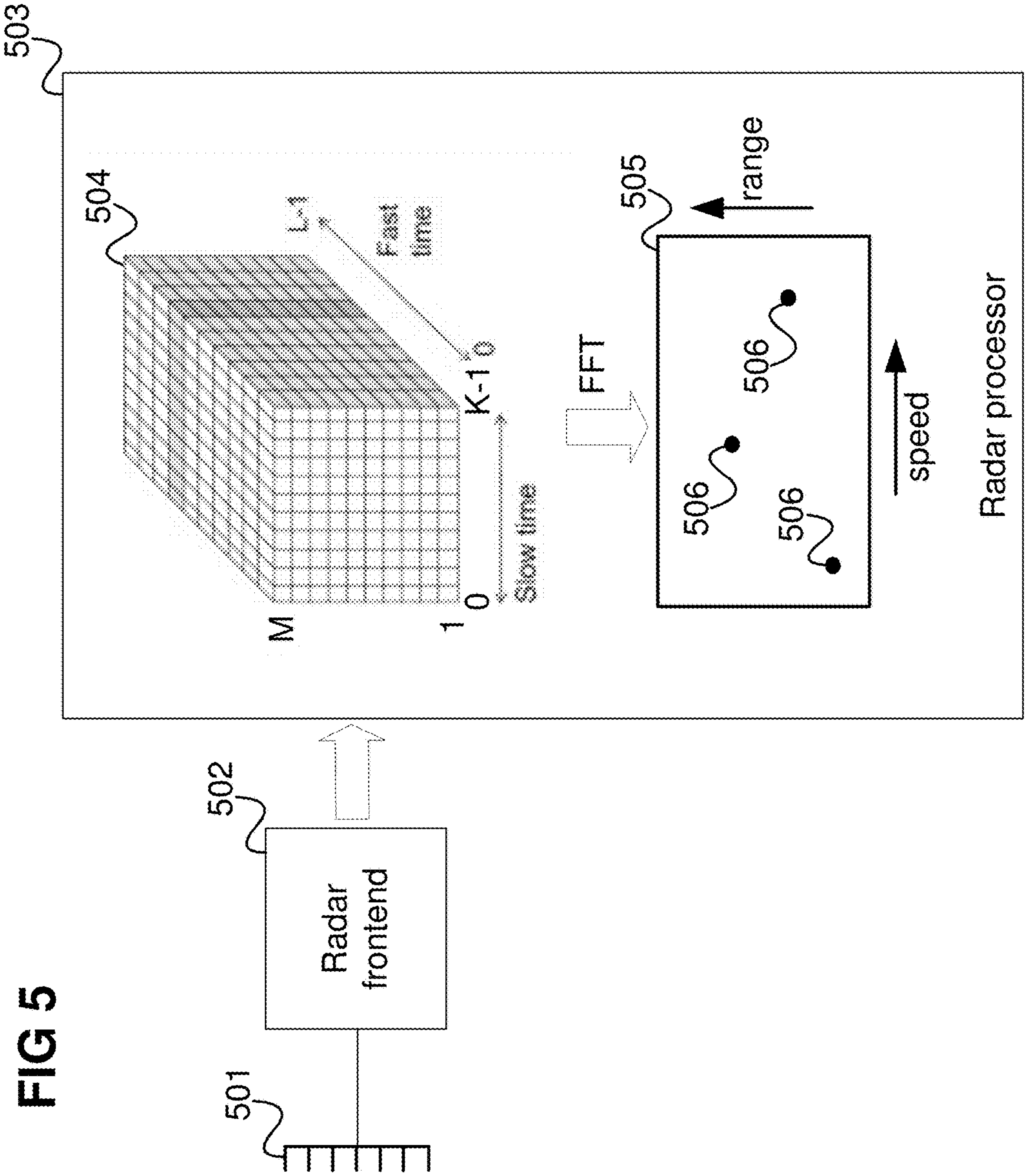
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 105 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
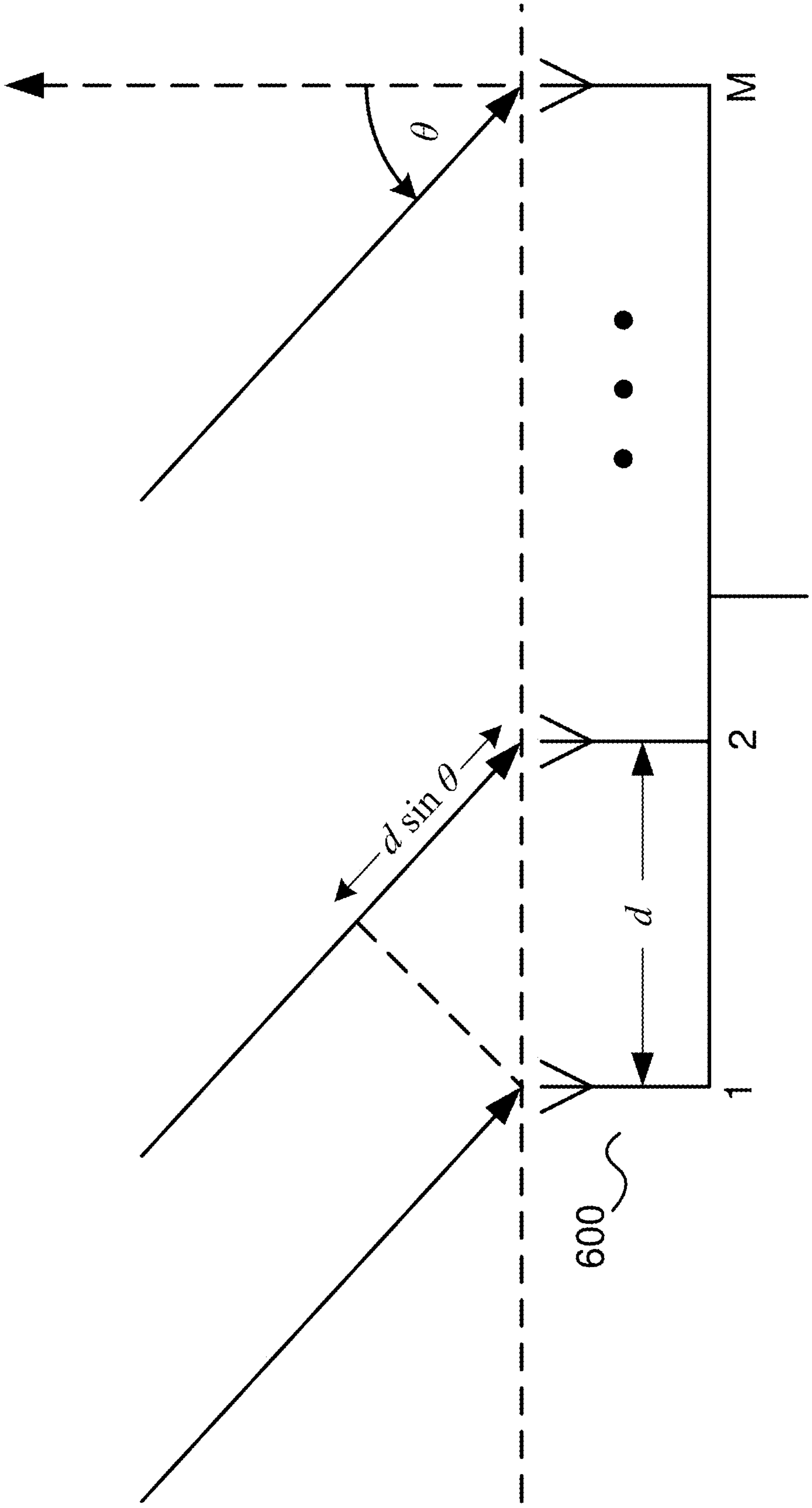
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 601 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
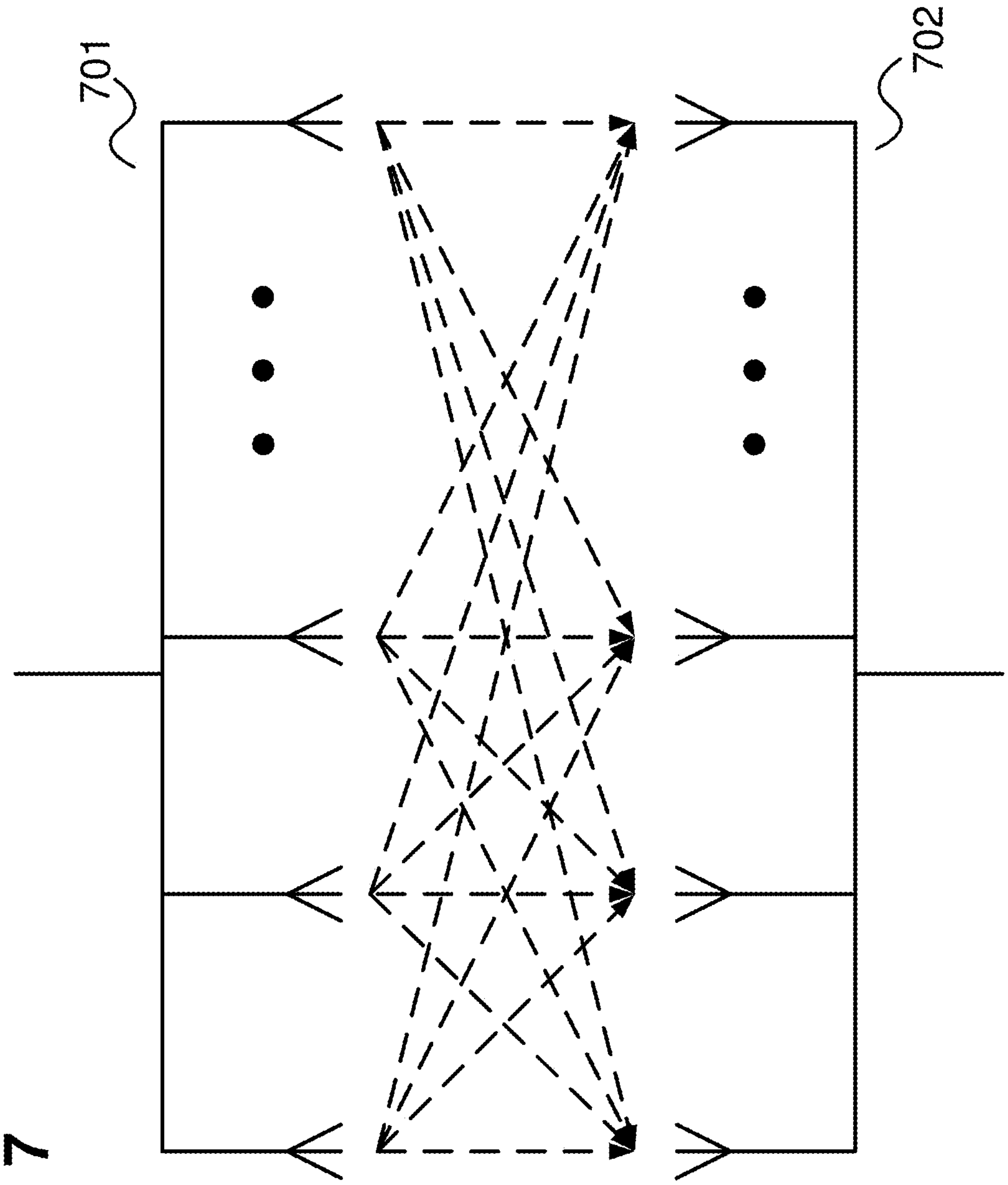
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702.

For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
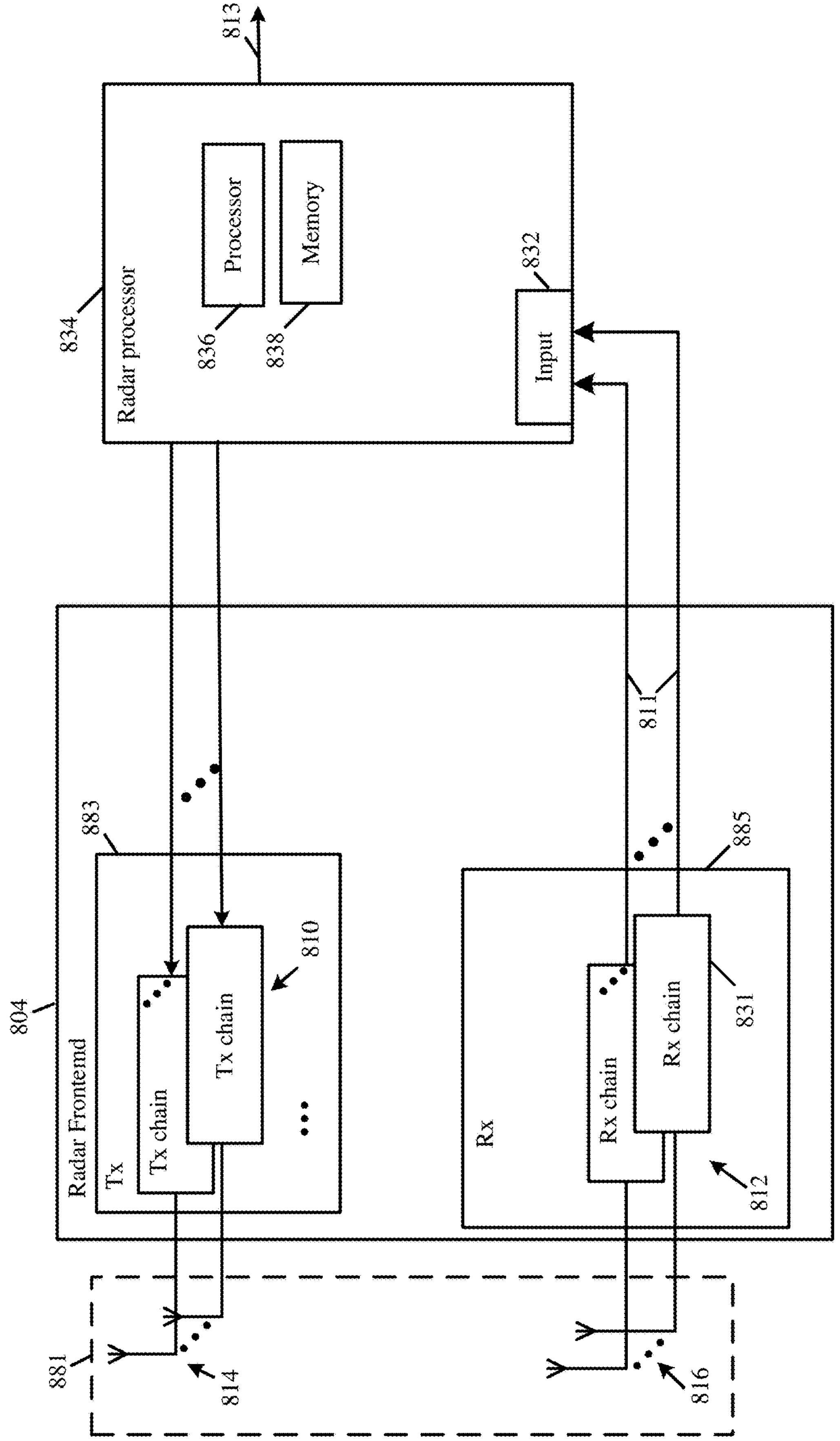
FIG. 8 is a schematic block diagram illustration of a radar frontend and a radar processor, in accordance with some demonstrative aspects.

FIG. 8 is a schematic block diagram illustration of a radar frontend 804 and a radar processor 834, in accordance with some demonstrative aspects. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 1), radar processor 309 (FIG. 3), radar processor 402 (FIG. 4), and/or radar processor 503 (FIG. 5), may include one or more elements of radar processor 834, and/or may perform one or more operations and/or functionalities of radar processor 834. generate radar information 813, for example, based on Radar Rx data 811 received from the plurality of Rx chains 812. For example, radar Rx data 811 may be based on the Rx RF signals received via the Rx antennas 816.

In some demonstrative aspects, radar processor 834 may include an input 832 to receive the radar Rx data 811 from the plurality of Rx chains 812.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which maybe generated by processor 836, for example, based on the radar Rx data, e.g., as described below. In one example, the range information and/or Doppler information may be determined based on a Cross-Correlation (XCORR) operation, which may be applied to the radar RX data, e.g., as described below. Any other additional or alternative operation, algorithm and/or procedure may be utilized to generate the range information and/or Doppler information.

In some demonstrative aspects, memory 838 may be configured to store AoA information, which maybe generated by processor 836, for example, based on the radar Rx data, the range information and/or Doppler information, e.g., as described below. In one example, the AoA information may be determined based on an AoA estimation algorithm, e.g., as described below. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information, e.g., as described below.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via a Tx array including a plurality of N elements, e.g., Tx antennas 814, and processing received signals via an Rx array including a plurality of M elements, e.g., Rx antennas 816.

In some demonstrative aspects, utilizing the MIMO technique of transmission of the orthogonal signals from the Tx array with N elements and processing the received signals in the Rx array with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, radar processor 834 may be configured to estimate a target position in a 4D space, which may be represented, e.g., by polar coordinates, by a range, an azimuth (Az), an elevation (El), and a Velocity (V), e.g., as described below.

In some demonstrative aspects, radar processor 834 may be configured to estimate the azimuth and/or the elevation of the target, for example, using a planar 2 Dimensional (2D) antenna. For example, MIMO radar antenna 881 may include a 2D planar antenna array of Rx antennas 816.

In some demonstrative aspects, radar processor 834 may be configured to estimate a 2D Angle of Arrival (AoA) spectrum over an Azimuth-Elevation domain, e.g., including an azimuth AoA spectrum and an elevation AoA spectrum, for example, based on radar Rx signals received from Rx antennas 816, e.g., from some or all Rx antennas 816.

In some demonstrative aspects, radar processor 834 may be configured to combine, e.g., by spatial filtering, the received Rx signals from Rx antennas 816, e.g., from some or all of Rx antennas 816, for example, to estimate the 2D AoA spectrum over the Azimuth-Elevation domain.

In one example, the 2D AoA spectrum over the Azimuth-Elevation domain may represent a power distribution for different azimuths and elevations. For example, peaks in the 2D AoA spectrum may represent potential targets.

In some demonstrative aspects, radar processor 834 may be configured to process radar data in a vehicle, e.g., an autonomous vehicle, for example, vehicle 100 (FIG. 1). The processor 834 may be configured to process the radar data with respect to various environments and/or conditions in which the vehicle may operate, e.g., as described below. For example, vehicle 100 (FIG. 1) may operate in different environments, for example, different driving scenarios, e.g., a highway driving scenario, an urban driving scenario, or the like; different weather conditions, e.g., rain, fog, or the like, and/or any other conditions and/or environments.

In some demonstrative aspects, radar processor 834 may be configured to process radar Rx data 811, for example, based on an environment, scenario and/or condition in which vehicle 100 (FIG. 1) may operate, e.g., as described below.

In some demonstrative aspects, radar processor 834 may be configured to support a plurality of AoA spectrum estimation algorithms for generating AoA spectrum information, e.g., as described below.

In some demonstrative aspects, the AoA spectrum information may include AoA spectrum information of a Field of View (FOV), for example, a partial or entire FOV, e.g., of radar frontend 804.

In some demonstrative aspects, an AoA spectrum estimation algorithm may be characterized by a set of properties, parameters and/or metrics, e.g., as described below.

In one example, the AoA spectrum estimation algorithm may be characterized by a computational complexity, e.g., for generating an estimated output AoA spectrum.

In another example, the AoA spectrum estimation algorithm may be characterized by a sparsity level of the estimated output AoA spectrum, e.g., a sparse/dense spectrum.

In another example, the AoA spectrum estimation algorithm may be characterized by a resolution performance, e.g., corresponding to a resolution of the estimated output AoA spectrum.

In another example, the AoA spectrum estimation algorithm may be characterized by a Side-Lobe Level (SLL), e.g., of the estimated output AoA spectrum.

In other aspects, any other additional or alternative parameter or criterion may be used to characterize the AoA spectrum estimation algorithm.

In some demonstrative aspects, there may be one or more disadvantages, inefficiencies, and/or technical problems, for example, in generating the estimated output AoA spectrum by applying to radar data a predetermined AoA spectrum estimation algorithm, for example, regardless of a current environment and/or current conditions in which the radar data is obtained, e.g., as described below.

In one example, a predetermined AoA spectrum estimation algorithm, which may be suitable for a particular scenario, may not be suitable and/or efficient for one or more other scenarios. For example, for some scenarios it may be suitable to use a first AoA spectrum estimation algorithm, which may be configured to provide a native angular resolution of an antenna array. However, there may be other scenarios, which may require a level of angular resolution, which may be beyond the native angular resolution provided by the first AoA spectrum estimation algorithm. According to this example, it may be advantageous to utilize for these other scenarios a second AoA spectrum estimation algorithm, e.g., instead of the first AoA spectrum estimation algorithm. For example, second AoA spectrum estimation algorithm may provide an improved spatial resolution. However, in some cases, applying the second AoA spectrum estimation algorithm may be at an expense of an increased computational complexity, e.g., compared to the computational complexity of the first AoA spectrum estimation algorithm.

In some demonstrative aspects, radar processor 834 may be configured to implement a selection mechanism, for example, to select from the plurality of AoA spectrum estimation algorithms a suitable AoA spectrum estimation algorithm to be applied to radar Rx data 811 for generating the radar information 813, e.g., as described below. dynamically choose a suitable AoA spectrum estimation algorithm to process radar data of a range-Doppler (RD) bin, for example, based on one or more criteria, measurements and/or inputs, e.g., as described below.

In some demonstrative aspects, radar processor 834 may be configured to dynamically choose the suitable AoA spectrum estimation algorithm to process radar data of the RD bin, for example, based on a range value and/or a Doppler value corresponding tot eh RD bin, e.g., as described below.

In some demonstrative aspects, radar processor 834 may be configured to select a most suitable, e.g., best, AoA spectrum estimation algorithm, for example, for a current environment, e.g., a current driving scenario and/or current weather conditions, e.g., as described below.

In some demonstrative aspects, radar processor 834 may be configured to select the AoA spectrum estimation algorithm, for example, while taking into consideration additional information, for example, one or more system constrains, and/or one or more requirements with respect to the AoA spectrum, e.g., as described below.

In some demonstrative aspects, radar processor 834 may be configured to select the AoA spectrum estimation algorithm, for example, based on a computational load of the AoA spectrum estimation algorithm, and/or an availability of one or more dedicated hardware components for the AoA spectrum estimation algorithm, e.g., as described below.

In some demonstrative aspects, radar processor 834 may be configured to select the AoA spectrum estimation algorithm, for example, based on one or more requirements with respect to the AoA spectrum, for example, whether a soft output, e.g., an AoA spectrum, or a hard output, e.g., including a plurality of target detections, is required, e.g., as described below.

In some demonstrative aspects, radar processor 834 may be configured to maintain, e.g., in memory 838, an algorithm database (DB) including a plurality of AoA estimation algorithms and algorithm property information relating to properties of the AoA estimation algorithms, e.g., as described below.

In some demonstrative aspects, the algorithm DB may include, for an AoA estimation algorithm, e.g., for each AoA estimation algorithm, one or more parameters and/or attributes corresponding to the AoA estimation algorithm. For example, the algorithm DB may include information with respect to expected performance of the AoA estimation algorithm, a required computation power to execute the AoA estimation algorithm, and/or any other information with respect to the AoA estimation algorithm, e.g., as described below.

In some demonstrative aspects, radar processor 834 may be configured to receive, obtain and/or process input information on the current environment, system status, and/or any other input, e.g., as described below.

In some demonstrative aspects, radar processor 834 may be configured to determine a selected, e.g., suitable, AoA estimation algorithm to be used for processing radar RX data 813, for example, based on the input information, and/or the algorithm property information in the algorithm DB, e.g., as described below.

In some demonstrative aspects, radar processor 834 may be configured to determine radar data corresponding to a plurality of range-Doppler bins, for example, based on the radar Rx data 811, e.g., as described below.

In some demonstrative aspects, the plurality of range bins may be configured based on a setting and/or implementation of a radar device implementing radar processor 834, e.g., radar device 101 (FIG. 1).

In some demonstrative aspects, radar processor 834 may be configured to determine the radar data, for example, by applying to the radar Rx data 811 a Cross Correlation (XCORR) operation and/or any other operation, function and/or algorithm.

In some demonstrative aspects, the radar data may include, for example, information of a radar frame, e.g., as described below. In other aspects, the aspects, the radar data may include any other type and/or format of radar data, e.g., intermediate data, and/or processed data, which may be based on the radar Rx data 811.

In some demonstrative aspects, the radar data may be in the form of a radar frame, which may correspond to a plurality of range values, a plurality of Doppler values, a plurality of Rx channels, and a plurality of Tx channels.

In some demonstrative aspects, the plurality of range values may include a plurality of range bins, which may be configured based on a setting and/or implementation of a radar device implementing radar processor 834, e.g., radar device 101 (FIG. 1).

In some demonstrative aspects, the plurality of Doppler values may include a plurality of Doppler bins (Chirps), which may be configured based on a setting and/or implementation of the radar device implementing radar processor 834, e.g., radar device 101 (FIG. 1).

In some demonstrative aspects, the plurality of Rx channels may correspond to the plurality of Rx antennas 816 and/or Rx chains 831.

In some demonstrative aspects, the plurality of Tx channels may correspond to the plurality of Tx antennas 814 and/or Tx chains 810.

In some demonstrative aspects, a range-Doppler-bin may correspond to a combination of a range value of the plurality of range values and a Doppler value of the plurality of Doppler values. For example, the range-Doppler bin may include radar data corresponding to the range value and the Doppler value.

In some demonstrative aspects, radar processor 834 may be configured to determine the radar information 813 to include radar target information, for example, by processing the radar data.

In some demonstrative aspects, the target information may include, for example, information with respect to objects in an environment of radar frontend 804. For example, the target information may include a class, a location, an orientation, a velocity, an intention, a perceptional understanding of the environment, and/or any other information corresponding to the object in the environment.

In some demonstrative aspects, radar processor 834 may be configured to select for a range-Doppler bin of the plurality of range-Doppler bins a selected AoA spectrum estimation algorithm from a plurality of AoA spectrum estimation algorithms, for example, based on a range value and a Doppler value corresponding to the range-Doppler bin, e.g., as described below.

In some demonstrative aspects, the plurality of AoA estimation algorithms may include, for example, a Delay and Sum (DAS) algorithm, a Super Resolution (SR) algorithm, a low-complexity SR algorithm, an SR algorithm with multipath mitigation, a Beam space (BS) SR algorithm, and/or a Sparse Bayesian Learning (SBL) algorithm, e.g., as described below.

In some demonstrative aspects, the SR algorithm may include any suitable AoA estimation algorithm, which may be configured to support a high resolution AoA estimation. In some aspects, the SR algorithm may include an iterative algorithm. In other aspects the SR algorithm may include a non-iterative SR algorithm. For example, the SR algorithm may include, or may be based on, a Minimum Variance Distortionless Response (MVDR) algorithm, a Multiple Signal Classification (MUSIC) algorithm, an Iterative Adaptive Approach (IAA) algorithm, a Monopulse algorithm, and/or any other additional or alternative SR algorithm.

Some demonstrative aspects are described below with respect to one or more types of SR algorithms, e.g., an IAA algorithm and/or an MVDR algorithm. Other aspects may be implemented based on any other additional or alternative AoA estimation algorithms.

In some demonstrative aspects, the selected AoA may include a selected combination of two or more of the plurality of AoA estimation algorithms.

In other aspects, the plurality of AoA estimation algorithms may include any other additional and/or alternative AoA estimation algorithm.

In some demonstrative aspects, radar processor 834 may be configured to process radar data of the range-Doppler bin according to the selected AoA spectrum estimation algorithm to generate AoA spectrum information of the range-Doppler bin, e.g., as described below.

In some demonstrative aspects, radar processor 834 may be configured to select a first AoA spectrum estimation algorithm from the plurality of AoA spectrum estimation algorithms for processing radar data of a first range-Doppler bin, and to select a second AoA spectrum estimation algorithm from the plurality of AoA spectrum estimation algorithms for processing radar data of a second range-Doppler bin, the second AoA spectrum estimation algorithm may be different from the first AoA spectrum estimation algorithm, e.g., as described below. select, for example, more than one AoA estimation algorithm to process radar data of a range-Doppler bin. For example, radar processor 834 may be configured to select, for example, for a first portion of the radar data a first AoA spectrum estimation algorithm, and for a second portion of the radar data a second AoA spectrum estimation algorithm different from the first AoA spectrum estimation algorithm.

In one example, radar processor 834 may be configured to select, for example, different AoA estimation algorithms for processing radar data of different regions of an azimuth-elevation space of the range Doppler bin.

In some demonstrative aspects, radar processor 834 may be configured to select the selected AoA spectrum estimation algorithm for the range-Doppler bin, for example, based on input information from the input 832, e.g., as described below.

In some demonstrative aspects, the input information may include, for example, environment information corresponding to an environment in which the radar signals are communicated, for example, an environment of vehicle 100 (FIG. 1), e.g., as described below.

In some demonstrative aspects, the input information may include, for example system resource information corresponding to system resources for radar processor 834, e.g., as described below.

In some demonstrative aspects, the input information may include, for example, performance information corresponding to one or more performance parameters of the plurality of AoA spectrum estimation algorithms, e.g., as described below.

In some demonstrative aspects, the input information may include, for example, radar operation-mode information corresponding to at least one operation-mode of radar processor 834, e.g., as described below.

In some demonstrative aspects, the input information may include, for example, preference information to indicate a preferred AoA spectrum estimation algorithm of the plurality of AoA spectrum estimation algorithms, e.g., as described below.

In other aspects, the input information may include any other additional or alternative information.

In some demonstrative aspects, input 832 may receive the environment information corresponding to the environment in which the radar signals are communicated, e.g., by radar frontend 804.

In some demonstrative aspects, radar processor 834 may be configured to select the selected AoA spectrum estimation algorithm for the range-Doppler bin, for example, based on the environment information, e.g., as described below.

In some demonstrative aspects, the environment information may include driving scenario information corresponding to a driving scenario in which the radar signals are communicated, for example, an environment of vehicle 100 (FIG. 1), e.g., as described below.

In one example, the driving scenario may include, for example, a highway scenario, and urban scenario, a dense urban scenario, and/or any other additional or alternative driving scenario.

In some demonstrative aspects, radar processor 834 may be configured to select the selected AoA spectrum estimation algorithm for the range-Doppler bin, for example, based on the driving scenario information, e.g., as described below.

In some demonstrative aspects, the environment information may include weather condition information corresponding to a weather condition of the environment, e.g., as described below.

In one example, the weather condition may include, for example, a rainy weather condition, a fog weather condition, a snow weather condition, a normal weather condition, e.g., without rain, fog and snow, and/or any other additional or alternative weather condition and/or parameter.

In some demonstrative aspects, radar processor 834 may be configured to select the selected AoA spectrum estimation algorithm for the range-Doppler bin, for example, based on the weather condition information, e.g., as described below.

In some demonstrative aspects, the environment information may include multipath information corresponding to presence of multipath effects in the environment, e.g., as described below.

In some demonstrative aspects, radar processor 834 may be configured to select the selected AoA spectrum estimation algorithm for the range-Doppler bin, for example, based on the multipath information, e.g., as described below.

In some demonstrative aspects, at least part of the environment information may be received at input 832, for example, form a plurality of sensors, which maybe implemented, for example, as part of frontend 804 and/or vehicle 101 (FIG. 1). For example, the environment information may be received at input 832, for example, from a camera, a rain sensor, a GPS system, e.g., including maps and/or an urban database, a sonar, e.g., to detect a very close range clutter, and/or any other additional or alternative sensor.

In some demonstrative aspects, at least part of the environment information may be determined by radar processor 834, for example, based on analysis and/or processing of data, for example, data from previous radar frames, data from analysis of Rx data 811, e.g., number of the targets, Doppler of objects, ego speed estimation, and/or the like.

In other aspects, the environment information may include any other additional or alternative environment information corresponding to the environment in which the radar signals are communicated by frontend 804.

In some demonstrative aspects, input 832 may receive the system resource information corresponding to the system resources of radar processor 834, e.g., as described below.

In some demonstrative aspects, radar processor 834 may be configured to select the selected AoA spectrum estimation algorithm for the range-Doppler bin, for example, based on the system resource information, e.g., as described below.

In some demonstrative aspects, the system resource information may include, for example, hardware availability information and/or temperature information, e.g., as described below.

In other aspects, the system resource information may include any other additional or alternative information.

In some demonstrative aspects, the hardware availability information may correspond to an availability of system resources for radar processor 834, e.g., as described below.

In one example, the hardware availability information may include an available computational power. For example, radar processor 834 may be configured to select the selected AoA spectrum estimation algorithm based on the available computational power, for example, when resources for an AoA spectrum estimation algorithm are shared with other algorithms.

In some demonstrative aspects, the temperature information may correspond to a temperature of one or more system resources, for example, resources of radar processor 834 e.g., as described below.

In one example, radar processor 834 may be configured to select a low complexity AoA spectrum estimation algorithm, for example, when the temperature of the one or more system resources is too high. For example, radar processor 834 may be configured to select the low complexity AoA spectrum estimation algorithm, for example, to reduce a power consumption of radar processor 834 and, as a result, to cool down the system resources.

In some demonstrative aspects, input 832 may receive the performance information corresponding to the one or more performance parameters of the plurality of AoA spectrum estimation algorithms, e.g., as described below.

In some demonstrative aspects, radar processor 834 may be configured to select the selected AoA spectrum estimation algorithm for the range-Doppler bin, for example, based on the performance information, e.g., as described below.

In some demonstrative aspects, the one or more performance parameters may include, for example, a sparsity parameter, a spectrum size parameter, and/or a false detection parameter, e.g., as described below.

In other aspects, the one or more performance parameters may include any other additional or alternative performance parameters.

In some demonstrative aspects, the sparsity parameter for an AoA spectrum estimation algorithm may correspond to a sparsity level of an AoA spectrum estimated by the AoA spectrum estimation algorithm, e.g., as described below.

In one example, the sparsity parameter for an AoA spectrum estimation algorithm may include, for example, a sparsity level of an AoA spectrum estimated by the AoA spectrum estimation algorithm. For example, the sparsity parameter may correspond to a sparse spectrum, e.g., to output only detections, or a dense spectrum, which may allow a further processing to detect targets.

In one example, the spectrum size parameter may represent a size of the AoA spectrum, e.g., as described below.

In one example, the spectrum size parameter may represent whether the AoA spectrum is to include a full size AoA spectrum, or a part of the AoA spectrum.

In some demonstrative aspects, the false detection parameter for an AoA spectrum estimation algorithm may represent a probability of false detections of the AoA spectrum estimation algorithm, e.g., as described below.

In one example, an AoA spectrum estimation algorithm having an increased probability of false detections may be advantageous, for example, when radar processor 834 operates at a short-range radar operation mode and/or at a close range mode, for example, to avoid missing of close objects.

In some demonstrative aspects, input 832 may receive the radar operation-mode information corresponding to the at least one operation mode of radar processor 834, e.g., as described below.

In some demonstrative aspects, radar processor 834 may be configured to select the selected AoA spectrum estimation algorithm for the range-Doppler bin, for example, based on the radar operation-mode information, e.g., as described below.

In some demonstrative aspects, the at least one operation mode may include, for example, a range operation mode, a Doppler operation mode, and/or a far/near field operation mode, e.g., as described below.

In other aspects, the at least one operation mode may include any other additional or alternative operation mode of the radar processor 834.

In some demonstrative aspects, the range operation mode may represent, for example, a range at which radar processor 834 may detect targets, e.g., as described below.

In some demonstrative aspects, the range operation mode may represent a Long Range Radar (LRR) operation mode, a short Range Radar (SRR) operation mode, a Medium Range Radar (MRR) operation mode, or any other range operation mode.

In one example, at the SRR operation mode, e.g., at close rages, the driving scenario may tend to be denser. Accordingly, for the SRR mode it may be advantageous to utilize an AoA spectrum estimation algorithm supporting an increased resolution.

In another example, different operation modes may have different elevation FOV, which may correspond to a complexity trade-off of AZ/EL AoA spectrum.

In some demonstrative aspects, the Doppler operation mode may represent a maximal speed of targets to be detected by radar processor 834, e.g., as described below.

In some demonstrative aspects, the far/near field operation mode may represent whether radar processor 834 is to operate in a far-field region or a near-field region, e.g., as described below.

In some demonstrative aspects, input 832 may receive the preference information to indicate at least one preferred AoA spectrum estimation algorithm of the plurality of AoA spectrum estimation algorithms, e.g., as described below.

In one example, the preference information may be received from one or more high-level applications, and/or from a user For example, the preference information may be received from a user of vehicle 101 (FIG. 1), from an autonomous driving system of vehicle 101 (FIG. 1), and/or any other application or user.

In other aspects, the preference information may include any other additional or alternative information.

In some demonstrative aspects, radar processor 834 may be configured to determine, for example, based on the input information from the input 832, an AoA estimation profile for estimation of the AoA spectrum information of the range-Doppler bin, e.g., as described below. select the selected AoA spectrum estimation algorithm, for example, based on the AoA estimation profile, e.g., as described below.

In some demonstrative aspects, the AoA estimation profile may include one or more settings of one or more algorithm-specific metrics corresponding to the plurality of AoA spectrum estimation algorithms, e.g., as described below.

In some demonstrative aspects, the one or more algorithm-specific metrics may include, for example, a performance metric, a computational metric, and/or one or more additional or alternative algorithm-specific metrics, e.g., as described below.

In some demonstrative aspects, the one or more algorithm-specific metrics may include a performance metric corresponding to a performance of an AoA spectrum estimation algorithm of the plurality of AoA spectrum estimation algorithms, e.g., as described below.

In some demonstrative aspects, the performance metric may include a resolution parameter corresponding to a resolution of the AoA spectrum estimated by the AoA spectrum estimation algorithm, e.g., as described below.

In one example, the resolution parameter may represent, for example, a capability of the AoA spectrum estimation algorithm to separate between two close targets.

In some demonstrative aspects, the performance metric may include a Side Lobe Level (SLL) parameter corresponding to an SLL of the AoA spectrum, e.g., as described below.

In some demonstrative aspects, the performance metric may include a false detection probability parameter corresponding to a false detection probability of targets by the AoA spectrum estimation algorithm, e.g., as described below.

In one example, the false detection probability may correspond to false-positive detection probability of the targets by the AoA spectrum estimation algorithm, and/or to false negative detection probability of the targets, e.g., to avoid missing close targets by the AoA spectrum estimation algorithm.

In other aspects, the performance metric may include any other additional or alternative performance metrics.

In some demonstrative aspects, the one or more algorithm-specific metrics may include a computational metric corresponding to a utilization of one or more computational resources by the AoA spectrum estimation algorithm, e.g., as described below.

In some demonstrative aspects, the computational metric may include a complexity parameter corresponding to a computational complexity of the AoA spectrum estimation algorithm, e.g., as described below.

In one example, the computational complexity may include a computational complexity of MAC processing.

In some demonstrative aspects, the computational metric may include a hardware parameter corresponding to a hardware requirement of the AoA spectrum estimation algorithm, e.g., as described below.

In one example, the hardware parameter may include, for example, one or more requirements of dedicated hardware for executing the AoA spectrum estimation algorithm. For example, the hardware parameter may represent a hardware requirement for matrix multiplication processing, FFT processing, and/or any other hardware requirement.

In some demonstrative aspects, the computational metric may include a latency parameter corresponding to a latency of the AoA spectrum estimation algorithm.

In other aspects, the computational metric may include any other additional or alternative computational metric.

In some demonstrative aspects, the one or more algorithm-specific metrics may include a sparsity metric corresponding to a sparsity level of the AoA spectrum estimated by the AoA spectrum estimation algorithm, e.g., as described below.

In one example, a non-sparse (dense) AoA spectrum estimation algorithm may have a reduced sparsity level. In one example, DAS-based and/or SR-based algorithms may provide dense AoA spectrums, which may be suitable for processing by a target detector and/or for Artificial Intelligence (AI) for post-processing. For example, dense AoA spectrum estimation algorithms may enable control over sensitivity of radar detection, for example, by configuration of the target detector. For example, the AoA spectrums estimated by DAS-based and/or SR-based algorithms may be preferable for post processing AI, as the dense spectrums may include detailed information, e.g., in addition to detected peaks.

In another example, a sparse AoA spectrum estimation algorithm may have an increased sparsity level. For example, AoA spectrums estimated by SBL-based algorithms may look like an output of a target detector, which may include only the detected peaks. Accordingly, these sparse AoA spectrums may not support further processing.

However, the sparse AoA spectrum estimation algorithm may enable a simplification of a radar system.

In some demonstrative aspects, the one or more algorithm-specific metrics may include one or more target detection metrics corresponding to one or more types of targets supported for detection by the AoA spectrum estimation algorithm.

In some demonstrative aspects, the one or more target detection metrics may include a multipath parameter corresponding to a multipath mitigation capability of the AoA spectrum estimation algorithm.

In some demonstrative aspects, the one or more target detection metrics may include a target speed parameter corresponding to a maximal target speed to be detected by the AoA spectrum estimation algorithm, e.g., as described below.

In some demonstrative aspects, the target speed parameter may correspond to a capability of the AoA spectrum estimation algorithm to determine a non-ambiguous speed for a target at the maximal speed.

In some demonstrative aspects, the one or more target detection metrics may include a near/far field parameter corresponding to whether the AoA spectrum estimation algorithm supports detection of targets in the far-field region or in the near-field region.

In other aspects, the one or more target detection metrics may include any other additional or alternative target detection metrics corresponding to one or more types of targets supported for detection by the AoA spectrum estimation algorithm.

In some demonstrative aspects, memory 838 may store algorithm-specific information corresponding to the plurality of AoA estimation algorithms, e.g., as described below.

In some demonstrative aspects, the algorithm-specific information May define a plurality of sets of algorithm-specific metrics for the plurality of AoA estimation algorithms, e.g., as described below.

In some demonstrative aspects, radar processor 834 may be configured to select the selected AoA spectrum estimation algorithm, for example, based on a correlation between the AoA estimation profile and the plurality of sets of algorithm-specific metrics, e.g., as described below.

In one example, memory 838 may store algorithm-specific information of a plurality of sets of algorithm-specific metrics for a plurality of AoA estimation algorithms, for example, including one or more of the following metrics:

TABLE 1

| Algorithm | Resolution | Side lobes | Near field | Multipath | Sparse/ dense output | Complexity |
|---|---|---|---|---|---|---|
| DAS | Low | Very low | Yes | No | dense | Very low |
| SR | High | Low | Yes | No | dense | High |
| low-complexity SR algorithm | High | Low | No | No | dense | Low |
| SR algorithm with multipath mitigation | High | Low | Yes | Yes | dense | Very high |
| Beam space SR (BS-SR) | High | Med | No | No | dense | Low |

In other aspects, memory 838 may store any other additional or alternative algorithm-specific information for one or more of the AoA estimation algorithms of Table 1, and/or any other additional or alternative AoA estimation algorithms.

In some demonstrative aspects, memory 838 may store mapping information, for example, to map a plurality of AoA estimation profiles to the plurality of AoA spectrum estimation algorithms, e.g., as described below.

In some demonstrative aspects, radar processor 834 may be configured to select the selected AoA spectrum estimation algorithm for the range-Doppler bin, for example, based on the mapping information, e.g., as described below.

In one example, the mapping information may be implemented by Look UP Table (LUT), and/or by any other mapping scheme.

In one example, the mapping information may be implemented by a mapping function, for example, a weighed linear function and/or an AI neural network, e.g., for a non-linear mapping function.

In one example, e.g., in a first scenario, radar processor 834 may process a first plurality of settings of the algorithm-specific metrics, which may include, for example, a range value of 30 m corresponding to a far-field region, a positive Doppler value, e.g., an approaching object, an urban driving scenario, and input information indicating hardware availability of an FFT core. According to this scenario, radar processor 834 may determine a first AoA estimation profile including a setting of a high resolution and low SLL. Accordingly, radar processor 834 may select the low-complexity SR algorithm, for example, based on a correlation between the AoA estimation profile and the set of algorithm-specific metrics of the Fast IAA algorithm, e.g., of Table 1.

In another example, e.g., in a second scenario, radar processor 834 may process a second plurality of settings of the algorithm-specific metrics, which may include, for example, a range value of 150 m corresponding to a far-field region, a negative Doppler value, e.g., a moving-away object, and an urban driving scenario. According to this scenario, radar processor 834 may determine a second AoA estimation profile including a setting of a low resolution. Accordingly, radar processor 834 may select the DAS algorithm, for example, based on correlation between the second AoA estimation profile and the set of algorithm-specific metrics of the DAS algorithm, e.g., of Table 1.

In another example, e.g., in a third scenario, radar processor 834 may process a third plurality of settings of the algorithm-specific metrics, which may include, for example, a range value of 50m corresponding to a far-field region, a zero or close to zero Doppler value, e.g., a tracking object in front of fronted 804 and having a same speed as vehicle 101 (FIG. 1), a highway driving scenario, and lack of hardware availability of the FFT core. According to this scenario, radar processor 834 may determine a third AoA estimation profile including a setting of a high resolution and a limited region of interest. Accordingly, radar processor 834 may select the BSS IA algorithm, for example, based on correlation between the third AoA estimation profile and the set of algorithm-specific metrics of the BS-SR algorithm, e.g., of Table 1.

Figure 9:
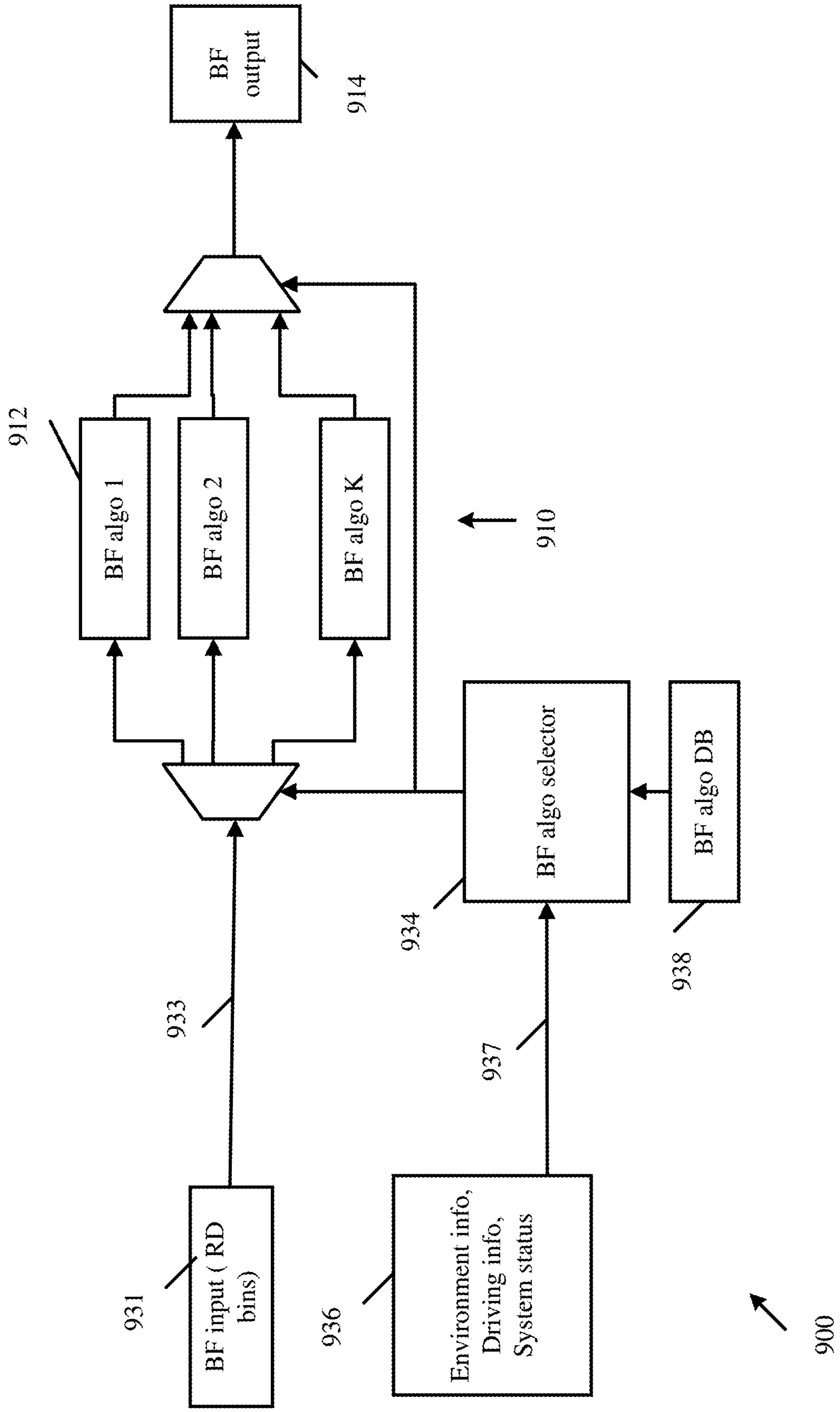
FIG. 9 is a schematic block diagram illustration of an AoA spectrum estimation processor, in accordance with some demonstrative aspects.

Reference is made to FIG. 9, which schematically illustrates an AoA spectrum estimation processor 900, in accordance with some demonstrative aspects. For example, radar processor 834 (FIG. 8) may include one or more elements of AoA spectrum estimation processor 900, and/or may perform one or more operations of, and/or one or more functionalities of, AoA spectrum estimation processor 900.

In some demonstrative aspects, as shown in FIG. 9, AoA spectrum estimation processor 900 may be configured to process an input, for example, a Beam-Forming (BF) input 931 including radar data of a plurality of RD bins, e.g., as described below. In one example, BF input 931 may include radar data of a radar frame, which may be determined base don the radar Rx data 811 (FIG. 8), e.g., as described above.

In some demonstrative aspects, as shown in FIG. 9, AoA spectrum estimation processor 900 may be configured to generate AoA spectrum information 914 based on the BF input 931.

In some demonstrative aspects, as shown in FIG. 9, AoA spectrum estimation processor 900 may include an AoA spectrum estimation algorithm selector 934, which may be configured to select for a range-Doppler bin a selected AoA spectrum estimation algorithm 912 from a plurality of AoA spectrum estimation algorithms 910.

In some demonstrative aspects, AoA spectrum estimation processor 900 may be configured to process radar data 933 of the range-Doppler bin according to the selected AoA spectrum estimation algorithm 912 to generate AoA spectrum information 914 of the range-Doppler bin.

In some demonstrative aspects, the AoA spectrum estimation algorithm selector 934 may be configured to determine an AoA estimation profile for estimation of the AoA spectrum information of the range-Doppler bin, for example, based on input information 936 from an input 937.

In some demonstrative aspects, as shown in FIG. 9, input information 936 may include, for example, environment information, system resource information and/or any other information, e.g., as described above.

In some demonstrative aspects, as shown in FIG. 9, AoA spectrum estimation processor 900 may include a memory 938 to store algorithm-specific information corresponding to the plurality of AoA estimation algorithms 910. For example, memory 938 may maintain algorithm-specific information defining a plurality of sets of algorithm-specific metrics for the plurality of AoA estimation algorithms 910.

In some demonstrative aspects, the AoA spectrum estimation algorithm selector 934 may be configured to select the selected AoA spectrum estimation algorithm 912, for example, based on a correlation between the AoA estimation profile and the plurality of sets of algorithm-specific metrics retrieved from memory 938.

In some demonstrative aspects, the AoA spectrum estimation algorithm selector 934 may be configured to select the selected AoA spectrum estimation algorithm 912, for example, based on mapping information, e.g., in memory 938, which may map a plurality of AoA estimation profiles to the plurality of AoA spectrum estimation algorithms 910.

In one example, the mapping information may be implemented, for example, by a Look Up Table (LUT), a mapping function, e.g., a weighed linear function, or an AI neural network, e.g., for non-linear mapping function.

Figure 10:
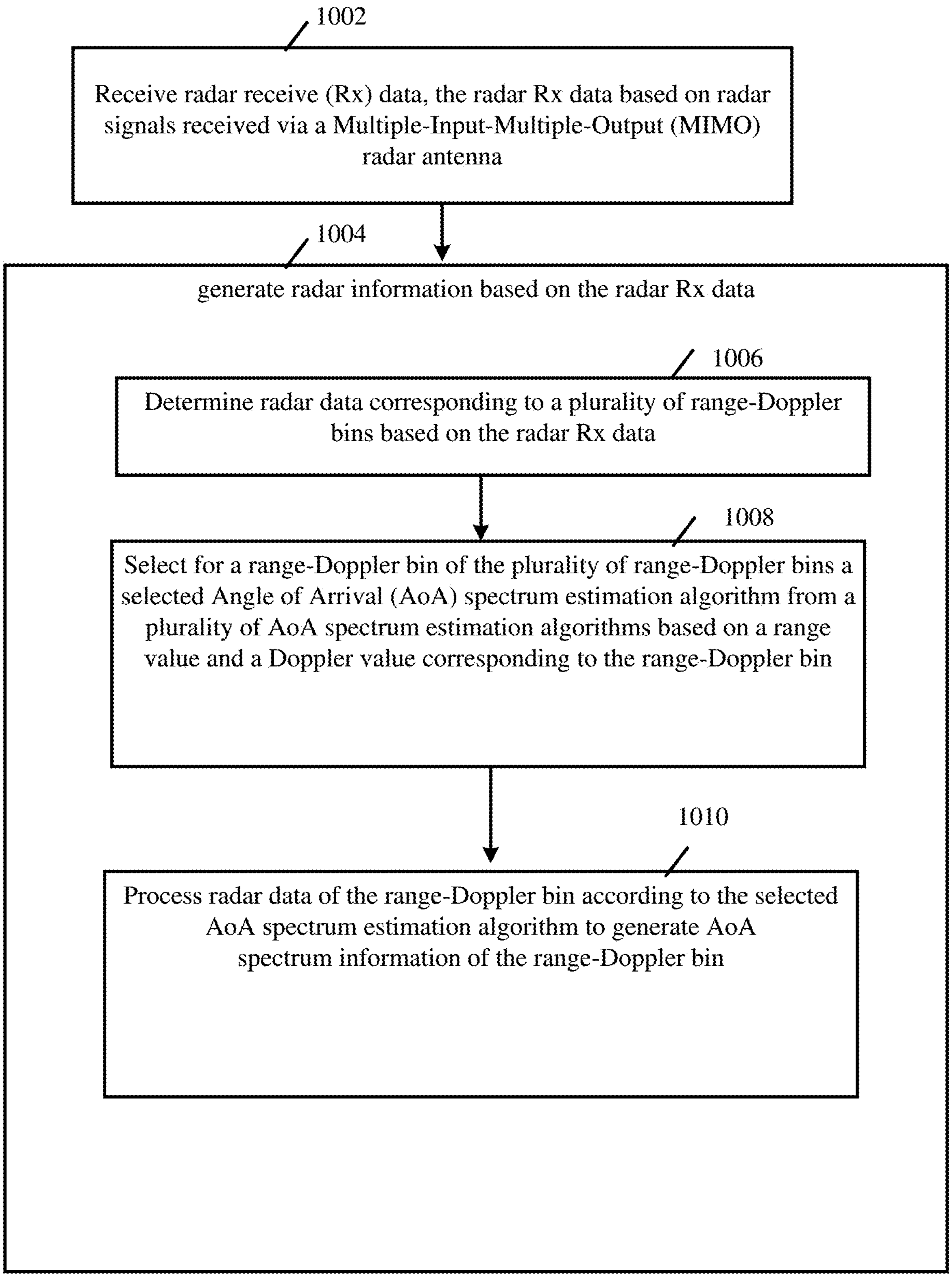
FIG. 10 is a schematic flow-chart illustration of a method of processing radar data according to an AoA spectrum estimation algorithm, in accordance with some demonstrative aspects.

Reference is made to FIG. 10, which schematically illustrates a method of processing radar data according to an AoA spectrum estimation algorithm, in accordance with some demonstrative aspects. For example, one or more of the operations of the method of FIG. 10 may be performed by a processor, e.g., radar processor 834 (FIG. 8), processor 838 (FIG. 8), and/or AoA spectrum estimation processor 900 (FIG. 9).

As indicated at block 1002, the method may include receiving radar Rx data, the radar Rx data based on radar signals received via a MIMO radar antenna. For example, radar processor 834 (FIG. 8) may receive the radar Rx data 811 (FIG. 8) based on the radar signals received via MIMO radar antenna 881 (FIG. 8), e.g., as described above.

As indicated at block 1004, the method may include generating radar information based on the radar Rx data. For example, radar processor 834 (FIG. 8) may generate radar information 813 (FIG. 8) based on the radar Rx data 811 (FIG. 8), e.g., as described above.

As indicated at block 1006, generating the radar information may include determining radar data corresponding to a plurality of range-Doppler bins based on the radar Rx data. For example, radar processor 834 (FIG. 8) may determine the radar data corresponding to the plurality of RD bins based on the radar Rx data 811 (FIG. 8), e.g., as described above.

As indicated at block 1008, generating the radar information may include selecting for a range-Doppler bin of the plurality of range-Doppler bins a selected AoA spectrum estimation algorithm from a plurality of AoA spectrum estimation algorithms, for example, based on a range value and a Doppler value corresponding to the range-Doppler bin. For example, radar processor 834 (FIG. 8) may select the selected AoA spectrum estimation algorithm for the range-Doppler bin based on the range value and the Doppler value corresponding to the range-Doppler bin, e.g., as described above.

As indicated at block 1010, the selected AoA spectrum estimation algorithm processing radar data of the range-Doppler bin according to the selected AoA spectrum estimation algorithm to generate AoA spectrum information of the range-Doppler bin. For example, radar processor 834 (FIG. 8) may process the radar data of the range-Doppler bin according to the selected AoA spectrum estimation algorithm to generate the AoA spectrum information of the range-Doppler bin, e.g., as described above.

Referring to FIG. 8, in some demonstrative aspects, radar processor 834 may be configured to generate radar information 813 including an AoA spectrum, e.g., an azimuth AoA spectrum, an elevation AoA spectrum, and/or any other AoA-based spectrum.

In some demonstrative aspects, there may be a need to provide a technical solution to achieve a sufficient Peak Side Lobe Level (PSLL) of an estimated AoA spectrum. For example, the PSLL may be a Key Performance Indicator (KPI) for radar systems. In one example, an improved PSLL may allow maintaining a good radar imaging performance, e.g., under various impairments.

In some demonstrative aspects, the PSLL of an AoA spectrum may be determined as a difference between a power level (e.g., in dB) of a main-lobe in the AoA spectrum, and a power level (e.g., in dB) of a peak, e.g., maximal, side-lobe, corresponding to the main-lobe. For example, according to this PSLL determination, a higher PSLL may be considered better than a lower PSLL.

In some demonstrative aspects, for example, when the main-lobe has a power level of 0 dB, then the PSLL may be determined as a positive value according to the power level of the peak side-lobe corresponding to the main-lobe.

In other aspects, the PSLL of an AoA spectrum may be determined as a difference between a power level (e.g., in dB) of a peak, e.g., maximal, side-lobe corresponding to a main-lobe, and a power level (e.g., in dB) of the main-lobe in the AoA spectrum. For example, according to this PSLL definition, the PSLL may include a negative value. For example, according to this PSLL definition, a lower PSLL may be considered better than a higher PSLL.

In some demonstrative aspects, the PSLL may be affected by multipath radar signals in a Multi-Path (MP) scenario. For example, an MP scenario may include multipath signals from a plurality of paths between the MIMO antenna 881 and a detected object ("radar object"), e.g., as described below.

In one example, the multipath signals may degrade the PSLL, for example, due to unwanted reflections from one or more other objects, e.g., as described below.

Figure 11:
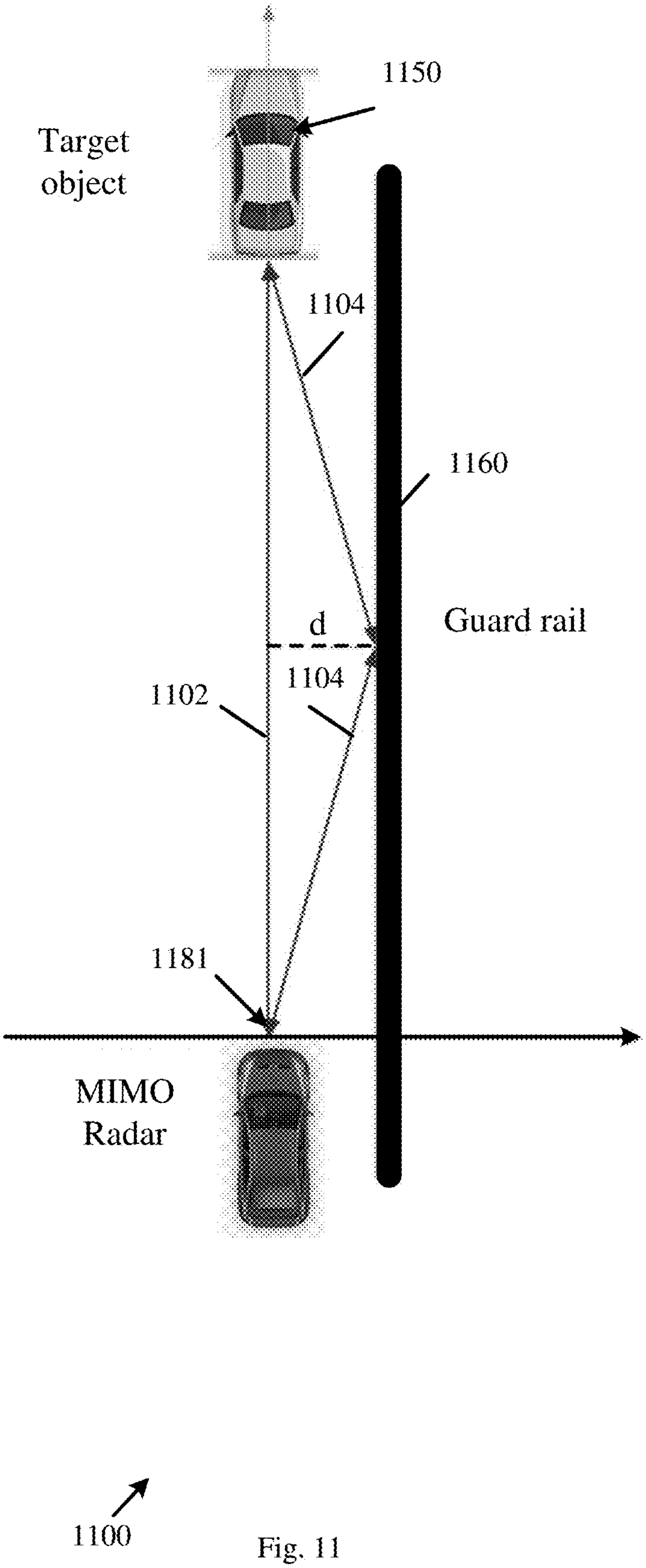
FIG. 11 is a schematic illustration of a multipath scenario, to demonstrate a technical problem, which may be addressed in accordance with some demonstrative aspects.

Reference is made to FIG. 11, which schematically illustrates a multipath scenario 1100, to demonstrate a technical problem, which may be addressed in accordance with some demonstrative aspects.

In one example, as shown in FIG. 11, a vehicle having a radar with a MIMO antenna 1181 may transmit radar signals to detect a radar object 1150, e.g., vehicle or any other object, in a multipath environment including a reflector 1160, e.g., a guard rail or any other reflector object, which may reflect the radar signals.

In some demonstrative aspects, the multipath scenario 1100 may result in the radar signals received by MIMO antenna 1181 including a plurality of multipath signals from a plurality of paths between the MIMO antenna 1181 and the radar object 1150. In one example, the plurality of paths may include four paths, for example, in a simple/basic scenario including a single reflector 1160. Other multipath scenarios may result in a larger number of paths.

In some demonstrative aspects, a first path, denoted S11, may include a direct Tx path from the MIMO antenna 1181 to the radar object 1150 and a direct Rx path from the radar object 1150 to the MIMO antenna 1181. For example, the path S11 may include a direct Tx path of a Tx signal via a direct path 1102 from the MIMO antenna 1181 to the radar object 1150, and a direct Rx path of an Rx signal via the direct path 1102 from the radar object 1150 to the MIMO antenna 1181.

In some demonstrative aspects, a second path, denoted S12, may include an indirect Tx path from the MIMO antenna 1181 to the radar object 1150 via the reflector 1160, and a direct Rx path from the radar object 1150 to the MIMO antenna 1181. For example, the path S12 may include an indirect Tx path of a Tx signal via an indirect path 1104 from the MIMO antenna 1181 to the reflector 1160, and from the reflector 1160 the radar object 1150; and a direct Rx path of an Rx signal via the direct path 1102 from the radar object 1150 to the MIMO antenna 1181.

In some demonstrative aspects, a third path, denoted S21, may include a direct Tx path from the MIMO antenna 1181 to the radar object 1150, and an indirect Rx path from the MIMO radar antenna 1181 to the radar object 1150 via the reflector 1160. For example, the path S21 may include a direct Tx path of a Tx signal via the direct path 1102 from the MIMO antenna 1181 to the radar object 1150; and an indirect Rx path of an Rx signal via the indirect path 1104 from the radar object 1150 to the reflector 1160, and from the reflector 1160 to the MIMO antenna 1181.

In some demonstrative aspects, a fourth path, denoted S22, may include an indirect Tx-Rx path via the reflector between the MIMO antenna 1181 and the radar object 1150. For example, the path S22 may include an indirect Tx path of a Tx signal via the indirect path 1104 from the MIMO antenna 1181 to the reflector 1160, and from the reflector 1160 the radar object 1150; and an indirect Rx path of an Rx signal via the indirect path 1104 from the radar object 1150 to the reflector 1160, and from the reflector 1160 to the MIMO antenna 1181.

In one example, the multipath signals may be defined, e.g., as follows:

S11: Direct path: Tx Array→Target→Rx Array

S12: Tx bounce: Tx Array→reflector→Target→Rx Array

S21: Rx bounce: Tx Array→Target→Reflector→Rx Array

S22: Tx+Rx bounce: Tx Array→Reflector→Target→Reflector→Rx Array

In some demonstrative aspects, in an MP scenario, e.g., MP scenario 1100, where there are a plurality of paths other the main Line Of Sight (LOS) path, e.g., the direct path, there may be paths in which a Direction of Arrival (DOA) is different from the Direction of Departure (DOD).

For example, as shown in FIG. 11, a DOD of signals of the first path may be the same as a DOA of the signals of the first path; and a DOD of signals of the fourth path may be the same as a DOA of the signals of the fourth path. For example, the signals via the first path may depart the MIMO antenna 1181 at an LOS angle, and may also arrive at the MIMO antenna 1181 at a LOS angle.

For example, the signals via the fourth path may depart the MIMO antenna 1181 at an angle between the MIMO radar antenna 1181 and the reflector 1160, and may also arrive at the MIMO antenna 1181 at the same angle.

For example, as shown in FIG. 11, a DOD of signals of the second path may be different from a DOA of the signals of the second path; and a DOD of signals of the third path may be different from a DOA of the signals of the third path.

For example, the signals via the second path may depart the MIMO antenna 1181 at the LOS angle, and may arrive at the MIMO antenna 1181 at the angle between the MIMO radar antenna 1181 and the reflector 1160.

For example, the signals via the third path may depart the MIMO antenna 1181 at the angle between the MIMO radar antenna 1181 and the reflector 1160, and may arrive at the MIMO antenna 1181 at the LOS angle.

In some demonstrative aspects, the received signals, which may be received at the MIMO antenna 1181 via the different paths may have different powers, for example, based on the AoD, the AoA and/or an RCS of the target object 1150.

In some demonstrative aspects, ranges to the radar object 1150 via the indirect paths, e.g., the paths S12 and S21, may be longer than ranges to the radar object 1150 via the direct path, e.g., the paths S11 and S22.

In some demonstrative aspects, a range via an indirect path, e.g., a range estimated based on the signals from the paths S12 and/or S21, may fall within a same range bin, as a bin of a range via the direct path, e.g., a range bin of a range estimated based on the signals form the paths S11 and S22, or in a longer range bin. For example, the range of the indirect path may fall into the same range bin as the range of the direct path, or into a longer range bin, for example, based on a distance, denoted d, between the radar object 1150 and the reflector 1160.

In some demonstrative aspects, a velocity (Doppler) bin corresponding to the indirect path may be different from a velocity (Doppler) bin of the direct path, for example, in case of a dynamic multipath scenario, e.g., including one or more moving reflector objects.

In some demonstrative aspects, a mathematical model of radar signals communicated by a MIMO radar antenna may be determined, for example, based on a Tx steering vector, denoted $a_t$, and an Rx steering vector, denoted $a_r$. For example, the Tx steering vector $a_t$ and the Rx steering vector $a_r$ may be determined with respect to an angle θ e.g., as follows:

$$a_t(\theta) = e^{jkd_t \sin\theta} \in [N_t \times 1] \quad (1)$$
$$a_r(\theta) = e^{jkd_r \sin\theta} \in [N_r \times 1]$$

wherein $N_t$ denotes a number of Tx antenna elements, $N_r$ denotes a number of Rx antenna elements, and k is based on a wavelength λ of the radar signals, e.g., $$k = \frac{2\pi}{\lambda}$$

In some demonstrative aspects, a virtual MIMO antenna may be defined based on a MIMO radar antenna, e.g., MIMO radar antenna 1181.

For example, the geometry of a virtual MIMO antenna may be defined by a convolution of a Tx array geometry and an Rx array geometry of the MIMO radar antenna.

For example, a spectrum e.g., an array response, of the virtual MIMO antenna may be defined based on a multiplication of a Tx spectrum of the Tx array and the Rx spectrum of the Rx array. For example, a steering vector, denoted $a_v$, of the virtual MIMO antenna may be defined by a product, e.g., a Kronecker product, of the Tx steering vector $a_t$ and the Rx steering vector $a_r$.

In some demonstrative aspects, these definitions of the geometry of the virtual MIMO antenna and/or the array response of the virtual MIMO antenna may be based, for example, on a far field assumption, and/or on a non-multipath scenario.

In some demonstrative aspects, Rx signals received by a MIMO radar antenna may be represented by a vector, denoted x, for example, as a function of a plurality of pairs of complex values corresponding to a respective plurality of different combinations of a Tx antenna from a plurality of Tx antennas of the MIMO radar antenna, and an Rx antenna of a plurality of Rx antennas of the MIMO radar antenna. For example, the vector x may include $N_t$*$N_r$ pairs of complex values, for example, when the MIMO radar antenna including $N_t$ Tx antenna elements and $N_r$ Rx antenna elements.

In some demonstrative aspects, Rx signals received by a MIMO radar antenna in a non-MP scenario including a single target, e.g., a scenario including target 1150 without reflector 1160, may be represented by a vector, denoted $x_1$. For example, in this non-MP scenario, there may be a single direct path, denoted $s_1$, between the MIMO radar antenna and the radar target. Accordingly, the DoD and the DoA of the radar signals may be at a same angle, denoted $\theta_1$. For example, the vector $x_1$ may be defined as follows:

$$x_1(s_1, \theta_1) = s_1[a_t(\theta_1) \otimes a_r(\theta_1)] = s_1 a_v(\theta_1) \quad (2)$$

In some demonstrative aspects, Rx signals received by a MIMO radar antenna in a non-MP scenario including two targets, e.g., without reflector 1160, may be represented by a vector, denoted $x_2$. For example, in this non-MP scenario, there may be two direct paths, including a first direct path, e.g., the path $s_1$, between the MIMO radar antenna and a first radar target, and a second direct path, denoted $s_2$, between the MIMO radar antenna and a second radar target. Accordingly, the DoD and the DoA of the radar signals of the first path may be at a same angle, denoted $\theta_1$; the DoD and the DoA of the radar signals of the second path may be at a same angle, denoted $\theta_2$. For example, the vector $x_1$ may be defined as follows:

$$x_2(s_1, \theta_1, s_2, \theta_2) == s_1[a_t(\theta_1) \otimes a_r(\theta_1)] + s_2[a_t(\theta_2) \otimes a_r(\theta_2)] == s_1 a_v(\theta_1) + s_2 r_v(\theta_2) \quad (3)$$

In some demonstrative aspects, Rx signals received by a MIMO radar antenna in a MP scenario including a single target and a single reflector, e.g., MP scenario 1100 including target 1150 and reflector 1160, may be represented by a vector, denoted $x_{mp}$. For example, in this MP scenario, there may be four paths, e.g., including the paths $s_{11}$, $s_{12}$, $s_{21}$, and $s_{22}$ described above, between the MIMO radar antenna and the radar target. Accordingly, the radar signals of the path $s_{11}$ may have a DoD and a DoA at a same angle, e.g., the angle $\theta_1$; the radar signals of the path $s_{12}$ may have a DoD at the angle $\theta_1$ and a DoA at a second angle, e.g., the angle $\theta_2$; the radar signals of the path $s_{12}$ may have a DoD at the angle $\theta_1$ and a DoA at a second angle, e.g., the angle $\theta_2$; the radar signals of the path $s_{21}$ may have a DoD at the angle $\theta_2$ and a DoA at the angle $\theta_1$; and the radar signals of the path $s_{22}$ may have a DoD and a DoA at a same angle, e.g., the angle $\theta_2$. For example, the vector $x_{mp}$ may be defined as follows:

$$\begin{aligned} & x_{mp}(s_{11}, s_{12}, s_{21}, s_{22}, \theta_1, \theta_2) = \\ & s_{11}[a_t(\theta_1) \otimes a_r(\theta_1)] + s_{12}[a_t(\theta_1) \otimes a_r(\theta_2)] + s_{21}[a_t(\theta_2) \otimes a_r(\theta_1)] + \\ & s_{22}[a_t(\theta_2) \otimes a_r(\theta_2)] = \left(\underbrace{[a_t(\theta_1), a_t(\theta_2)]}_{A_t} \otimes \underbrace{[a_r(\theta_1), a_r(\theta_2)]}_{A_r}\right) \begin{bmatrix} s_{11} \\ s_{12} \\ s_{21} \\ s_{22} \end{bmatrix} = \\ & s_{11} a_v(\theta_1) + s_{22} a_v(\theta_2) + s_{12}[a_t(\theta_1) \otimes a_r(\theta_2)] + s_{21}[a_t(\theta_2) \otimes a_r(\theta_1)] \end{aligned} \quad (4)$$

In some demonstrative aspects, as may be seen from Equation 4, the paths having a DoA different from a DoD, e.g., the paths $s_{12}$ and $s_{21}$, may result in the vector $x_{mp}$ having mixed components, e.g., the components $s_{12}[a_t(\theta_1) \otimes a_r(\theta_2)]$ and $s_{21}[a_t(\theta_2) \otimes a_r(\theta_1)]$ which are based on a convolution of steering vectors corresponding to the different angles $\theta_1$ and $\theta_2$.

In some demonstrative aspects, these mixed components may result, in some cases, in an AoA spectrum having a high SLL, e.g., as described below.

In some demonstrative aspects, a Tx array and an Rx array of a MIMO radar, e.g., MIMO radar 881 (FIG. 8), may be designed such that a convolution of the Tx array and the Rx array may result in a uniform virtual MIMO array. In one example, the uniform virtual MIMO array may be configured to be equivalent to a Uniform Linear Array (ULA), e.g., in one dimension (1D), or to a Uniform Rectangular Array (URA), e.g., in two dimensions (2D). However, when the physical Tx array and/or the physical Rx array are not configured as uniform arrays, a Tx spectrum (Tx array response) of the Tx array, and/or an Rx spectrum (Rx array response) of the Rx array may include grating lobes, e.g., with a high Sidelobe Level (SLL).

Figure 12:
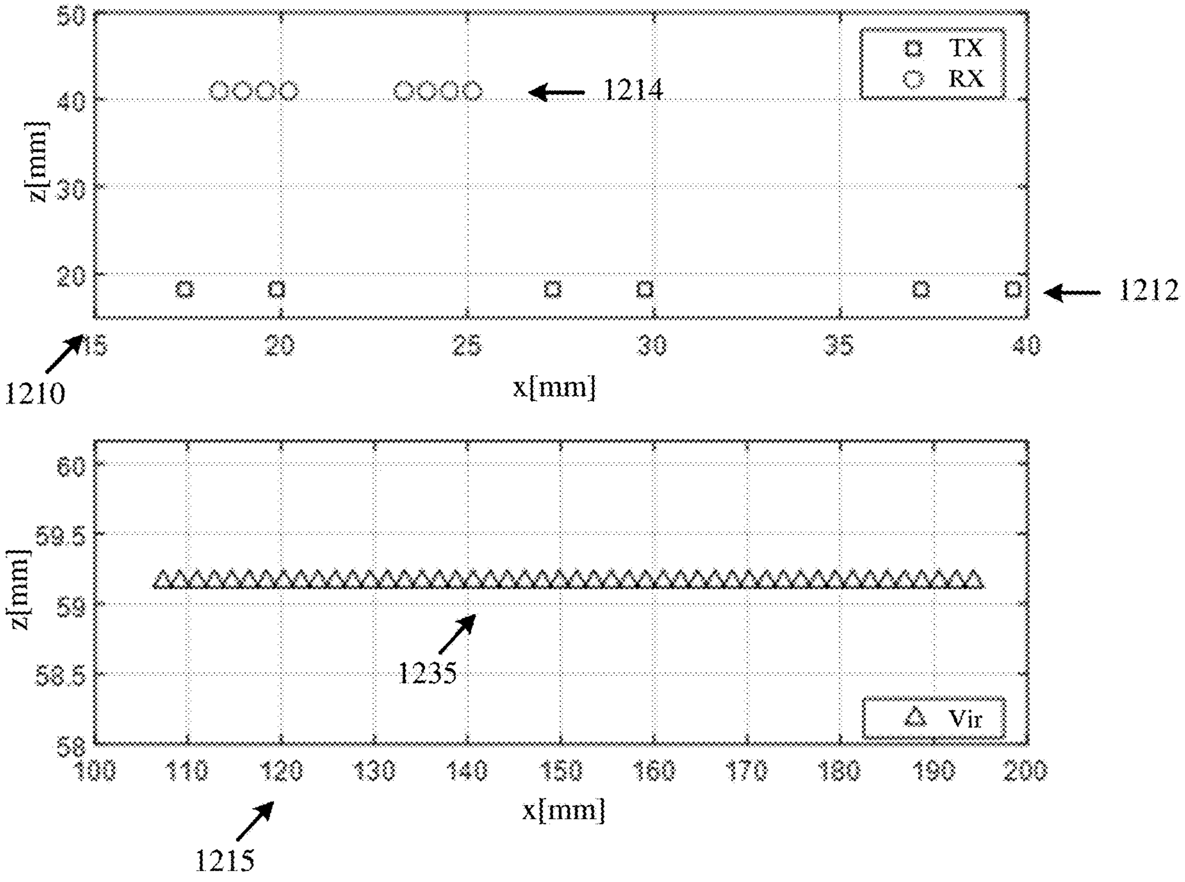
FIG. 12 is a schematic illustration of an antenna array, which may be implemented, in accordance with some demonstrative aspects.

Reference is made to FIG. 12, which schematically an antenna array 1210, in accordance with some demonstrative aspects.

As shown in FIG. 12, antenna array 1210 may include a plurality of Tx antennas 1212, and a plurality of Rx antennas 1214.

As shown in FIG. 12, the plurality of Tx antennas 1212 may include 6 Tx antennas, and the plurality of Rx antennas 1214 may include 8 Rx antennas.

As shown in FIG. 12, the plurality of Tx antennas 1212 and/or the plurality of Rx antennas 1214 may be arranged in a non-uniform arrangement, e.g., including non-uniform spacing between the Tx antennas 1212, and/or non-uniform spacing between the Rx antennas 1214.

As shown in FIG. 12, antenna array 1210 may result in a virtual MIMO array 1215 including a convolution of the plurality of Tx antennas 1212 and the plurality of Rx antennas 1214.

As shown in FIG. 12, virtual MIMO array 1215 may include an equivalent of a 1D ULA including 48 antenna elements 1235.

Figure 13:
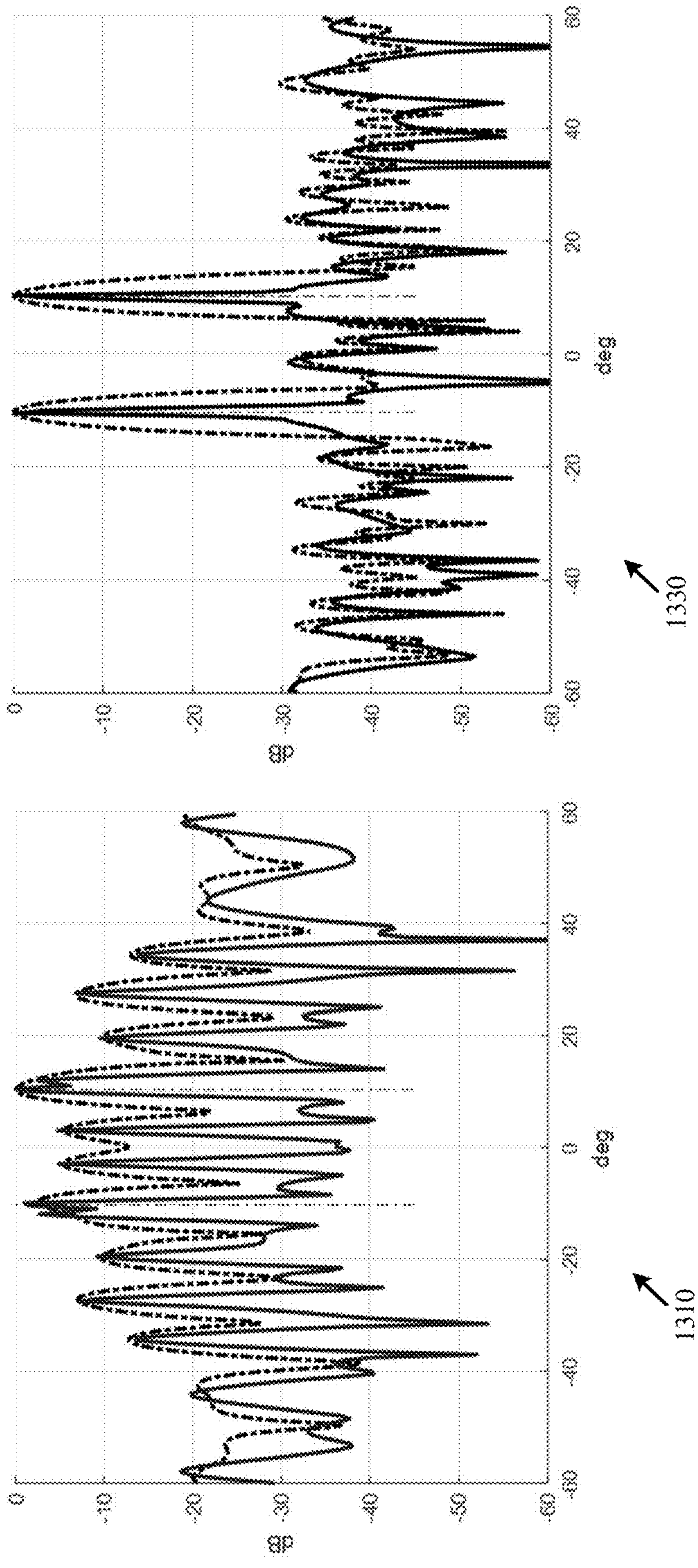
FIG. 13 is a schematic illustration of a comparison between first AoA spectrums and second AoA spectrums, to demonstrate a technical problem, which may be addressed in accordance with some demonstrative aspects.

Reference is made to FIG. 13, which schematically illustrates a comparison between first AoA spectrums 1310 and second AoA spectrums 1330, to demonstrate a technical problem, which may be addressed in accordance with some demonstrative aspects.

For example, the AoA spectrums may correspond to an MP scenario, e.g., MP scenario 1100 (FIG. 11), including a single radar target and a single reflector.

In one example, AoA spectrums 1310 may represent a spectrum, of a virtual MIMO ULA based on a convolution of non-uniform Tx and/or Rx arrays, e.g., the virtual MIMO ULA 1215 (FIG. 12) based on antenna array 1210 (FIG. 12).

In one example, AoA spectrum 1330 may represent a spectrum of a virtual ULA based on uniform Tx and Rx arrays.

As shown in FIG. 13, AoA spectrums 1310 may include multiple peaks, corresponding to a plurality of grating lobes and SLLs, such that it may be difficult to detect the radar target based on detection of peaks in the AoA spectrums 1310.

As shown in FIG. 13, in contrast to the multiple peak in the AoA spectrums 1310, the AoA spectrums 1330 may include two distinguishable peaks. For example, these two peaks may include a first peak, e.g., at about 20 degrees, corresponding a first path, e.g., the direct path to the radar target, and a second peak "ghost peak", corresponding to the TX-Rx indirect path, e.g., the path $s_{22}$.

In some demonstrative aspects, there may be a need to provide a technical solution to achieve a sufficient Peak Side Lobe Level (PSLL) of an estimated Angle of Arrival (AoA) spectrum, for example, in a multipath scenario, e.g., as described below.

For example, the paths having a DOA different from the DOD, e.g., the paths $s_{12}$ and $s_{21}$, may result in components, e.g., the components $s_{12}[a_t(\theta_1)\otimes a_r(\theta_2)]$ and $s_{21}[a_t(\theta_2)\otimes a_r(\theta_1)]$ in Equation 4. These components may result in a spatial spectrum with high SLL, for example, when using a MIMO antenna array including non-uniform and/or non-equally spaced physical Tx and/or Rx arrays. For example, as discussed above. The non-uniform array 1210 (FIG. 12) may result in the high SLL in AoA spectrum 1310.

Figure 14:
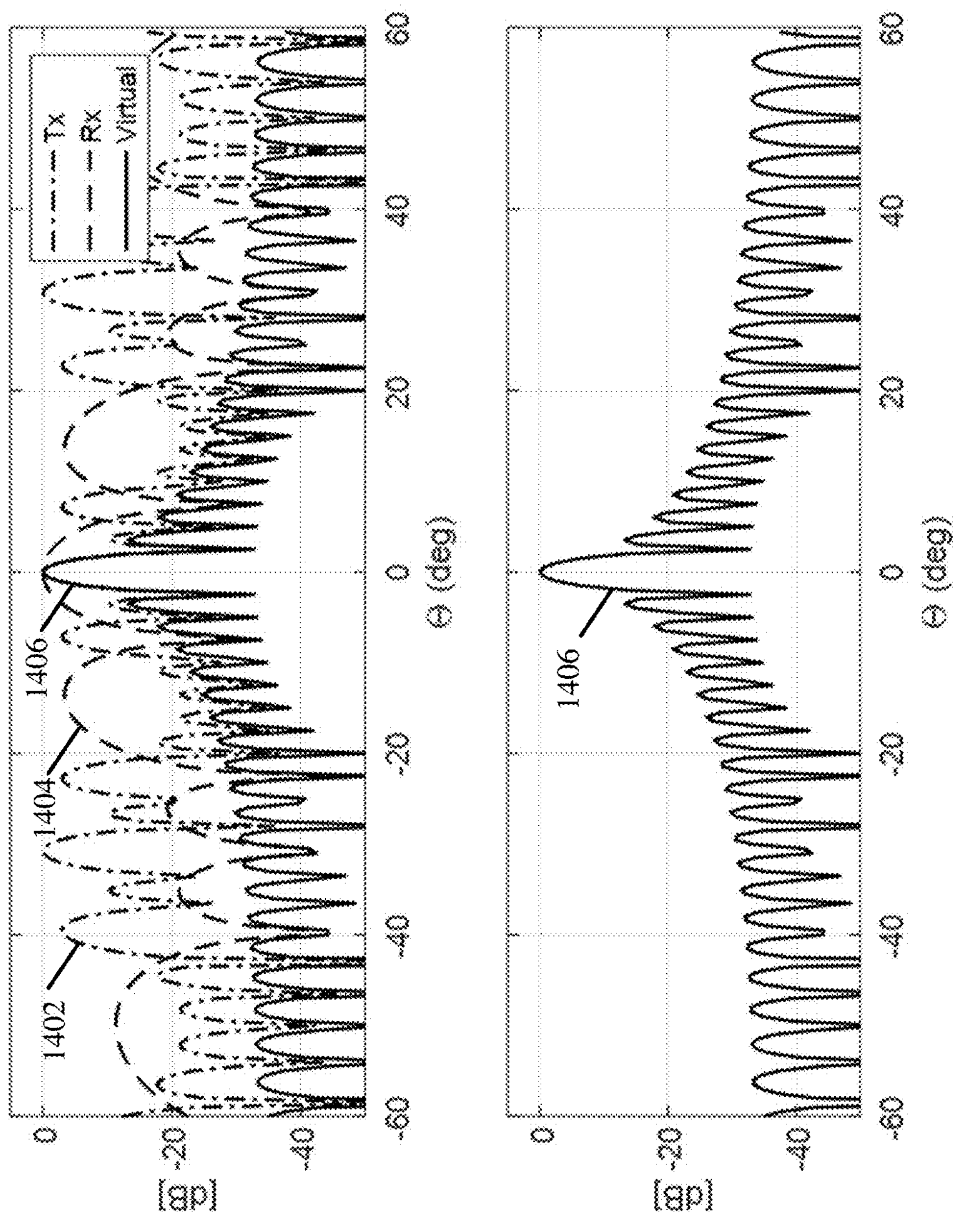
FIG. 14 is a schematic illustration of graphs depicting spectrums of a Multiple-Input-Multiple-Output (MIMO) array, to demonstrate a technical problem, which may be addressed in accordance with some demonstrative aspects.

Reference is made to FIG. 14, which schematically illustrates graphs depicting spectrums of a MIMO array, to demonstrate a technical problem, which may be addressed in accordance with some demonstrative aspects.

In one example, a curve 1402 depicts a Tx spectrum of a Tx array of a MIMO array, a curve 1404 depicts an Rx spectrum of an Rx array of the MIMO array, and a curve 1406 depicts an AoA spectrum based on a product of the Tx spectrum and the Rx spectrum.

In one example, the spectrums of FIG. 14 may correspond to a scenario, e.g., a non-MP scenario, including a single target, where the DOA is the same as the DOD.

As shown in FIG. 14, nulls of the Rx spectrum (curve 1404) may fall substantially on respective peaks of the Tx spectrum (curve 1402). As a result, the convolution of the Tx spectrum with the Rx spectrum may substantially cancel-out the multiple peaks in of curves 1402 and 1404.

Accordingly, as shown in FIG. 14, curve 1406 may include only one peak, e.g., corresponding to the single target, e.g., at about 0 degrees.

Figure 15:
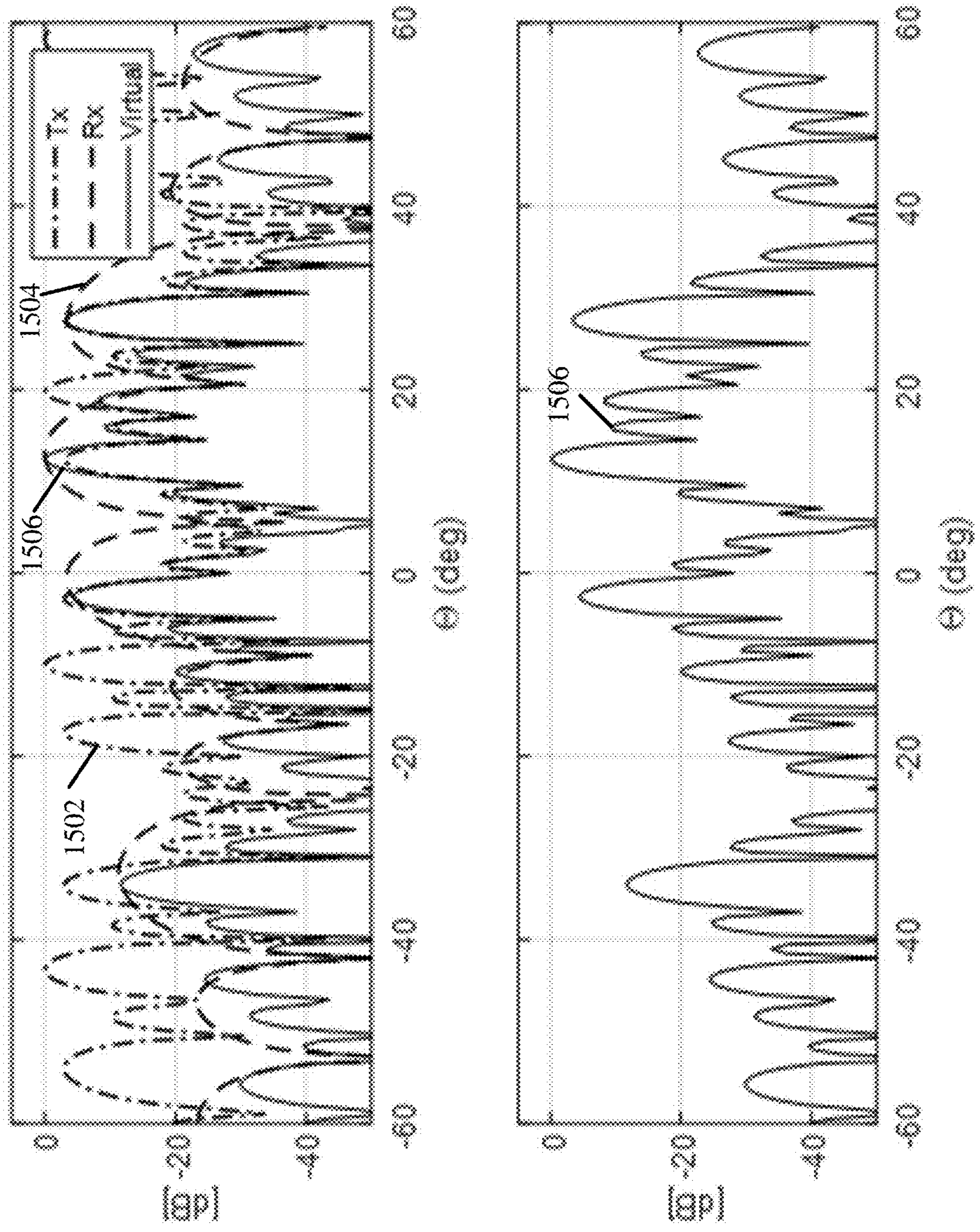
FIG. 15 is a schematic illustration of graphs depicting spectrums of a MIMO array, to demonstrate a technical problem, which may be addressed in accordance with some demonstrative aspects.

Reference is made to FIG. 15, which schematically illustrates graphs depicting spectrums of a MIMO array, to demonstrate a technical problem, which may be addressed in accordance with some demonstrative aspects.

In one example, a curve 1502 depicts a Tx spectrum of a Tx array of a MIMO array, a curve 1504 depicts an Rx spectrum of an Rx array of the MIMO array, and a curve 1506 depicts an AoA spectrum based on a product of the Tx spectrum and the Rx spectrum.

In one example, the spectrums of FIG. 15 may correspond to a scenario, e.g., a MP scenario, including a single target, and a plurality of paths including paths where the DOA is different from the DOD, e.g., the paths $s_{12}$ and $s_{21}$.

As shown in FIG. 15, nulls of the Rx spectrum (curve 1504) may not be aligned with peaks of the Tx spectrum (curve 1502). As a result, the convolution of the Tx spectrum with the Rx spectrum may not cancel-out the multiple peaks in of curves 1502 and 1504.

As shown in FIG. 15, the resulting curve 1506 may include a plurality of peaks, e.g., including a peak at about 17 degrees corresponding to the target, and a plurality of other peaks, which may make it hard, or even impossible, to detect the target.

As shown in FIG. 15, curve 1506 may include a large number of high grating lobes with high SLL, which may degrade an accuracy of an imaging radar detection map, in a way, which may make it hard to detect the target.

Figure 16:
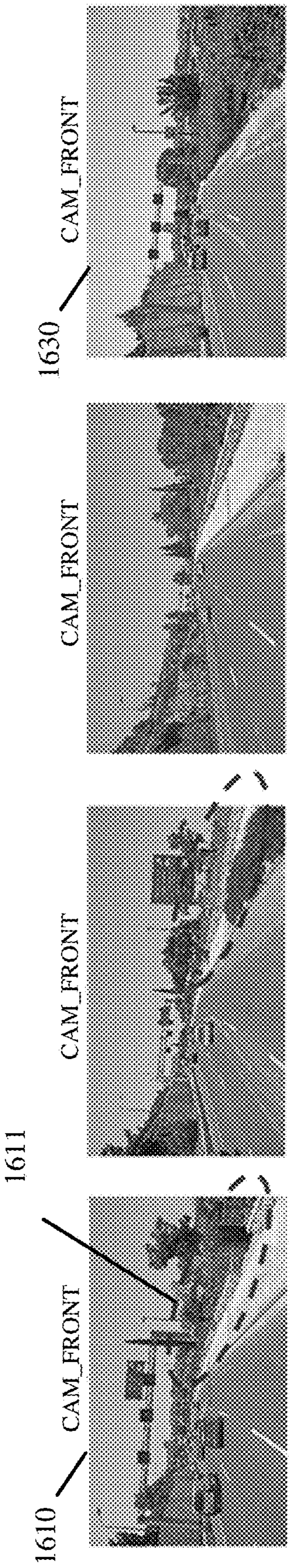
FIG. 16 is a schematic illustration of a plurality of scenarios, to demonstrate a technical problem, which may be addressed in accordance with some demonstrative aspects.

Reference is made to FIG. 16, which schematically illustrates a plurality of scenarios, to demonstrate a technical problem, which may be addressed in accordance with some demonstrative aspects.

As shown in FIG. 16, a first scenario 1610 includes a plurality of targets, e.g., vehicles, and a reflector, e.g., a guard rail 1611.

For example, the multipath environment of scenario 1610 may result in high SLL, e.g., as described above, which may degrade an accuracy of an imaging radar detection map.

As shown in FIG. 16, a second scenario 1620 includes a plurality of targets in a non-MP scenario without the reflector, e.g., without guard rail 1611. For example, in opposed to the scenario 1611, an imaging radar detection map corresponding to the scenario 1630 may not be affected by the multipath effects.

Referring back to FIG. 8, in some demonstrative aspects, radar processor 834 may be configured to mitigate high SLL and/or grating lobes in an AoA spectrum of a MIMO radar antenna, e.g., MIMO radar antenna 881, in multipath scenarios, for example, scenarios including a path where a DOA is different from a DOD, e.g., as described below.

In some demonstrative aspects, there may be one or more disadvantages, inefficiencies, and/or technical problems to implement a maximum likelihood (ML) algorithm in a multipath scenario, for example, to reduce SLL and/or grating lobes, as described below.

In one example, a 2D ML algorithm may not be able to provide an AoA spectrum without sidelobes, e.g., an MP-sidelobe free spectrum, in a MP scenario and, therefore, the 2D ML algorithm may result in many false detections.

In some demonstrative aspects, radar processor 834 may be configured to generate radar information 813, for example, by applying an SR AoA algorithm, for example, an IAA algorithm, to the radar Rx data 811, e.g., as described below.

In some demonstrative aspects, there may be a need to provide a technical solution to achieve a sufficient PSLL of an estimated AoA spectrum, for example, when applying an IAA algorithm using a MIMO antenna in a multi-path scenario, e.g., a scenario including paths having a DOA different from a DOD, e.g., as described below.

In some demonstrative aspects, radar processor 834 may be configured to generate the radar information 813, for example, by applying to the radar Rx data 811 a SR AoA algorithm, which may be configured for a multi-path scenario, in which the radar signals include multipath signals from a plurality of paths between the MIMO antenna 881 and a radar object, e.g., as described below.

In some demonstrative aspects, radar processor 834 may be configured to utilize a SR AoA algorithm, which may be configured such that the resulting radar information 813 may include an AoA spectrum having, for the radar object, no more than two amplitude peaks, which are above −20 Decibel (dB), corresponding to the multipath signals, e.g., as described below.

In some demonstrative aspects, radar processor 834 may be configured to utilize a SR AoA algorithm, which may be configured such that the resulting radar information 813 may include an AoA spectrum having, for the radar object, no more than two amplitude peaks, which are above −10 dB, corresponding to the multipath signals, e.g., as described below.

In some demonstrative aspects, the no more than two amplitude peaks may include, for example, an amplitude peak above −20 dB corresponding a direct path to the radar object, and no more than one other amplitude peak above −20 dB, e.g., a “ghost” amplitude peak.

In some demonstrative aspects, the no more than two amplitude peaks may include a first amplitude peak corresponding to a direct path between the MIMO 881 antenna and the radar object, e.g., the path Su as described above.

In some demonstrative aspects, no more than two amplitude peaks may include no more than a second amplitude peak corresponding to an indirect path, for example, including a path from the MIMO radar antenna 881 to the radar object via a reflector, and from the radar object to the MIMO radar antenna 881 via the reflector, e.g., the path $S_{22}$ as described above.

In some demonstrative aspects, radar processor 834 may be configured to extend an IAA steering matrix of an IAA algorithm to include different combinations of Tx and Rx multipath responses from different Tx and Rx angles, e.g., as described below.

In some demonstrative aspects, radar processor 834 may be configured to modify a dictionary, e.g., a steering matrix, of the IAA algorithm to include different combinations of Tx and Rx multipath responses from different Tx and Rx angles, e.g., as described below.

In some demonstrative aspects, radar processor 834 may implement the IAA algorithm with the modified dictionary, for example, to achieve a technical advantage of better notching of undesired peaks, e.g., which may appear due to multipath effects. For example, applying the IAA algorithm with the modified dictionary may allow minimizing a MP effect and/or noise power at a beamformer output, for example, assuming a look-direction distortionless response constraint.

In some demonstrative aspects, radar processor 834 may be configured to apply the IAA algorithm to the radar Rx data 811, for example, based on a steering matrix including a plurality of different-angle steering vectors, e.g., as described below.

In some demonstrative aspects, a different-angle steering vector of the plurality of different-angle steering vectors may include a steering vector corresponding to a Tx-Rx angle combination of a Tx angle and an Rx angle, which is different from the Tx angle, e.g., as described below.

In some demonstrative aspects, the steering matrix may include a plurality of same-angle steering vectors corresponding to a respective plurality of angle values, e.g., as described below.

In some demonstrative aspects, a same-angle steering vector corresponding to an angle value may include a steering vector corresponding to a Tx-Rx combination of a Tx angle equal to the angle value and an Rx angle equal to the angle value.

In some demonstrative aspects, the plurality of different-angle steering vectors may correspond to all possible Tx-Rx combinations, for example, based on the plurality of angle values, e.g., as described below.

In some demonstrative aspects, the plurality of different-angle steering vectors may correspond to a plurality of selected Tx-Rx angle combinations from the plurality of possible Tx-Rx combinations based on the plurality of angle values, e.g., as described below.

In some demonstrative aspects, radar processor 834 may be configured to determine the plurality of selected Tx-Rx angle combinations, for example, by applying a one-dimensional (1D) beamforming algorithm to the radar Rx data 811, e.g., as described below.

In some demonstrative aspects, radar processor 834 may be configured to determine a one-dimensional beamforming AoA spectrum based on the radar Rx data 811, e.g., as described below.

In some demonstrative aspects, radar processor 834 may be configured to identify in the one-dimensional beamforming AoA spectrum a plurality of peaks above a predefined threshold, e.g., as described below.

In some demonstrative aspects, radar processor 834 may be configured to determine the plurality of selected Tx-Rx angle combinations, for example, based on the plurality of peaks, e.g., as described below.

In some demonstrative aspects, the steering matrix may include a first count, denoted K, of same-angle steering vectors, followed by a second count, denoted Ks, of different-angle steering vectors, e.g., as described below.

In some demonstrative aspects, radar processor 834 may be configured to determine an IAA spectrum by applying the IAA algorithm to the radar Rx data 811, for example, based on the steering matrix, e.g., including the K same-angle steering vectors followed by the Ks, different-angle steering vectors, e.g., as described below. In some demonstrative aspects, radar processor 834 may be configured to determine the AoA spectrum to include first K elements of the IAA spectrum, e.g., as described below.

In one example, radar processor 834 may be configured to use a modified IAA dictionary, e.g., a modified steering matrix, which may be based on a basic IAA dictionary, e.g., as described below.

In some demonstrative aspects, the modified IAA dictionary may be determined by a modification of a basic IAA dictionary, which may include same-angle steering matrices, e.g., as described below.

In some demonstrative aspects, a basic IAA dictionary for the IAA algorithm may be defined based on a plurality of steering vectors corresponding to a respective plurality of angle values.

For example, a same-angle steering vector, denoted $a_v(\theta_1)$, for an angle value, denoted $\theta_1$, may be determined, for example, based on a convolution, e.g., a Kronecker product, of a Tx steering matrix, denoted $a_t(\theta_1)$, and an Rx steering matrix, denoted $a_r(\theta_1)$, with respect to the same angle value $\theta_1$, e.g., as follows:

$$\alpha_v(\theta_1) = a_t(\theta_1) \otimes a_r(\theta_1) \quad (5)$$

For example, the basic IAA dictionary, denoted A, may be defined, for example, based on a plurality of same-angle steering vectors $a_v$ for a plurality of angle values, e.g., as follows:

$$A = \left[a_v^H(\theta_1), \ldots, a_v^H(\theta_K)\right] \in [N \times K] \quad (6)$$

wherein K denotes the count of the plurality of angle values, e.g., a number of angle hypotheses to be considered.

In some demonstrative aspects, a modified steering matrix for the IAA algorithm may be defined, for example, to include a plurality of different-angle steering vectors, for example, in addition to the plurality of same-angle steering vectors, e.g., as described below.

In some demonstrative aspects, a different-angle steering vector of the plurality of different-angle steering vectors may include a steering vector corresponding to a Tx-Rx angle combination of a Tx angle or DOD, denoted $\theta_{k1}$, and an Rx angle or DOA, denoted $\theta_{k2}$, which is different from the Tx angle.

For example, a different-angle steering vector for the Tx-Rx angle combination ($\theta_{k1}$, $\theta_{k2}$), denoted $\tilde{a}_v(\theta_{k_1}, \theta_{k_2})$, may be determined, for example, based on a convolution, e.g., a Kronecker product, of a Tx steering matrix, denoted $a_t(\theta_{k1})$ corresponding to the angle $\theta_{k1}$, and an Rx steering matrix, denoted $a_r(\theta_{k2})$ corresponding to the angle $\theta_{k2}$, e.g., as follows:

$$\tilde{a}_v(\theta_{k_1}, \theta_{k_2}) = a_t(\theta_{k_1}) \otimes a_r(\theta_{k_2}) \quad (7)$$

In some demonstrative aspects, a modified steering matrix, denoted $\tilde{A}$, may be defined to include some or all of the different-angle steering vectors.

In one example, the modified steering matrix $\tilde{A}$ may be defined to include all of the different-angle steering vectors corresponding to all possible combination of the K angle values, e.g., as follows:

$$\tilde{A} = \left[\tilde{a}_v^H(\theta_{k_1}, \theta_{k_2}), \ldots, \tilde{a}_v^H(\theta_K, \theta_K)\right] \in \left[N \times K^2\right] \quad (8)$$

In some demonstrative aspects, radar processor 834 may be configured to apply to Rx data 811 the IAA, for example, using an IAA dictionary, e.g., the modified IAA dictionary, including all possible different-angle steering vectors. For example, the IAA dictionary may include all possible $K^2$ different-angle steering matrices according to Equation 8.

In some demonstrative aspects, applying the IAA using the IAA dictionary including all possible $K^2$ different-angle steering matrices may provide good MP SLL suppression performance. However, such an implementation may have high computational cost, for example, as a large number of hypotheses, e.g., K*K hypothesis, would be examined.

In one example, a number of azimuth angles to be evaluated may be 121, for example, for a FOV of 120 degrees. According to this example, applying the IAA with the IAA dictionary including all possible $K^2$ different-angle steering matrices may require evaluating 121×121=14641 azimuth angles.

Figure 17:
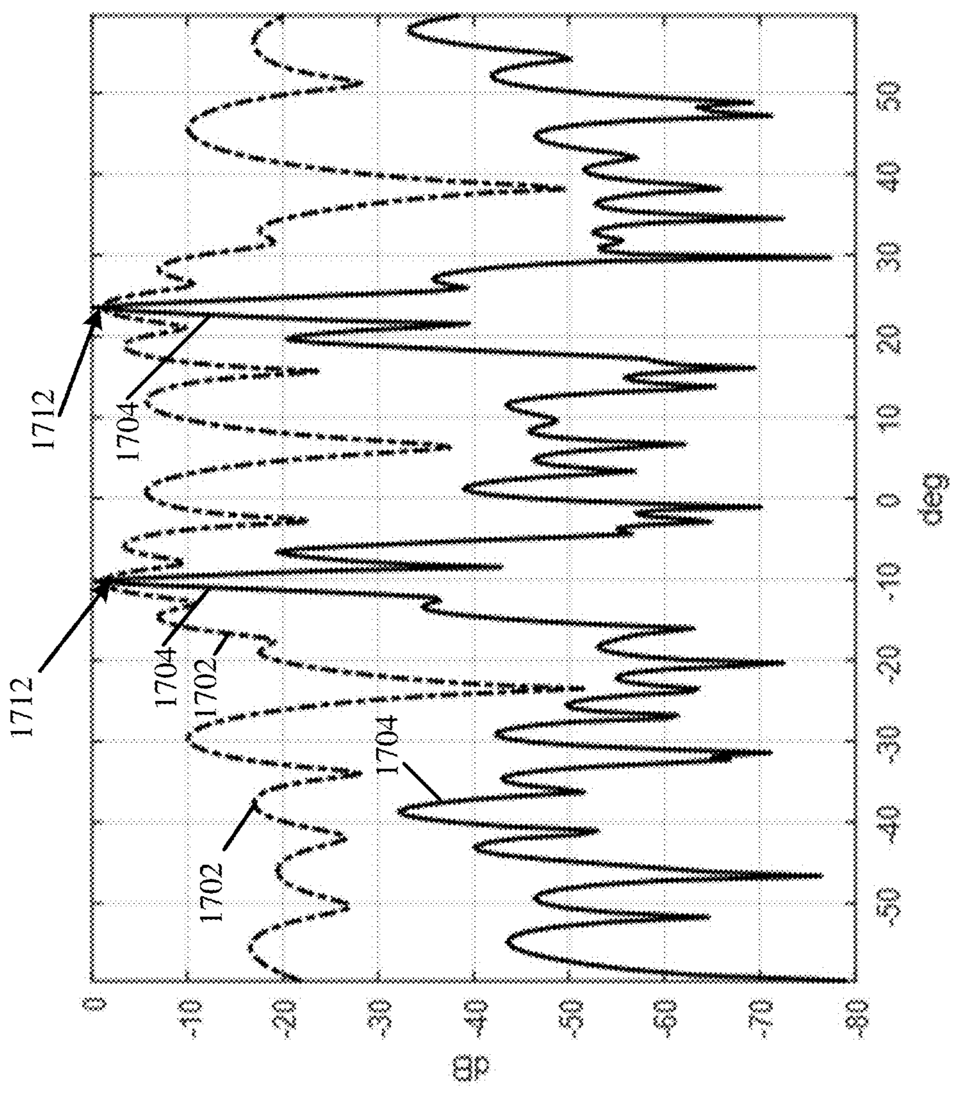
FIG. 17 is a schematic illustration of a graph depicting AoA spectrums corresponding to two different algorithms, in accordance with some demonstrative aspects.

Reference is made to FIG. 17, which schematically illustrates a graph 1700 depicting AoA spectrums corresponding to two different algorithms, in accordance with some demonstrative aspects.

In some demonstrative aspects, a curve 1702 depicts an AoA spectrum based on a 2D beamforming algorithm in an MP scenario.

In some demonstrative aspects, a curve 1704 depicts an IAA spectrum based on an IAA algorithm configured for an MP scenario using a steering matrix including a plurality of different-angle steering vectors, which correspond to all possible Tx-Rx combinations for a plurality of K angle values.

In some demonstrative aspects, as shown in FIG. 17, curve 1704 includes, for a radar object, two amplitude peaks 1712, which are above −20 dB. In contrast, curve 1702 includes a large number of amplitude peaks, e.g., corresponding to MP signals. These multiple peaks of curve 1702 may not enable an accurate detection of the radar object.

Referring back to FIG. 8, in some demonstrative aspects, radar processor 834 may be configured to apply to Rx data 811 the IAA, for example, using an IAA dictionary, e.g., the modified IAA dictionary, including only some of the possible different-angle steering vectors.

In some demonstrative aspects, radar processor 834 may be configured to select from the plurality of possible different-angle steering vectors a plurality of selected different-angle steering vectors, and to apply to Rx data 811 the IAA using an IAA dictionary including the selected different-angle steering vectors, e.g., as described below.

In some demonstrative aspects, radar processor 834 may be configured to implement a steering matrix including a plurality of selected different-angle steering vectors corresponding to a plurality of Tx-Rx angle combinations, e.g., selected from the K*K possible Tx-Rx combinations.

In one example, selecting the plurality of selected Tx-Rx angle combinations may allow, for example, to reduce a computational complexity of the IAA algorithm, for example, while maintaining MP SLL mitigation, e.g., as described below.

In some demonstrative aspects, radar processor 834 may configured to apply a 1D beamforming algorithm to the radar Rx data 811 to determine a 1D beamforming AoA spectrum, e.g., as described below.

In some demonstrative aspects, radar processor 834 may configured to identify in the 1D beamforming AoA spectrum of the 1D beamforming algorithm a plurality of peaks above a predefined threshold, e.g., as described below.

In some demonstrative aspects, radar processor 834 may configured to select a plurality of selected Tx-Rx angle combinations, e.g., from the plurality of possible Tx-Rx angle combinations, for example, based on the plurality of identified peaks. In one example, radar processor 834 may be configured to include in the plurality of selected Tx-Rx angle combinations Tx-Rx angle combination corresponding to an identified peak in the 1D beamforming AoA spectrum.

In some demonstrative aspects, radar processor 834 may be configured to define an IAA dictionary by defining a steering matrix including a plurality of selected different-angle steering vectors corresponding to the plurality of selected Tx-Rx angle combinations, e.g., as described below.

In some demonstrative aspects, radar processor 834 may be configured to define the IAA dictionary by defining the steering matrix to include K same-angle steering vectors, followed by the plurality of selected different-angle steering vectors.

In some demonstrative aspects, radar processor 834 may be configured to generate an IAA spectrum using the steering matrix, and to generate an AoA spectrum based on the IAA spectrum, e.g., as described below.

In some demonstrative aspects, radar processor 834 may be configured to generate the AoA spectrum, for example, by selecting first K elements from the IAA spectrum, e.g., as described below.

In one example, radar processor 834 may be configured to apply the IAA algorithm according to one or more of the following operations:

Perform 1D BF

Find peaks above a predefined threshold, e.g. −20 dB, or any other threshold.

Select Ks angle candidates, for example, based on budget, SLL needs and/or any other parameter, e.g. according to the following selection criteria and/or any other criteria:

a. Select 1 point for each peak b. Select 2 points for each peak, the points $([k_0, \max(k_{-1}, k_1)])$, wherein $k_0$ denotes a peak, $k_{-1}$ denotes a point on the left of the peak, and $k_1$ denotes a point on the right of the peak.

c. Select 3 points for each peak, e.g., the points $[k_{-1}, k_0, k_1])$

Construct a dictionary based on the K same-angle steering vectors and the selected Ks angles, e.g., the dictionary $\tilde{A} \in [N \times (K + K_s > K_s)]$.

Calculate the IAA Spectrum, e.g., $\tilde{p}_{IAA}(\tilde{\theta}) = IAA(x, \tilde{A})$ wherein $\tilde{p}_{IAA}(\tilde{\theta}) \in [(K + K_s \times K_s) \times 1]$ Take first K elements of the IAA spectrum, e.g., $\tilde{p}_{IAA}(\theta) = [\tilde{p}_{IAA}(\tilde{\theta})]_{1:K}$ In another example, radar processor 834 may apply some of the operations of the above IAA algorithm, and/or one or more additional or alternative operations.

Figure 18:
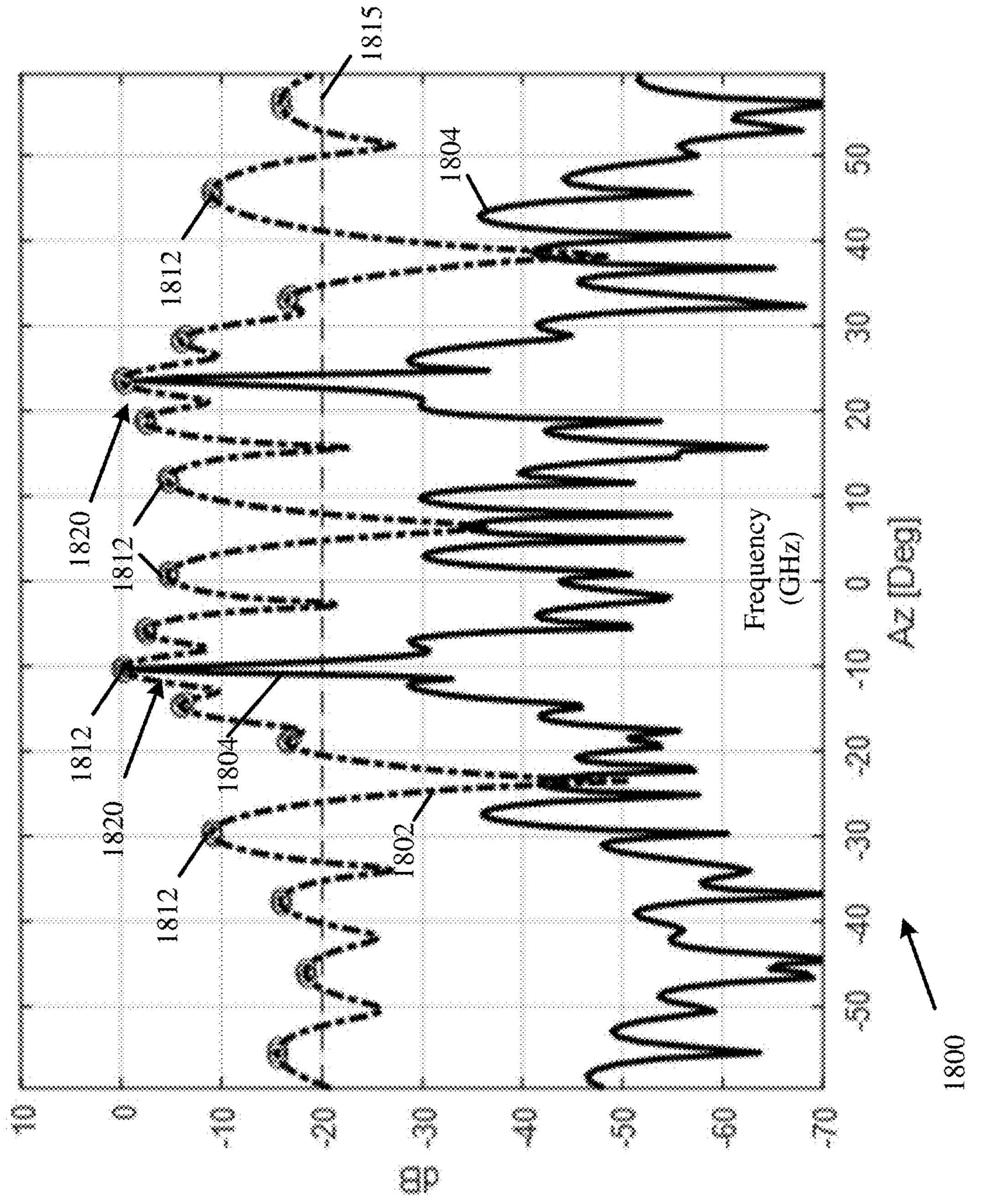
FIG. 18 is a schematic illustration of a graph depicting a plurality of AoA spectrums, in accordance with some demonstrative aspects.

Reference is made to FIG. 18, which schematically illustrates a graph 1800 depicting a plurality of AoA spectrums, in accordance with some demonstrative aspects.

For example, a curve 1802 depicts an AoA spectrum based on the 1D BF algorithm.

For example, as shown in FIG. 18, a plurality of peaks 1812, which may be above a predefined threshold 1815, may be identified, e.g., by radar processor 834 (FIG. 8), for example, for selecting the different-angle steering vectors to be included in the IAA dictionary.

In some demonstrative aspects, radar processor 834 (FIG. 8) may determine Ks selected angle values based on the plurality of peaks 1812, e.g., as described above.

In some demonstrative aspects, a curve 1804 depicts an AoA spectrum, for example, based on the IAA algorithm using the steering matrix including K same-angle steering vectors, followed by a plurality selected different-angle steering vectors, e.g., Ks*Ks different-angle steering vectors, which are selected based on the plurality of peaks 1812.

In some demonstrative aspects, radar processor 834 (FIG. 8) may determine the AoA spectrum, e.g., curve 1804, to include first K elements of the IAA spectrum.

In some demonstrative aspects, as shown in FIG. 18, the resulting AoA spectrum based on the IAA algorithm using the Ks selected angles may include two amplitude peaks 1820, which are above −20 dB corresponding to a radar object.

Figure 19:
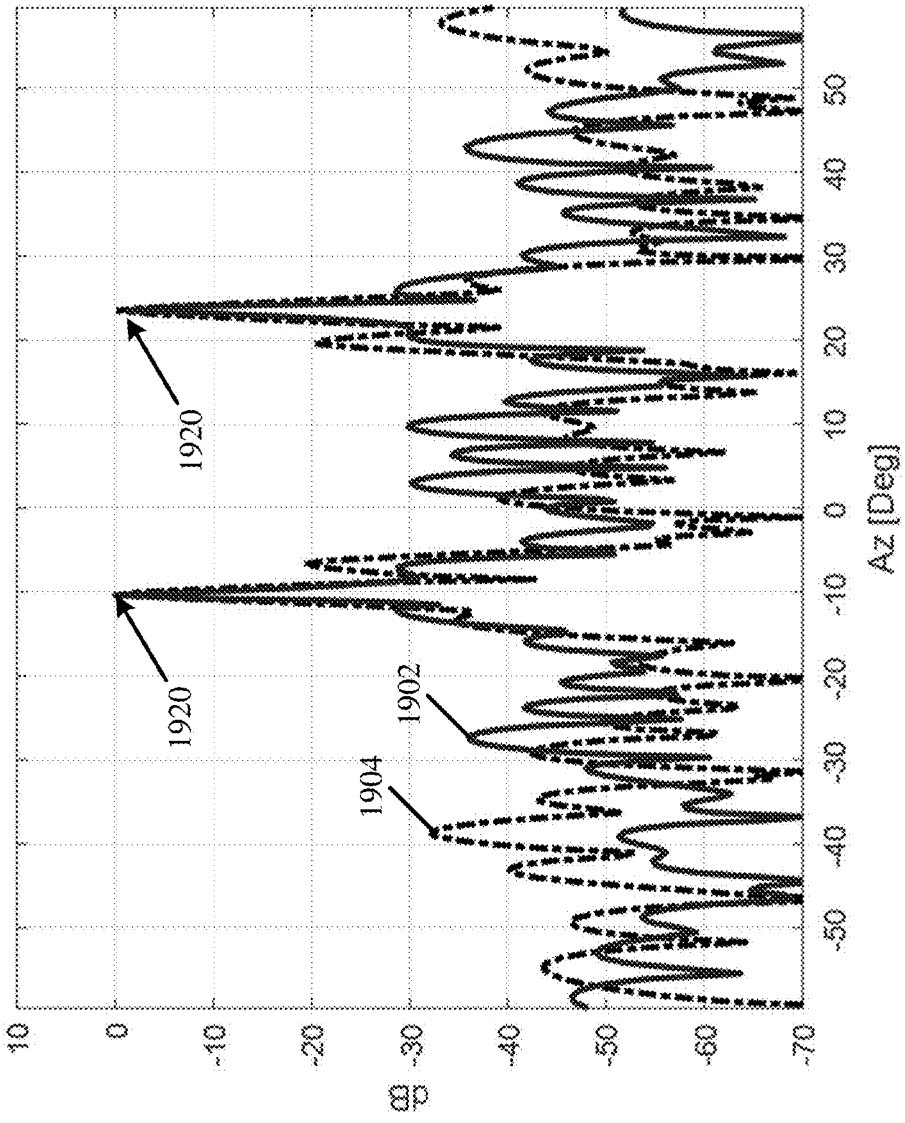
FIG. 19 is a schematic illustration of a graph depicting AoA spectrums using different counts of different-angle steering vectors, in accordance with some demonstrative aspects.

Reference is made to FIG. 19, which schematically illustrates a graph 1900 depicting AoA spectrums using different counts of different-angle steering vectors, in accordance with some demonstrative aspects.

For example, a curve 1902 depicts an AoA spectrum according to an IAA algorithm using all possible 121*121=14641 possible steering vectors corresponding to all possible Tx-Rx combinations for a set of 121 possible angle values.

For example, a curve 1904 depicts an AoA spectrum according to an IAA algorithm using 121 same-angle steering vectors and 18*18=364 selected different-angle steering vectors.

In some demonstrative aspects, as shown in FIG. 19, curves 1904 and 1902 represent similar performance. For example, both curves 1904 and 1902 may include substantially the same two amplitude peaks 1920, which are above −20 dB corresponding to a radar object, and a similar PSLL, e.g., PSLL>35 dB.

Figure 20:
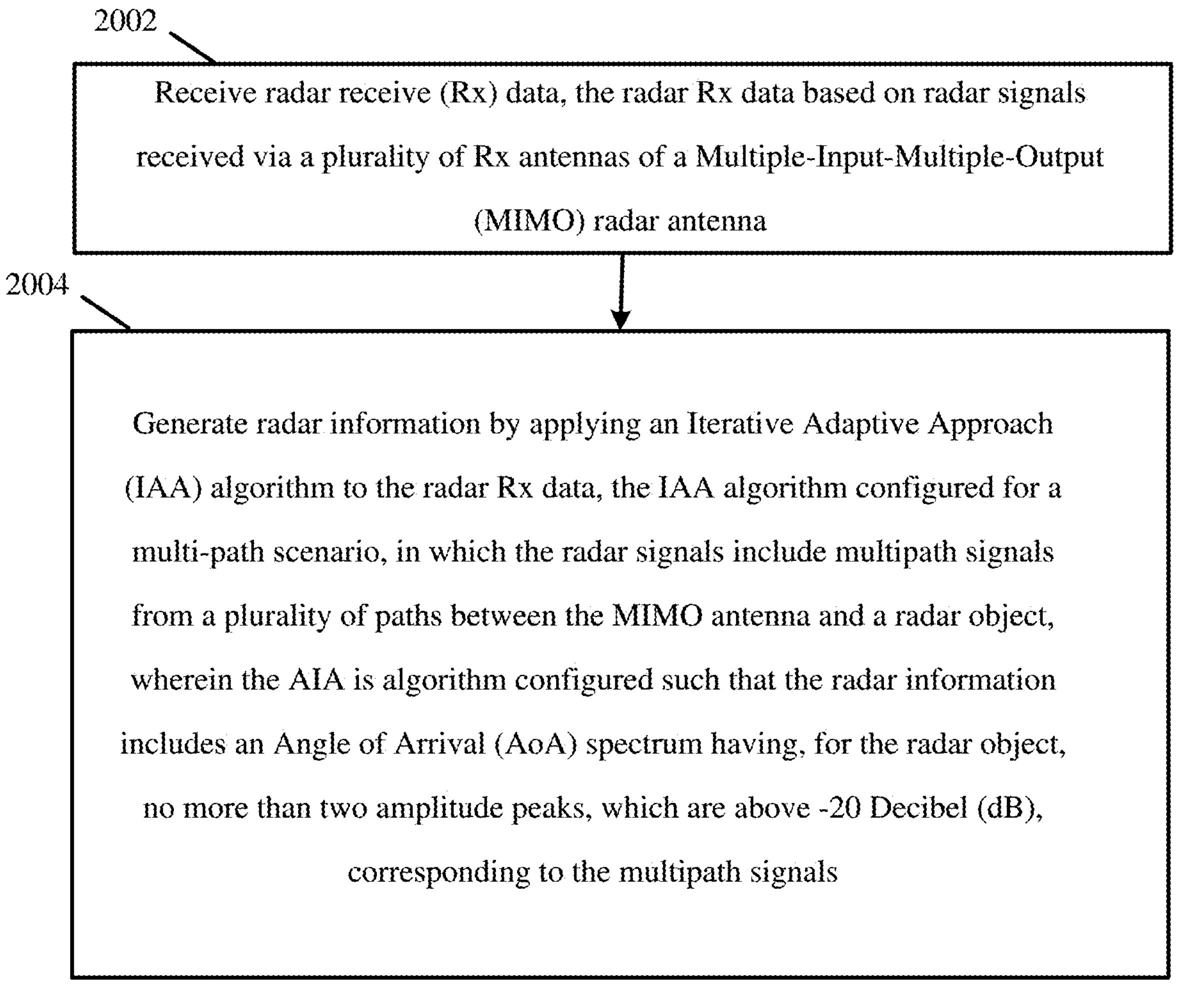
FIG. 20 is a schematic flow-chart illustration of a method of generating radar information according to an Iterative Adaptive Approach (IAA) algorithm, in accordance with some demonstrative aspects.

Reference is made to FIG. 20, which schematically illustrates a method of generating radar information according to an IAA algorithm, in accordance with some demonstrative aspects. For example, one or more of the operations of the method of FIG. 20 may be performed by a radar processor, e.g., radar processor 834 (FIG. 8).

As indicated at block 2002, the method may include receiving radar Rx data, the radar Rx data based on radar signals received via a plurality of Rx antennas of a MIMO radar antenna. For example, radar processor 834 (FIG. 8) may receive the radar Rx data 811 (FIG. 8) based on radar signals received via a plurality of Rx antennas 816 (FIG. 8), e.g., as described above.

As indicated at block 2004, the method may include generating radar information by applying to the radar Rx data an IAA algorithm configured for a multi-path scenario, in which the radar signals include multipath signals from a plurality of paths between the MIMO antenna and a radar object. For example, the IAA algorithm may be configured such that the radar information includes an AoA spectrum having, for the radar object, no more than two amplitude peaks, which are above −20 dB, corresponding to the multipath signals. For example, radar processor 834 (FIG. 8) may generate the radar information 813 (FIG. 8) by applying the IAA algorithm to the radar Rx data 811 (FIG. 8), e.g., as described above.

Referring to FIG. 8, in some demonstrative aspects, radar processor 834 may be configured to estimate a target position in a 4D space, which may be represented, e.g., in polar coordinates, by a range, an azimuth (Az), an elevation (El), and a Velocity (V), e.g., as described below. In other aspects, any other representation may be used.

In some demonstrative aspects, radar processor 834 may be configured to generate radar information 813 based on radar Rx data 811. For example, radar processor 834 may be configured to generate radar information 813 including a 2 Dimensional (2D) Angle of Arrival (AoA) spectrum over an Azimuth-Elevation domain, e.g., including an azimuth AoA spectrum and an elevation AoA spectrum. For example, the AoA spectrum over the Azimuth-Elevation domain may be utilized to estimate an Azimuth and/or an Elevation of a target.

In some demonstrative aspects, the 2D AoA spectrum over the Azimuth-Elevation domain may represent a power distribution for different azimuths and/or elevations. For example, peaks in the 2D AoA spectrum may represent potential targets.

In some demonstrative aspects, radar Rx data 811 may include a radar frame based on the radar Rx signals received via MIMO radar antenna 881.

In some demonstrative aspects, the radar frame may correspond to a plurality of range values, a plurality of Doppler values, a plurality of Rx channels, and a plurality of Tx channels.

In some demonstrative aspects, the plurality of range values may include a plurality of range bins, which may be configured based on a setting and/or implementation of a radar device implementing radar processor 834, e.g., radar device 101 (FIG. 1).

In some demonstrative aspects, the plurality of Doppler values may include a plurality of Doppler bins, which may be configured based on a setting and/or implementation of the radar device implementing radar processor 834, e.g., radar device 101 (FIG. 1).

In some demonstrative aspects, the plurality of Rx channels may correspond to the plurality of Rx antennas 816 and/or Rx chains 831.

In some demonstrative aspects, the plurality of Tx channels may correspond to the plurality of Tx antennas 814 and/or Tx chains 810.

In some demonstrative aspects, a range-Doppler-bin may correspond to a combination of a range value of the plurality of range values and a Doppler value of the plurality of Doppler values. For example, the range-Doppler bin may include radar data corresponding to the range value and the Doppler value.

In some demonstrative aspects, radar processor 834 may be configured to process radar data of a range-Doppler bin of the plurality of range-Doppler bins, for example, to generate AoA spectrum information of the range-Doppler bin, e.g., as described below.

In some demonstrative aspects, there may be a need to address one or more technical disadvantages, inefficiencies, and/or problems, for example, with respect to implementation of methods of spectrum analysis of the 2D AoA spectrum, e.g., in some use cases, implementations and/or scenarios, e.g., as described below.

For example, some linear angular processing methods and/or conventional super-resolution methods, MUSIC, CAPON or the like, may provide an estimated AoA spectrum having an angular resolution, which may be limited in an angular domain, for example, by an aperture size of a physical antenna array, and/or a number of snapshots implemented for generating the estimated AoA spectrum.

For example, when implementing a plurality of snapshots to estimate the AoA spectrum, a single radar frame may be divided into a plurality of incoherent segments of measurement, which may result in an estimated AoA spectrum having a degraded Doppler resolution and/or loss of coherent processing gain, e.g., a low SNR.

For example, some super resolution algorithms may use a plurality of measurement snapshots to generate an estimated AoA. The use of a plurality of snapshots may increase a measurement time and/or a computational complexity. In some cases, the additional measurement time may not be acceptable, e.g., for an automotive radar implementation, which may require a high refresh rate, for example, for supporting highly dynamic traffic scenarios.

For example, some algorithms, e.g., Iterative Adaptive Approach (IAA) based algorithms, may be implemented to generate an estimated AoA spectrum based on a single snapshot. In one example, the IAA-based algorithms may be configured to provide a robust super-resolution AoA spectrum in a single snapshot with various antenna arrays. However, the IAA-based algorithms may require a high computational complexity, for example, when applied with respect to non-uniform antenna arrays.

In some demonstrative aspects, radar processor 834 may be configured to generate the AoA spectrum information, for example, even based on a single snapshot of the radar frame, for example, with reduced computational complexity.

In some demonstrative aspects, radar processor 834 may be configured to generate the AoA spectrum information, for example, even based on a single snapshot of the radar frame, for example, while supporting both a uniform MIMO radar antenna implementation as well as a non-uniform MIMO radar antenna implementation, e.g., as described below.

In some demonstrative aspects, MIMO radar antenna 881 may include a non-uniform MIMO radar antenna, and radar processor 834 may be configured to generate the AoA spectrum information, e.g., even based on a single snapshot of a radar frame, which is based on radar signals communicated by the non-uniform MIMO radar antenna.

In some demonstrative aspects, MIMO radar antenna 881 may include a uniform MIMO radar antenna, and radar processor 834 may be configured to generate the AoA spectrum information, e.g., even based on a single snapshot of a radar frame, which is based on radar signals communicated by the uniform MIMO radar antenna.

In one example, a snapshot of the radar frame may include a radar measurement, e.g., of the radar Rx data 811, having a coherency in one or more relevant dimensions. For example, the snapshot of the radar frame may include a radar frame measurement of a received radar frame of a sequence of coherently transmitted radar chirps, for example, a sequence of coherently transmitted Frequency-Modulated Continuous Wave (FMCW) chirps and/or any other type of chirps, e.g., with a coherent reference phase.

In some demonstrative aspects, radar processor 834 may be configured to generate the AoA spectrum information based on a sparse Bayesian learning method, e.g., as described below.

In some demonstrative aspects, the sparse Bayesian learning method may be configured to support a MIMO radar system utilizing a uniform MIMO antenna array or a non-uniform MIMO antenna array, e.g., as described below.

In some demonstrative aspects, radar processor 834 may be configured to utilize the sparse Bayesian learning method to provide an AoA spectrum with a high resolution, e.g., a super resolution AoA spectrum, e.g., as described below.

In some demonstrative aspects, radar processor 834 may be configured to utilize the sparse Bayesian learning method to provide a technical solution of achieving both super-resolution and compressed reconstruction, for example, in one unified pipeline, for example, even with single snapshot measurement, e.g., as described below.

In some demonstrative aspects, radar processor 834 may be configured to utilize the sparse Bayesian learning method to provide a technical advantage of sparse reconstruction results, which may simplify, or even completely avoid, a use of a target detector in the angular domain. For example, the ability to simplify or even avoid the use of the target detector in the angular domain may provide a technical advantage of reduced overall computation complexity.

In some demonstrative aspects, radar processor 834 may be configured to determine an AoA spectrum based on a Sparse Bayesian Learning (SBL) algorithm, which may be configured to support a MIMO radar system utilizing either type of a uniform antenna array or a non-uniform antenna array, e.g., as described below.

In some demonstrative aspects, the SBL algorithm may be configured to support a MIMO radar system utilizing a MIMO antenna array, e.g., MIMO antenna array 881, having a small physical array aperture size. In one example, MIMO antenna array 881 may have a physical array apertures size, which may be allowed to be smaller than a Nyquist aperture size. process radar data of a range-Doppler bin of the plurality of range-Doppler bins according to a plurality of iterations of an SBL algorithm to generate AoA spectrum information of the range-Doppler bin, e.g., as described below.

In some demonstrative aspects, radar processor 834 may be configured to apply the SBL algorithm in the angular domain, for example, to resolve a location of targets and/or to estimate complex-valued reflectance of the targets, e.g., as described below.

In some demonstrative aspects, radar processor 834 may be configured to process the radar data of the range-Doppler bin to generate the AoA spectrum information of the range-Doppler bin, for example, based on a single snapshot of the radar frame, e.g., as described below.

In one example, the single snapshot may include a radar frame measurement of the radar frame having a coherency in one or more relevant dimensions, e.g., as described above.

In some demonstrative aspects, radar processor 834 may be configured to perform an iteration of the SBL algorithm, for example, by performing one or more beamforming (BF) operations to determine BF information based, for example, on a first steering matrix, e.g., as described below.

In some demonstrative aspects, radar processor 834 may be configured to perform the iteration of the SBL algorithm, for example, by performing one or more SBL operations to determine SBL information, for example, based on the BF information and a second steering matrix e.g., as described below.

In some demonstrative aspects, the first steering matrix may include one of a Tx steering matrix of a Tx array or an Rx steering matrix of an Rx array, e.g., of MIMO radar antenna 881, e.g., as described below.

In some demonstrative aspects, the second steering matrix may include another steering matrix of the Tx steering matrix or the Rx steering matrix.

In some demonstrative aspects, the first steering matrix may include the Tx steering matrix, and the second steering matrix may include the Rx steering matrix, e.g., as described below.

In other aspects, the first steering matrix may include the Rx steering matrix, and the second steering matrix may include the Tx steering matrix.

In some demonstrative aspects, the one or more BF operations may include, for example, a reconstruction operation to reconstruct the radar data of the range-Doppler bin, for example, based on the first steering matrix, e.g., as described below.

In some demonstrative aspects, the one or more BF operations may include, for example, an estimation operation to estimate a noise variance of the radar data of the range-Doppler bin, for example, based on the first steering matrix and reconstructed radar data of the range-Doppler bin, e.g., as described below.

In some demonstrative aspects, the one or more SBL operations may include, for example, a covariance estimation operation to estimate a covariance matrix for the SBL iteration, for example, based on the second steering matrix, e.g., as described below.

In some demonstrative aspects, the one or more SBL operations may include, for example, a radar data estimation operation to determine estimated AoA data of the range-Doppler bin, for example, based on the second steering matrix and an inverse of the covariance matrix, e.g., as described below.

In some demonstrative aspects, the one or more SBL operations may include, for example, a power spectrum operation to estimate a power spectrum, for example, based on the estimated AoA data of the range-Doppler bin, e.g., as described below.

In some demonstrative aspects, radar processor 834 may be configured to process the Rx data as Rx data of a virtual MIMO antenna, which may be based, for example, on a convolution of the Tx array and the Rx array of MIMO radar antenna 881, e.g., as described below.

In some demonstrative aspects, radar processor 834 may be configured to determine a plurality of antenna subarrays of the virtual MIMO antenna, e.g., as described below.

In some demonstrative aspects, the plurality of antenna subarrays of the virtual MIMO antenna may include, for example, a plurality of respective rows of the virtual MIMO antenna, e.g., as described below.

In some demonstrative aspects, the plurality of antenna subarrays of the virtual MIMO antenna may include, for example, a plurality of respective columns of the virtual MIMO antenna, e.g., as described below.

In other aspects, the plurality of antenna subarrays of the virtual MIMO antenna may include any other arrangement and/or partitioning of antennas of the virtual MIMO antenna.

In some demonstrative aspects, radar processor 834 may be configured to apply the SBL algorithm to the plurality of antenna subarrays, e.g., as described below.

In some demonstrative aspects, radar processor 834 may be configured to sequentially apply the SBL algorithm to the plurality of antenna subarrays, for example, according to a first SBL implementation, e.g., as described below.

In some demonstrative aspects, radar processor 834 may be configured to apply the SBL algorithm to the plurality of antenna subarrays in parallel, for example, according to a second SBL implementation, e.g., as described below.

In some demonstrative aspects, radar processor 834 may be configured, e.g., according to the second SBL implementation, for example, to determine a plurality of power spectrums corresponding to the plurality of antenna subarrays, for example, based on the second steering matrix, e.g., as described below.

In some demonstrative aspects, radar processor 834 may be configured to determine an average estimated power spectrum, for example, based on a combination of the plurality of power spectrums, e.g., as described below.

In some demonstrative aspects, radar processor 834 may be configured to determine an average estimated power spectrum, for example, based on an average, e.g., a weighted average, or any other average or combination, of the plurality of power spectrums, e.g., as described below.

In some demonstrative aspects, radar processor 834 may be configured to determine an average estimated power spectrum, for example, based on a weighted average, or any other average or combination, of the plurality of power spectrums, e.g., as described below.

In some demonstrative aspects, radar processor 834 may be configured, e.g., according to the second SBL implementation, for example, to perform the one or more SBL operations including a power estimation operation to estimate a power spectrum corresponding to an antenna subarray, for example, based on the average estimated power spectrum, e.g., as described below.

In some demonstrative aspects, radar processor 834 may be configured, e.g., according to the second SBL implementation, for example, to perform the one or more SBL operations including a radar data estimation operation to estimate radar data corresponding to the antenna subarray, for example, based on the average estimated power spectrum, e.g., as described below.

In some demonstrative aspects, performing the one or more BF operations based on the first steering matrix, e.g., the Tx steering matrix, and performing the one or more SBL operations based on the second steering matrix, e.g., the Rx steering matrix, or vice versa, may provide a technical solution to reduce a computational complexity of the SBL algorithm.

In some demonstrative aspects, radar processor 834 may perform the one or more BF operations, based on the first steering matrix, and the one or more SBL operations based on the second steering matrix, for example, instead of performing both the BF operations and the SBL operations based on a same steering matrix, e.g., a steering matrix of the virtual MIMO antenna.

For example, the steering matrix of the virtual MIMO antenna may be based on a product, e.g., a Khatri-Rao product, of the Tx steering matrix and the Rx steering matrix. Accordingly, dimensions of the steering matrix of the virtual MIMO antenna may be greater than the dimensions of each of the Tx steering matrix and/or the Rx steering matrix. Therefore, implementing the Tx steering matrix and the Rx steering matrix, e.g., instead of the steering matrix of the virtual MIMO antenna, may support reduced computational complexity of the SBL algorithm.

In some demonstrative aspects, radar processor 834 may be configured to apply a singular value decomposition (SVD) to the radar Rx data 811, e.g., as described below. apply the SVD to the radar Rx data, for example, before applying the plurality of iterations of the SBL algorithm, e.g., as described below.

In some demonstrative aspects, in some cases, applying the SVD to the radar Rx data prior to performing the iterations of the SBL algorithm may support, for example, further reduction of the computational complexity of the SBL algorithm.

In some demonstrative aspects, the operation of applying the SVD on the Rx data may be optional. For example, processor 834 may be configured to perform the plurality of iterations of the SBL algorithm based on the radar Rx data, for example, without applying the SVD.

In some demonstrative aspects, radar processor 834 may be configured to reshape radar data of the range-Doppler bin, e.g., as described below.

In some demonstrative aspects, radar processor 834 may be configured to reshape the radar data of the range-Doppler bin, for example, before applying the plurality of iterations of the SBL algorithm, e.g., as described below.

In some demonstrative aspects, radar processor 834 may be configured to apply the SVD on the radar Rx data, for example, after reshaping the radar data of the range-Doppler bin, e.g., as described below.

In some demonstrative aspects, radar processor 834 may be configured to apply the SVD, for example, to reduce a dimension of the steering matrix of the virtual MIMO radar antenna, and/or to perform array decomposition of the virtual MIMO radar antenna.

In some demonstrative aspects, the SVD may be implemented by an SVD subspace-based dimensional reduction algorithm, e.g., as described below.

In one example, the SVD subspace-based dimensional reduction algorithm may be implemented to reduce a computation complexity, e.g., to a practical level for implementation in automotive radar systems, for example, while preserving satisfactory performance. determine Rx data of a reduced virtual MIMO antenna by applying the SVD on the radar Rx data 811, e.g., as described below.

In some demonstrative aspects, radar processor 834 may be configured to perform the plurality of iterations of the SBL algorithm, for example, based on the Rx data of the reduced virtual MIMO antenna, e.g., as described below.

In some demonstrative aspects, radar processor 834 may be configured to determine the Tx steering matrix and/or the Rx steering matrix, for example, based on the reduced virtual MIMO antenna, e.g., as described below.

In some demonstrative aspects, radar processor 834 may be configured to determine the Tx steering matrix and the Rx steering matrix based, for example, on the reduced virtual MIMO antenna, e.g., as described below.

In some demonstrative aspects, performing the SBL based on the Tx steering matrix and the Rx steering matrix, which are determined based on the reduced virtual MIMO antenna, may provide a technical advantage of reducing the computational complexity of the SBL algorithm, e.g., in addition to the reduction of the computational complexity provided by the SBL algorithm.

In some demonstrative aspects, radar processor 834 may be configured to process the radar Rx data as a radar signal, denoted Y, of a virtual MIMO antenna, e.g., a virtual MIMO antenna of MIMO radar antenna 881, having M rows and N columns.

In some demonstrative aspects, radar processor 834 may be configured to reshape the radar signal Y, e.g., as described below.

In some demonstrative aspects, radar processor 834 may be configured to determine a plurality of subarrays, e.g., a plurality of rows, of the virtual MIMO antenna. For example, the radar signal may be rearranged, for example, for an AoA estimation, e.g., as follows:

$$Y = [y_1 y_2, \dots, y_M] \tag{9}$$

wherein $y_i$ denotes a received radar signal via an i-th row of the virtual MIMO radar antenna.

In some demonstrative aspects, a signal model of the radar signal for the i-th row of the virtual MIMO array may be defined, for example, following a steering vector convention, e.g., as follows:

$$y_i = Ax_i + n_i \tag{10}$$

wherein A denotes the steering matrix of the virtual MIMO radar antenna, $n_i$ denotes additive white Gaussian noise (AWGN) of the i-th row, and $x_i$ denotes an angular response, e.g., reflectance and/or phase vector, of a received signal, which may be reflected from targets and may be estimated on the i-th row.

In some demonstrative aspects, a signal model for the radar signal Y of the MIMO radar antenna, may be defined, for example, based on Equation 10, e.g., as follows:

$$Y = AX + N \tag{11}$$

In some demonstrative aspects, radar processor 834 may be configured to apply the SVD to the radar signal Y, e.g., as described below.

In some demonstrative aspects, the SVD may be applied to the radar signal Y received via the MIMO radar antenna, for example, to provide:

$$Y = USV^H \tag{12}$$

In some demonstrative aspects, a projected radar signal, denoted, Ỹ, corresponding to the reduced MIMO radar antenna may be defined, for example, based on the matrix U, for example, based on a matrix of largest singular values, denoted Ur, which may be formed by taking the columns of the matrix U corresponding to the largest singular values.

In some demonstrative aspects, the reduced radar signal, e.g., an array response matrix, may be projected to a subspace, for example, based on the matrix of largest singular values $U_r$, e.g., as follows:

$$\tilde{Y} = U_T^H Y = \underbrace{U_T^H A}_{\tilde{A}} X + \underbrace{U_r^H N}_{\tilde{N}} \tag{13}$$

In some demonstrative aspects, the projected radar signal Ỹ for the MIMO radar antenna, for example, after applying the SVD, may be determined, e.g., as follows:

$$\tilde{Y} = \tilde{A}X + \tilde{N} \tag{14}$$

wherein Ã denotes a reduced steering matrix of the reduced virtual MIMO radar antenna, which may be defined, e.g., as follows:

$$\tilde{A} = [\tilde{a}(\theta_1), \ldots, \tilde{a}(\theta_K)] = [U_r a(\theta_1), U_r a(\theta_2), \ldots U_r a(\theta_K)] \tag{15}$$

wherein K denotes a number of angular hypothesis for the AoA spectrum estimation.

In some demonstrative aspects, a covariance matrix, denoted Rr, of the reduced virtual MIMO radar antenna may be determined, for example, based on the reduced matrix of largest singular values $U_r$. e.g., as follows:

$$R_r = U_r^H R U_r \tag{16}$$

In some demonstrative aspects, applying the SVD to the virtual MIMO radar antenna may reduce a dimension of the covariance matrix R, for example, from a size of N×N, e.g., corresponding to the size of the virtual MIMO antenna, to a size of r×r, e.g., corresponding to the size of the matrix of largest singular values $U_r$ resulting from the SVD. Accordingly, a computation complexity for matrix inversion of the covariance matrix R may be reduced, e.g., from $o(N^3)$ to $o(r^3)$.

In one example, radar processor 834 may be configured to apply the SBL algorithm on the reduced radar signal Ỹ, for example, after applying the SVD; or on the radar signal Y, for example, without applying the SVD, e.g., as described below.

In some demonstrative aspects, radar processor 834 may be configured to apply the SBL algorithm to the radar Rx data 811, for example, in one dimension of the azimuth-elevation domain, followed by applying the SBL algorithm on the other dimension of the azimuth-elevation domain, e.g., as described below.

In one example, a signal model of a signal, denoted y, received via a MIMO radar antenna may be defined, e.g., as follows:

$$y = (A_{rx} * A_{tx})x + n = A_{vir}x + n \in \mathbb{C}^{1\times(MN)} \tag{17}$$

wherein $A_{rx}$ denotes the Rx steering matrix, $A_{tx}$ denotes the Tx steering matrix, * denotes a product, e.g., a Khatri-Rao product, and $A_{vir}$ denotes the steering matrix of the virtual MIMO antenna.

According to this example, an SBL algorithm may be performed based on the virtual steering matrix $A_{vir}$ of the virtual MIMO radar antenna, which may be based on a product, e.g., a Khatri-Rao product, of the Rx steering matrix and the Tx Steering matrix. For example, performing the SBL algorithm based on the steering matrix $A_{vir}$ may increase a computational complexity of the SBL algorithm. For example, a direct application of a single-shot AoA algorithm using the steering matrix $A_{vir}$, may result in an impractical computational complexity.

In some demonstrative aspects, radar processor 834 may be configured to apply the SBL algorithm to the radar Rx data 811, for example, based on a modified equation, which may be defined, for example, without loss of generality, with respect to the m-th row of an array of the MIMO radar antenna, e.g., as follows:

$$Y = A_{rx}\mathrm{diag}(x)A_{tx}^H + N = A_{rx}X + N \in \mathbb{C}^{N\times M} \tag{18}$$

$$\text{wherein } X = \mathrm{diag}(x)A^{(tx)} = [x_1, \ldots, x_M].$$

In some demonstrative aspects, performing the SBL algorithm, e.g., based on the modified definition of Equation 18, may reduce a dimension of the covariance matrix. For example, one or more SBL operations of the SBL algorithm may be performed based on the Rx steering matrix, for example, instead of performing the one or more SBL operations based on the virtual steering matrix. For example, this reducing of the dimension of the covariance matrix may reduce the computational complexity of the SBL algorithm.

In some demonstrative aspects, performing the SBL algorithm, e.g., based on the modified definition of Equation 18, may allow performing one or more BF operations based on the Tx steering matrix, for example, instead of performing the one or more BF operations based on the virtual steering matrix. Accordingly, this modification may allow reducing the computational complexity of the SBL algorithm.

In one example, the SBL algorithm may be implemented, for example, according to one or more of the following operations:

TABLE 2

| | # | Step | Operation Pseudo-code | Description |
|---|---|---|---|---|
| Inputs | | | $A_{rx}$, $A_{tx}$, Y<br>a: A tunable hyper-parameter | Inputs to algorithm |
| Initialization | 1<br>2 | Initialize $x_0$ | , $X = X_0$<br>$x_0 = sum(A_{tx}{}^H \circ X_0)$,<br>$x = x_0$ | Initialize $x_0$ by DBF. ° denotes element-wise product. Sum(.) computes summation along first dimension of a matrix |
| | 3 | Initialize p | $p = abs(x_0)^2/(1 + 2a)$<br>$p2 = p.^\wedge 2$ | Initialize variance estimate of x |
| For each row of the array, Iterate until convergence. | 4 | Compute $Y_{rec}$ | | Reconstruct received signal based on estimated x |
| | 5 | Compute $n_0$ | $n_0 = \lvert Y - Y_{rec}\rvert_F{}^2/(\lvert Y\rvert_0 - sum(g))$ | Update noise variance |
| | 6 | Compute R | $R = n_0 I + A_{rx} diag(p) A_{rx}{}^H$ | Update signal covariance |
| | 7 | Inverse R | $R^{-1}$ | |
| | 8 | Update X | $x = p \circ (A_{rx}{}^H R^{-1} Y)$<br>$x = sum_{row}(A_{tx}{}^H, \circ X)$ | $SUM_{row}(\ )$ compute summation of matrix row-wise |
| | 9 | Update | $\Sigma_{ii} = p - p_2 \circ diag(A_{rx}{}^H R^{-1} A_{rx})$ | Update diagonal element of covariance of x |
| | 10 | Update $g_i$, | $g = 1 - \Sigma_{ii}./p$ | Update the reweighting factor for power spectrum |
| | 11 | Calculate p | $p = abs(x)^2/(g + 2a)$ | Update power spectrum estimate |
| | 12 | Alternative Step 2 | Smooth p by taking weighted sum of p's of multiple subarrays. | |

For example, the SBL algorithm may implement some or all of the operations of the algorithm of Table 2, and/or one or more additional or alternative operations.

In some demonstrative aspects, the SBL algorithm may include estimating an initial spectrum, denoted $X_0$, for example, based on the received signal Y, and the Rx steering matrix $A_{rx}$, e.g., as shown in line 1 of Table 2; and computing a sum of the initial spectrum along a first dimension of the azimuth-elevation dimension, e.g., as shown in line 2 of Table 2.

In some demonstrative aspects, the SBL algorithm may include estimating a power spectrum, denoted p, for example, based on the initial spectrum $x_0$, e.g., as shown in line 3 of Table 2.

In some demonstrative aspects, the SBL algorithm may include performing an iterative estimation, e.g., as shown in lines 4-11 of Table 2, to iteratively estimate the power spectrum p, for example, until reaching a suitable convergence criterion.

In some demonstrative aspects, an iteration of the SBL algorithm may include one or more BF operations to determine BF information based on the Tx steering matrix, e.g., as shown in lines 4-5 of Table 2; and performing one or more SBL operations to determine SBL information based on the BF information and the Rx steering matrix e.g., as shown in lines 6-11 of Table 2.

In some demonstrative aspects, the one or more BF operations may include a reconstruction operation to reconstruct the radar data Yrec of the range-Doppler bin, for example, based on the Tx steering matrix, e.g., as shown in line 4 of Table 2.

In some demonstrative aspects, the one or more BF operations may include an estimation operation to estimate a noise variance, denoted no, of the radar data of the range-Doppler bin, for example, based on the Tx steering matrix and the reconstructed radar data Yrec, e.g., as shown in line 5 of Table 2.

In some demonstrative aspects, the one or more SBL operations may include a covariance estimation operation to estimate the covariance matrix R, for example, based on the Rx steering matrix, e.g., as shown in line 6 of Table 2.

In some demonstrative aspects, the one or more SBL operations may include inversion of the covariance matrix R, e.g., as shown in line 7 of Table 2.

In some demonstrative aspects, the one or more SBL operations may include an AoA data estimation operation to determine the estimated AoA data X of the range-Doppler bin, for example, based on the Rx steering matrix and the inverse of the covariance matrix R, e.g., as shown in lines 7-8 of Table 2.

In some demonstrative aspects, the one or more SBL operations may include updating diagonal elements of the covariance matrix R, for example, based on a diagonal of the Rx steering matrix e.g., as shown in line 9 of Table 2.

In some demonstrative aspects, the one or more SBL operations may include updating weight factors, denoted g, for the power spectrum p, for example, based on the diagonal elements of the covariance matrix R, e.g., as shown in line 10 of Table 2.

In some demonstrative aspects, the one or more SBL operations may include estimating the power spectrum p, for example, based on the weight factors g, e.g., as shown in line 11 of Table 2.

In some demonstrative aspects, when the power spectrum estimation p is obtained, the COV matrix may be re-estimated again, and so on, for example, until reaching convergence. For example, as the iterations continue, the spectrum estimation p may improve, and as a result, the COV matrix estimation R may also improve.

In some demonstrative aspects, the SBL algorithm may be applied to the plurality of antenna subarrays of the MIMO antenna in parallel. For example, the SBL algorithm may be performed in parallel, for example, across all N rows, for example, to reduce latency of the SBL computation process.

In some demonstrative aspects, the SBL algorithm may include determining, for example, after each iteration, an average estimated power spectrum based on a weighted average of a plurality of power spectrums corresponding to the plurality of antenna subarrays, e.g., as shown in line 12 of Table 2, and using the average estimated power spectrum, for example, for the one or more SBL operations, e.g., in lines 6-11 of Table 2.

In some demonstrative aspects, an iterative spatial smoothing may be performed, for example, with minimal additional complexity, for example, when the SBL algorithm is applied to the plurality of antenna subarrays in parallel, e.g., as described below.

In some demonstrative aspects, the estimated AoA radar data X, the power spectrum p, and/or the diagonal elements $\Sigma_{ii}$ may be computed separately and/or independently, e.g., for each subarray.

In some demonstrative aspects, the power spectrum p and/or the radar data $x_n$ may be re-estimated separately and/or independently, e.g., for each subarray.

In some demonstrative aspects, the power estimation operation to estimate the power spectrum p may be smoothed, for example, based on the average estimated power spectrum of the plurality of power spectrums, e.g., as follows:

$$p = \sum_{n=1}^{N} w_n x_n \tag{19}$$

$$\text{wherein } \sum w_n = 1.$$

In some demonstrative aspects, the average estimated power spectrum p, e.g., according to Equation 19, may be shared across one or more subarrays, e.g., all subarrays, in a next iteration, which may allow smoothing the estimated power spectrum p.

In some demonstrative aspects, a major part of the computation complexity of the SBL algorithm may be contributed by the computation of the diagonal element of the covariance of $\Sigma_{ii}$, e.g., in line 9 of Table 2, and/or the computation of the estimated radar AoA data x, e.g., in line 8 of Table 2, for example, where matrix inversion of the covariance matrix R is computed, e.g., $R^{-1}=(\eta I+APA^H)^{-1}$.

In some demonstrative aspects, a computation complexity for matrix inversion of a covariance matrix having a size M may be, for example $o(M^{2\sim3})$. This computation complexity may be less than a computation complexity of $o(N(MN)^{2\sim3})$, which may be required for matrix inversion when the virtual steering matrix is used. For example, the computation complexity of $o(N(MN)^{2\sim3})$ may make an SBL algorithm, which is based on the virtual steering matrix, to be impractical for a system having tens of Tx antennas and/or Rx antennas.

In one example, a MIMO radar antenna with 16 Tx antennas and 48 Rx antennas may result in a virtual steering matrix having a size of 768, e.g., 16×48=768, which may result in a very high computation complexity for matrix inversion of a covariance matrix corresponding to the virtual steering matrix. In contrast, a technical solution for performing the SBL operations based on the Rx steering matrix and/or the Tx steering matrix, e.g., as described above, may require in a significantly reduced computational complexity for matrix inversion of the covariance matrix and, accordingly, may provide a practical technical solution. For example, the computation complexity for the matrix inversion of the covariance matrix may be reduced to correspond to a matrix size of 48, e.g., instead of 768, for example, when performing the SBL operations based on the Rx steering matrix, or to a matrix size of 48, e.g., instead of 768, when performing the SBL operations based on the Tx steering matrix.

Figure 21:
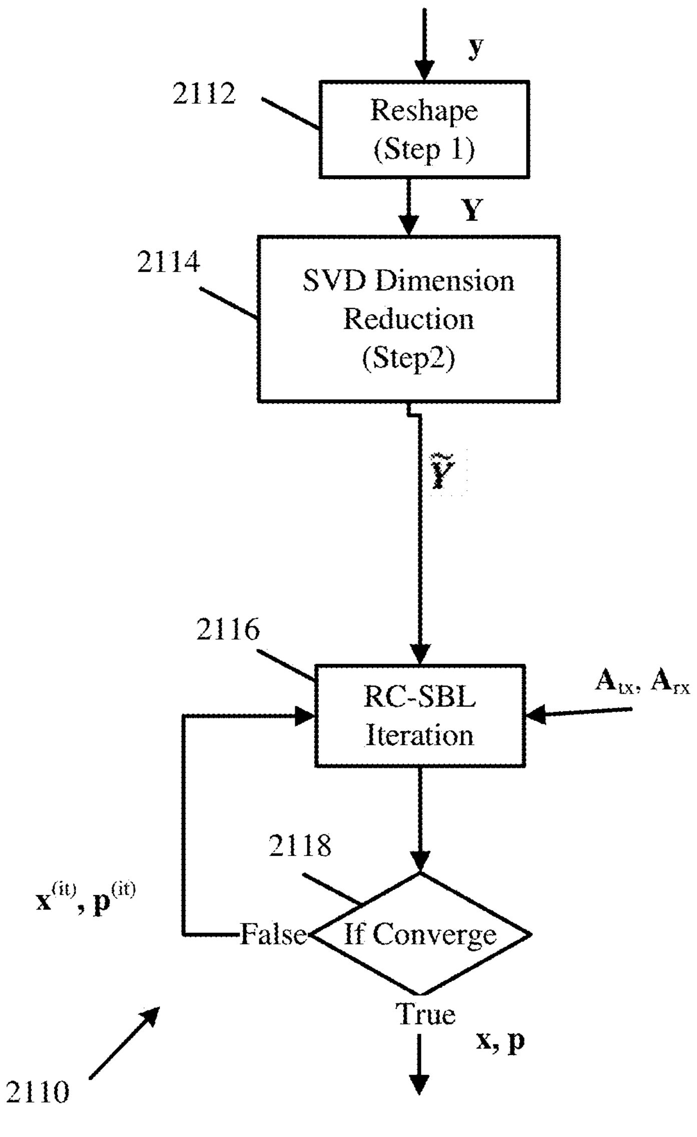
FIG. 21 is a schematic illustration of a Sparse Bayesian Learning (SBL) method, in accordance with some demonstrative aspects.

Reference is made to FIG. 21, which schematically illustrates an SBL method 2110, in accordance with some demonstrative aspects.

In some demonstrative aspects, as indicated at block 2112, SBL method 2110 may include reshaping of radar Rx data of a range-Doppler bin, for example, by determining a plurality of antenna subarrays of a virtual MIMO antenna for applying the SBL algorithm. For example, radar processor 834 (FIG. 8) may determine the plurality of antenna subarrays of the virtual MIMO antenna of MIMO radar antenna 881 (FIG. 8), e.g., as described above.

In some demonstrative aspects, SBL method 2110 may include sequentially applying the SBL algorithm to the plurality of antenna subarrays. For example, radar processor 834 (FIG. 8) may sequentially apply the SBL algorithm to the plurality of antenna subarrays, e.g., as described above.

In some demonstrative aspects, as indicated at block 2114, SBL method 2110 may include performing an SVD dimension reduction on the radar Rx data. For example, radar processor 834 (FIG. 8) may determine Rx data of the reduced virtual MIMO antenna by applying the SVD to the radar Rx data 811 (FIG. 8), e.g., as described above.

In some demonstrative aspects, as indicated at block 2116, SBL method 2110 may include performing a plurality of iterations, e.g., until a convergence 2118 of the SBL algorithm, to generate AoA spectrum information of the range-Doppler bin. For example, radar processor 834 (FIG. 8) may perform the plurality of iterations of the SBL algorithm to generate the AoA spectrum information of the range-Doppler bin, e.g., as described above.

In some demonstrative aspects, radar processor 834 (FIG. 8) may be configured to perform one or more operations of SBL method 2110, for example, to determine the AoA spectrum information for a uniform MIMO antenna array, and/or for a sparse non-uniform MIMO antenna array, e.g., as described above.

In some demonstrative aspects, radar processor 834 (FIG. 8) may be configured to apply the SVD subspace-based dimensionality reduction 2114 to the Rx data corresponding to the range-Doppler bin, for example, to reduce a signal dimension, while target information, e.g., on target location and reflectivity, may be preserved. For example, reducing the dimension of the radar signal by the SVD may reduce computational complexity of the following SBL iterations, e.g., at block 2116.

In some demonstrative aspects, radar processor 834 (FIG. 8) may be configured to apply the SBL method 2110, for example, in the angular domain, for example, to determine a location of a target and/or to determine complex-valued reflectance of the targets.

In some demonstrative aspects, radar processor 834 (FIG. 8) may be configured to perform the SBL method 2110, for example, in one dimension of the azimuth-elevation domain, for example, followed by performing the SBL method 2110 on the other dimension of the azimuth-elevation domain.

In some demonstrative aspects, radar processor 834 (FIG. 8) may be configured to perform the SBL iterations 2116, for example, without applying the SVD operation 2114, for example, in one or more scenarios, e.g., a densely populated environment, or the like.

Figure 22:
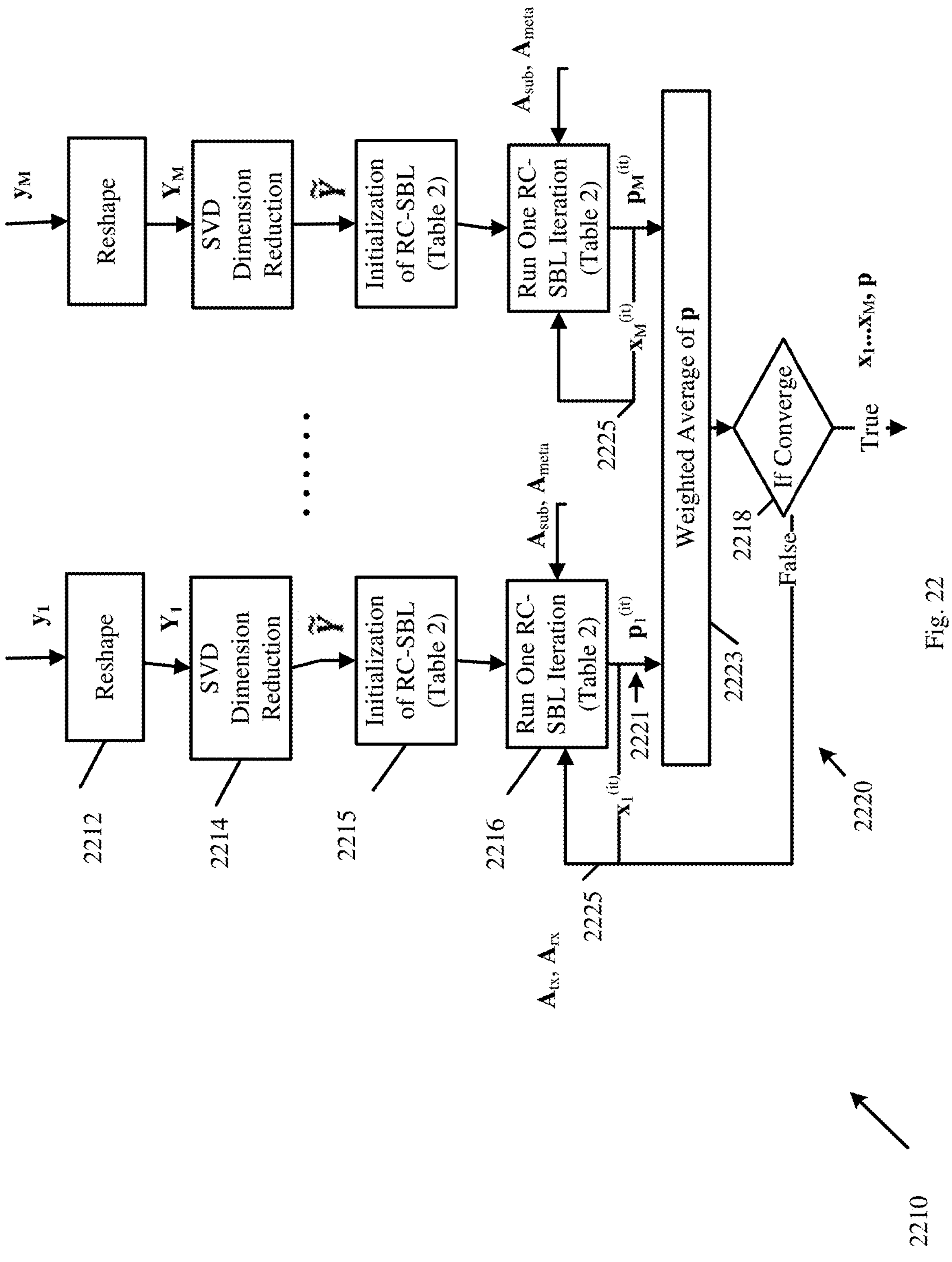
FIG. 22 is a schematic illustration of an SBL method, in accordance with some demonstrative aspects.

Reference is made to FIG. 22, which schematically illustrates an SBL method 2210, in accordance with some demonstrative aspects.

In some demonstrative aspects, SBL method 2210 may include applying the SBL algorithm to a plurality of antenna subarrays in parallel. For example, radar processor 834 (FIG. 8) may apply the SBL algorithm to the plurality of antenna subarrays in parallel, e.g., as described above.

In some demonstrative aspects, as indicated at block 2212, SBL method 2210 may include reshaping of radar Rx data of a range-Doppler bin, for example, by determining a plurality of antenna subarrays of a virtual MIMO antenna for applying the SBL algorithm. For example, radar processor 834 (FIG. 8) may determine the plurality of antenna subarrays of the virtual MIMO antenna of MIMO radar antenna 881 (FIG. 8), e.g., as described above.

In some demonstrative aspects, as indicated at block 2214, SBL method 2210 may include performing an SVD dimension reduction on the radar Rx data. For example, radar processor 834 (FIG. 8) may determine Rx data of the reduced virtual MIMO antenna by applying the SVD to the radar Rx data 811 (FIG. 8), e.g., as described above.

In some demonstrative aspects, as indicated at block 2215, SBL method 2210 may include initializing the SBL algorithm. For example, radar processor 834 (FIG. 8) may initialize the SBL algorithm, for example, according to lines 1-3 of Table 2, e.g., as described above.

In some demonstrative aspects, as indicated at block 2216, SBL method 2210 may include performing a plurality of SBL operations, e.g., until a convergence 2218 of the SBL algorithm, to generate AoA spectrum information of a range-Doppler bin. For example, radar processor 834 (FIG. 8) may perform the SBL operations of the SBL algorithm to generate the AoA spectrum information of the range-Doppler bin, e.g., as described above.

In some demonstrative aspects, as indicated by arrow 2221, SBL method 2210 may include determining a plurality of power spectrums, denoted "P1 . . . PM", corresponding to the plurality of antenna subarrays. For example, radar processor 834 (FIG. 8) may determine the plurality of power spectrums corresponding to the plurality of antenna subarrays, e.g., as described above.

In some demonstrative aspects, as indicated at block 2223, SBL method 2210 may include determining an average estimated power spectrum based on a weighted average of the plurality of power spectrums. For example, radar processor 834 (FIG. 8) may determine the average estimated power spectrum based on the weighted average of the plurality of power spectrums, e.g., as described above.

In some demonstrative aspects, as indicated by arrow 2225, SBL method 2210 may include repeating the one or more SBL operations of the SBL algorithm based on the average estimated power spectrum, for example, if the SBL algorithm did not converge. For example, radar processor 834 (FIG. 8) may repeat perform the one or more SBL operations of the SBL algorithm based on the average estimated power spectrum, e.g., as described above.

In some demonstrative aspects, radar processor 834 (FIG. 8) may be configured to perform one or more operations of SBL method 2210, for example, to determine the AoA spectrum information for a uniform MIMO antenna array, and/or for a sparse non-uniform MIMO antenna array, e.g., as described above.

In some demonstrative aspects, radar processor 834 (FIG. 8) may be configured to apply the SVD subspace-based dimensionality reduction 2214 to the Rx data corresponding to the range-Doppler bin. For example, the SVD subspace-based dimensionality reduction may reduce a signal dimension while target information, e.g., on target location and reflectivity, may be preserved. For example, reducing the dimension of the radar signal by the SVD may reduce computational complexity of the following SBL operations 2216.

In some demonstrative aspects, radar processor 834 (FIG. 8) may be configured to apply the SBL method 2210, for example, in the angular domain, for example, to determine a location of a target and/or to determine complex-valued reflectance of targets.

In some demonstrative aspects, radar processor 834 (FIG. 8) may be configured to perform the SBL method 2210, for example, in one dimension of the azimuth-elevation domain, for example, followed by performing the SBL method 2210 on the other dimension of the azimuth-elevation domain.

In some demonstrative aspects, radar processor 834 (FIG. 8) may be configured to perform the SBL operations 2216, for example, without applying the SVD operation 2114, for example, in one or more scenarios, e.g., a densely populated environment, or the like.

Figure 23:
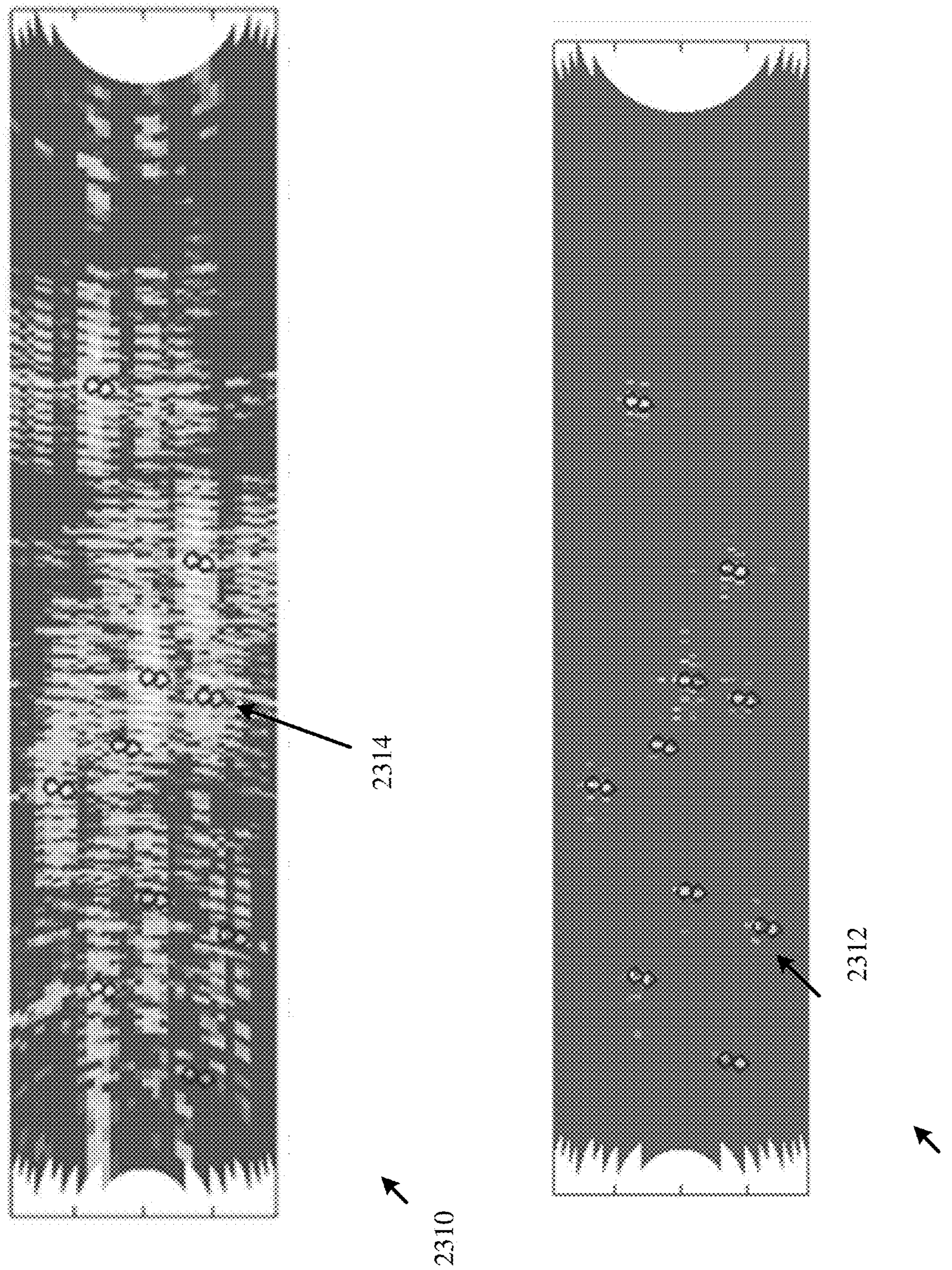
FIG. 23 is a schematic illustration of 2-dimensional (2D) AoA spectrums, in accordance with some demonstrative aspects.

Reference is made to FIG. 23, which schematically illustrates a first 2D AoA spectrum 2310 and a second 2D AoA spectrum 2320, in accordance with some demonstrative aspects.

In some demonstrative aspects, 2D AoA spectrum 2310 may represent simulation results of a 2D beamforming method.

In some demonstrative aspects, 2D AoA spectrum 2320 may represent simulation results of an SBL algorithm, e.g., as described above.

In some demonstrative aspects, as shown in FIG. 23, 2D AoA spectrum 2320 may allow separation of close-space targets 2312, e.g., compared to 2D AoA spectrum 2310, which may not allow the separation of close-space targets 2312.

In some demonstrative aspects, as shown in FIG. 23, in 2D AoA spectrum 2320, sidelobes may be suppressed, e.g., compared to 2D AoA spectrum 2310, in which the sidelobes 2314 are not suppressed.

Figure 24:
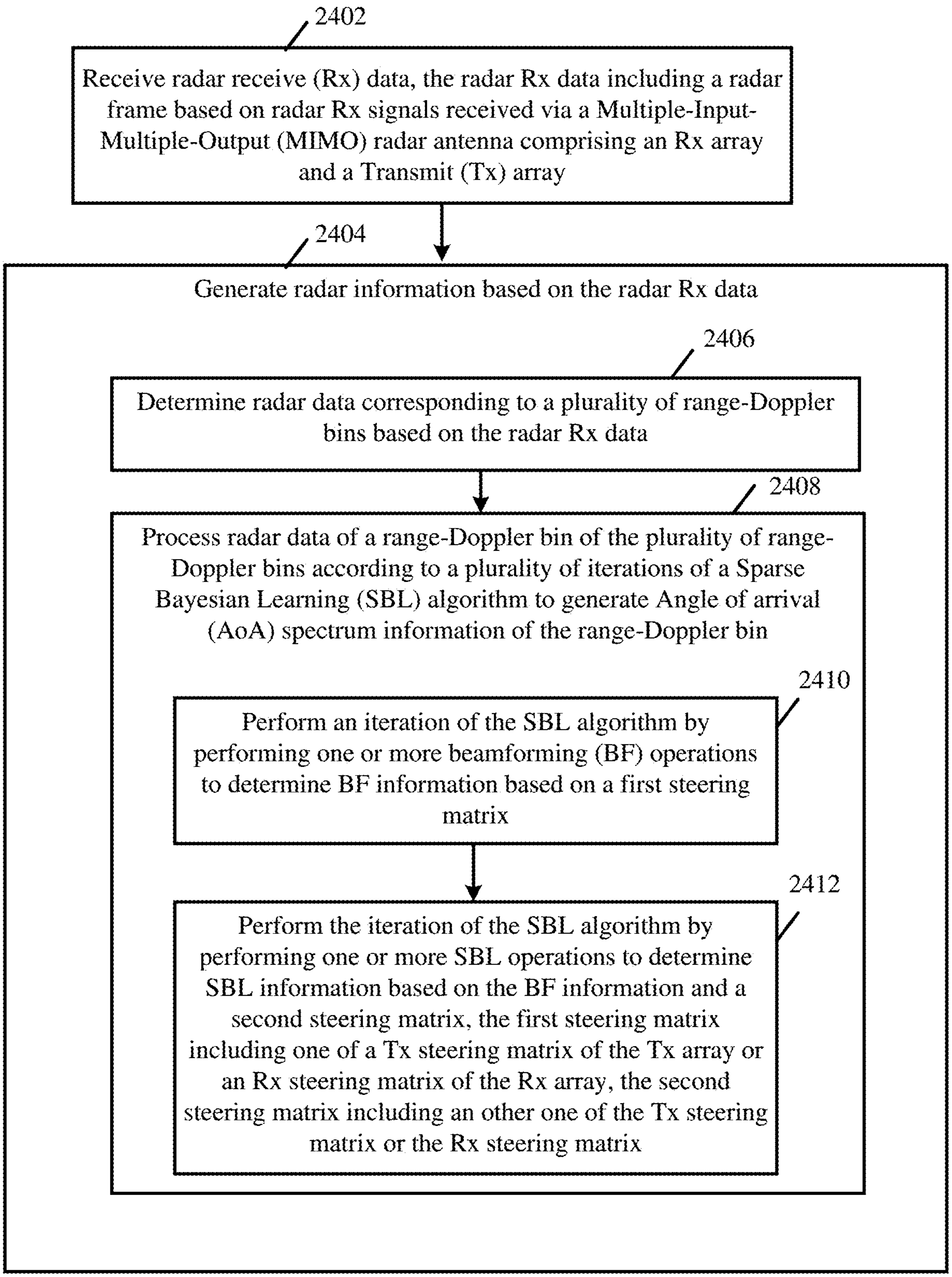
FIG. 24 is a schematic flow-chart illustration of a method of processing radar data of a range-Doppler bin according to an SBL algorithm, in accordance with some demonstrative aspects.

Reference is made to FIG. 24, which schematically illustrates a method of processing radar data of a range-Doppler bin according to an SBL algorithm, in accordance with some demonstrative aspects. For example, one or more of the operations of the method of FIG. 24 may be performed by a radar processor, e.g., radar processor 834 (FIG. 8).

In some demonstrative aspects, as indicated at block 2402, the method may include receiving radar Rx data, the radar Rx data including a radar frame based on radar Rx signals received via a MIMO radar antenna including an Rx array and a Tx array. For example, radar processor 836 (FIG. 8) may receive, e.g., via input 832 (FIG. 8), the radar Rx data 811 (FIG. 8) including the radar frame based on radar Rx signals received via the MIMO radar antenna 881 (FIG. 8) including the Rx array and the Tx array, e.g., as described above.

In some demonstrative aspects, as indicated at block 2404, the method may include generating radar information based on the radar Rx data. For example, radar processor 836 (FIG. 8) may generate radar information 813 (FIG. 8) based on the radar Rx data 811 (FIG. 8), e.g., as described above.

In some demonstrative aspects, as indicated at block 2406, generating the radar information may include determining radar data corresponding to a plurality of range-Doppler bins based on the radar Rx data. For example, radar processor 836 (FIG. 8) may determine the radar data corresponding to the plurality of range-Doppler bins based on the radar Rx data 811 (FIG. 1), e.g., as described above.

In some demonstrative aspects, as indicated at block 2408, generating the radar information may include processing radar data of a range-Doppler bin of the plurality of range-Doppler bins according to a plurality of iterations of an SBL algorithm to generate AoA spectrum information of the range-Doppler bin. For example, radar processor 836

(FIG. 8) may process the radar data of the range-Doppler bin of the plurality of range-Doppler bins according to the plurality of iterations of the SBL algorithm to generate the AoA spectrum information of the range-Doppler bin, e.g., as described above.

As indicated at block 2410, processing the radar data of the range-Doppler bin according to the plurality of iterations of the SBL algorithm may include performing an iteration of the SBL algorithm by performing one or more BF operations to determine BF information based on a first steering matrix. For example, radar processor 836 (FIG. 8) may perform the iteration of the SBL algorithm by performing the one or more BF operations to determine the BF information based on the first steering matrix, e.g., as described above.

As indicated at block 2412, processing the radar data of the range-Doppler bin according to the plurality of iterations of the SBL algorithm may include performing the iteration of the SBL algorithm by performing one or more SBL operations to determine SBL information based on the BF information and a second steering matrix. For example, the first steering matrix may include one of a Tx steering matrix of the Tx array or an Rx steering matrix of the Rx array, and the second steering matrix may include another one of the Tx steering matrix or the Rx steering matrix. For example, radar processor 836 (FIG. 8) may perform the iteration of the SBL algorithm by performing the one or more SBL operations to determine the SBL information based on the BF information and the second steering matrix, e.g., as described above.

Referring to FIG. 8, in some demonstrative aspects, radar processor 834 may be configured to estimate a target position in a 4D representation, which may be represented, e.g., in polar coordinates, for example, by a range, an azimuth (Az), an elevation (El), and a Velocity (V), e.g., as described below.

In some demonstrative aspects, radar processor 834 may be configured to generate radar information 813, e.g., based on radar Rx data 811. For example, radar processor 834 may be configured to generate radar information 813 including a 2 Dimensional (2D) Angle of Arrival (AoA) spectrum over an Azimuth-Elevation domain, e.g., including an azimuth AoA spectrum and an elevation AoA spectrum. For example, the AoA spectrum over the Azimuth-Elevation domain may be utilized to estimate an Azimuth and/or an Elevation of a target.

In some demonstrative aspects, the radar Rx data 811 may be based on radar signals received via a 2D array of Rx antennas of a MIMO radar antenna. For example, a planar 2D antenna array may be used, for example, to estimate the azimuth and/or the elevation of a target.

In some demonstrative aspects, MIMO radar antenna 881 may include a 2D array of Rx antennas 816. For example, the radar Rx data 811 may be based on radar signals received via the 2D array of Rx antennas 816 of MIMO radar antenna 881, e.g., as described below.

In some demonstrative aspects, radar processor 834 may be configured to combine, e.g., by spatial filtering, received Rx signals from all Rx antennas 816, for example, to estimate the 2D AoA spectrum over the Azimuth-Elevation domain, e.g., as described below.

In some demonstrative aspects, the 2D AoA spectrum may depict a power distribution for different azimuth and elevation angles. For example, peak values in the 2D AoA spectrum may be associated with potential targets.

In some demonstrative aspects, some methods of spectrum analysis of the 2D AoA spectrum may suffer one or more technical disadvantages, inefficiencies, and/or problems, for example, in some use cases, implementations and/or scenarios.

For example, although a Delay and Sum (DAS) Beam-Forming (BF) method for spectrum analysis may provide a technical advantage in the form of low computational resources, the DAS BF method may provide limited spatial resolution, which may depend on a windowing function.

In some demonstrative aspects, radar processor 834 may be configured to apply an adaptive BF algorithm, for example, to estimate the 2D AoA spectrum, e.g., as described below.

In some demonstrative aspects, the adaptive BF algorithm may include, for example, a super resolution spectrum analysis algorithm, e.g., as described below.

In some demonstrative aspects, the adaptive BF algorithm may be utilized to provide an improved resolution, e.g., compared to a resolution provided by the DAS BF method.

In some demonstrative aspects, there may be a need to provide a technical solution, for example, for efficiently applying the adaptive BF algorithm, e.g., as described below.

In one example, the adaptive BF algorithm may provide an increased level of resolution, for example, at an expense of increased computational complexity. For example, the increased computational complexity may result from operations required for estimation and inversion of a covariance (COV) matrix of received signals, which may be used by the adaptive BF algorithm.

In some demonstrative aspects, radar processor 834 may be configured to implement an adaptive BF algorithm, which may be configured based on a separable 2D BF mechanism, for example, to analyze radar Rx dada received via a structured planar array. For example, the structured planar array may include antenna elements arranged in columns and rows, for example, e.g., a uniform rectangular array (URA), e.g., as described below.

In some demonstrative aspects, the separable 2D BF mechanism may include performing a first one-Dimensional (1D) BF in a first dimension, e.g., the elevation dimension, for example, by processing the 1D BF on all rows; and performing a second 1D BF in a second dimension, e.g., the azimuth dimension, for example, by processing the 1D BF on all columns, e.g., as described below. implement the separable 2D BF mechanism, for example, to apply a 1D super resolution algorithm on each of the dimensions, for example, independently, e.g., as described below.

In some demonstrative aspects, a separable 2D BF mechanism, for example, an iterative SR AoA estimation algorithm, e.g., an Iterative Adaptive Approach (IAA) algorithm, may have an increased computational complexity, for example, if a COV matrix is to be estimated and inverted for each column independently and/or for each row independently.

Some aspects are described herein with respect to an IAA algorithm. However, other aspects may be implemented with respect to any other adaptive BF and/or iterative SR algorithm.

In one example, an IAA algorithm may include estimating an initial spectrum, denoted p, for example, based on a received signal, denoted x, and a steering matrix, denoted A, of the antenna array. For example, the initial spectrum P may include a vector having a size based on a number of angels, and including a plurality of AoA powers. For example, the received signal x may include a vector having a size based on a number of antennas, and/or the steering matrix A may include a vector having a size equal to a product of the number of antennas and the number of angles.

In one example, an estimation of the initial spectrum P may be determined, for example, using the DAS BF spectrum.

In one example, the IAA algorithm may include an iterative estimation, e.g., as shown in lines 2-7 of Table 3 below, of a covariance matrix, denoted Rxx, for example, based on a diagonal matrix of powers of the initial spectrum, e.g., as shown in line 3 of Table 3 below.

In one example, the IAA algorithm may include inversion of the covariance matrix Rxx, e.g., as shown in line 4 of Table 3 below.

In one example, the IAA algorithm may include an iterative estimation of a power spectrum, denoted $p_k$, for example, based on the estimated covariance matrix, and a weight vector, denoted $w_k$, corresponding to the steering matrix, e.g., as shown in lines 5-7 of Table 3 below. For example, the estimation of the power spectrum $p_k$ may be based on a Minimum Variance Distortionless Response (MVDR) BF.

In one example, when the spectrum estimation $p_k$ is obtained, the COV matrix may be re-estimated again, and so on, for example, until a convergence. For example, the COV matrix may be initialized by the DAS BF spectrum, and as the iterations continue, e.g., as shown in lines 2-7 of Table 3 below, the spectrum estimation $p_k$ improves, and as a result, the COV matrix estimation Rxx may also improve.

In one example, the IAA algorithm may be implemented, for example, according to one or more of the following operations:

TABLE 3

| Operation | Description | Implementation |
|---|---|---|
| 1 $p = \|A^H x\|^2$ | Initial spectrum estimation | |
| 2 For ii = 1 : n_iter | IAA iterations loop | |
| 3 $R_{xx} = A\,\mathrm{diag}(p)A^H$ | COV matrix estimation | $R_{xx} = \sum_{k=1}^{N_{grid}} p_k a_k a_k^H$ |
| 4 $R_{xx}^{-1}$ | Matrix inversion | |
| 5 For k = 1 : $N_{grid}$ | Spectrum update loop | |
| 6 $w_k = \frac{R_{xx}^{-1} a(\theta_k)}{a(\theta_k)^H R_{xx}^{-1} a(\theta_k)}$ | MVDR BF | |
| 7 $p_k = \|w_k^H x\|^2$ | Spectrum estimation | |

For example, the IAA algorithm may implement some or all of the operations of the algorithm of Table 3, and/or one or more additional or alternative operations.

In one example, for a 2D array antenna, the IAA algorithm may include, performing the IAA on a first dimension, e.g., the elevation dimension, resulting with an elevation spectrum for each column of the 2D array antenna. For example, independently applying the IAA on each column may require an iterative estimation and inversion of the COV matrix for each column, which may result in a large number of iterations, e.g., between 5-10 iterations, until convergence.

In one example, for the 2D array antenna, the IAA algorithm may include, performing the IAA on a second dimension, e.g., the azimuth dimension, resulting with an azimuth spectrum for each row of the 2D array antenna. For example, independently applying the IAA on each row may require an iterative estimation and inversion of the COV matrix for each row, which may result in a large number of iterations, e.g., between 5-10 iterations, until convergence.

In some demonstrative aspects, the iterations of the IAA algorithm may result in an increased computational complexity, for example, due to the large number of iterations and inversions of the covariance matrix, for example, when independently processing each row and column of the 2D array antenna.

In some demonstrative aspects, radar processor 834 may be configured to implement an adaptive BF scheme, which may be configured to have a reduced computational complexity, e.g., as described below.

In some demonstrative aspects, radar processor 834 may be configured to support an adaptive BF scheme, which may be configured to share and/or update information between processing operations applied on the columns and/or rows of the 2D array antenna, e.g., as described below.

In one example, spectrum estimations for different columns and/or rows may be similar, e.g., for a structured 2D-array antenna. Therefore, a COV matrix estimation may be shared between the columns and/or rows, e.g., as described below.

For example, an adaptive BF algorithm, e.g., an IAA algorithm and/or any other adaptive BF algorithm, may initialize a COV matrix to be applied for a particular column and/or row, for example, based on a COV matrix, e.g., a previously calculated COV matrix, from one or more neighbor columns and/or rows, e.g., as described below.

In some demonstrative aspects, the initialization of the IAA based on a previously calculated COV matrix may provide a technical solution to reduce the number of IAA iterations. For example, once an updated COV matrix may be determined, it can be used as an initialization of the IAA for a next neighbor column and/or row, e.g., as described below.

In one example, spectrum estimations for two or more, e.g., close, range-Doppler bins may be similar, e.g., for a structured 2D array antenna. Therefore, a COV matrix estimation may be shared between the two or more range-Doppler bins, e.g., as described below.

In another example, spectrum estimations for sequential time frames may be similar, e.g., for a structured 2D array antenna. Therefore, a COV matrix estimation may be shared between a first time frame, e.g., a previous time frame, and a second time frame, e.g., a second time frame, as described below.

In some demonstrative aspects, radar processor 836 may be configured to receive radar Rx data 811, e.g., via input 832, and to generate radar information 813 including a 2D AoA spectrum over the Azimuth-Elevation domain, for example, based on a plurality of 1D AoA spectrums corresponding to a dimension of the Azimuth-Elevation domain, e.g., as described below.

In some demonstrative aspects, radar processor 836 may be configured to determine the plurality of 1D AoA spectrums, for example, based on radar Rx data corresponding to a respective plurality of 1D Rx antenna sub-arrays in a dimension of the 2D array, e.g., as described below.

In some demonstrative aspects, radar processor 836 may be configured to determine the 2D AoA spectrum based on a plurality of 1D AoA spectrums corresponding to the Elevation dimension, e.g., as described below.

In some demonstrative aspects, the plurality of 1D Rx antenna sub-arrays may include a plurality of 1D Rx antenna columns in the 2D array, for example, when the 2D AoA spectrum is to be determined based on the plurality of 1D AoA spectrums corresponding to the Elevation dimension, e.g., as described below.

In some demonstrative aspects, radar processor 836 may be configured to determine the 2D AoA spectrum based on a plurality of 1D AoA spectrums corresponding to an Azimuth dimension, e.g., as described below.

In some demonstrative aspects, the plurality of 1D Rx antenna sub-arrays may include a plurality of 1D Rx antenna rows in the 2D array, for example, when the 2D AoA spectrum is to be determined based on the plurality of 1D AoA spectrums corresponding to the Azimuth dimension, e.g., as described below.

In some demonstrative aspects, radar processor 836 may be configured to determine a 1D AoA spectrum of the plurality of 1D AoA spectrums, for example, by applying an adaptive BF algorithm to radar Rx data corresponding to a 1D Rx antenna sub-array of the plurality of 1D Rx antenna sub-arrays, e.g., as described below.

In some demonstrative aspects, the adaptive BF algorithm may include a super resolution spectrum analysis algorithm, e.g., as described below.

In some demonstrative aspects, the adaptive BF algorithm may include an IAA algorithm.

In other aspects, the adaptive BF algorithm may include any other additional or alternative algorithm.

In some demonstrative aspects, radar processor 8836 may be configured to set an initial covariance matrix for the adaptive BF algorithm, for example, based on a previously determined covariance matrix, e.g., as described below.

In some demonstrative aspects, the previously determined covariance matrix may be based, for example, on a plurality of iterations of the adaptive BF algorithm, for example, with respect to reference Rx data corresponding to a reference 1D Rx antenna sub-array of the plurality of 1D Rx antenna sub-arrays, e.g., as described below.

In some demonstrative aspects, the initial covariance matrix for the adaptive BF algorithm may be based, for example, on an inverse of the previously determined covariance matrix, e.g., as described below.

In some demonstrative aspects, radar processor 836 may be configured to set the initial covariance matrix for the adaptive BF algorithm, for example, based on a combination of a plurality of previously determined covariance matrices, e.g., as described below.

In some demonstrative aspects, the reference Rx data corresponding to the reference 1D Rx antenna sub-array may include Rx data of a neighbor 1D Rx antenna array adjacent to the 1D Rx antenna sub-array, e.g., as described below.

In some demonstrative aspects, the reference Rx data corresponding to the reference 1D Rx antenna sub-array may include Rx data corresponding to a first range-Doppler bin, and the reference Rx data corresponding to the reference 1D Rx antenna sub-array may include Rx data corresponding to the 1D Rx antenna sub-array and corresponding to a second range-Doppler bin adjacent to the first range-Doppler bin, e.g., as described below.

In some demonstrative aspects, the reference Rx data corresponding to the reference 1D Rx antenna sub-array may include Rx data corresponding to the 1D Rx antenna sub-array in a previously processed frame of Rx data, e.g., as described below.

In other aspects, the previously determined covariance matrix may be based on any other reference Rx data corresponding to the reference 1D Rx antenna sub-array.

In some demonstrative aspects, radar processor 836 may be configured to determine the 2D AoA spectrum, for example, based on a first plurality of 1D AoA spectrums corresponding to a first dimension of the Azimuth-Elevation domain, and a second plurality of 1D AoA spectrums corresponding to a second dimension of the Azimuth-Elevation domain, e.g., as described below.

In some demonstrative aspects, radar processor 836 may be configured to determine the first plurality of 1D AoA spectrums, for example, based on radar Rx data corresponding to a respective plurality of first 1D Rx antenna sub-arrays in a first dimension of the 2D array, e.g., as described below.

In some demonstrative aspects, radar processor 836 may be configured to determine the second plurality of 1D AoA spectrums, for example, based on radar Rx data corresponding to a respective plurality of second 1D Rx antenna sub-arrays in a second dimension of the 2D array, e.g., as described below.

In some demonstrative aspects, radar processor 836 may be configured to determine a 1D AoA spectrum of the first plurality of 1D AoA spectrums, for example, by applying the adaptive BF algorithm to radar Rx data corresponding to a 1D Rx antenna sub-array of the plurality of first 1D Rx antenna sub-arrays, e.g., as described below.

In some demonstrative aspects, radar processor 836 may be configured to set the initial covariance matrix for the adaptive BF algorithm, for example, based on the previously determined covariance matrix, e.g., as described below.

In some demonstrative aspects, the previously determined covariance matrix may be based, for example, on a plurality of iterations of the adaptive BF algorithm with respect to reference Rx data corresponding to a reference 1D Rx antenna sub-array of the plurality of first 1D Rx antenna sub-arrays, e.g., as described below.

In some demonstrative aspects, radar processor 836 may be configured to determine a 1D AoA spectrum of the second plurality of 1D AoA spectrums, for example, by applying the adaptive BF algorithm with an other initial covariance matrix to radar Rx data corresponding to a 1D Rx antenna sub-array of the plurality of second 1D Rx antenna sub-arrays, e.g., as described below.

In some demonstrative aspects, radar processor 836 may be configured to set the other initial covariance, for example, based on another previously determined covariance matrix, e.g., as described below.

In some demonstrative aspects, the other previously determined covariance matrix may be based, for example, on a plurality of iterations of the adaptive BF algorithm with respect to reference Rx data corresponding to a reference 1D Rx antenna sub-array of the plurality of second 1D Rx antenna sub-arrays, e.g., as described below.

In some demonstrative aspects, the adaptive BF scheme described herein may be utilized to reduce, e.g., to significantly reduce, the complexity of the adaptive BF processing, e.g., as described below.

In one example, the complexity reduction may result from a fast conversion of the adaptive BF scheme, e.g., within 1-2 iterations, for example, compared to 5-10 iterations required for some adaptive BF algorithms, e.g., DAS BF spectrum initialization.

In some demonstrative aspects, the adaptive BF scheme described herein may be utilized to provide a technical solution, which may support implementation of super resolution algorithms, e.g., for mass production radar products, which may be based on a massive antenna array.

In some demonstrative aspects, radar processor 836 may be configured to determine 2D AoA spectrum over the Azimuth-Elevation domain, for example, according to an IAA algorithm (also referred to as "initialized IAA algorithm", "warm-started IAA algorithm", "improved IAA algorithm" or "modified IAA algorithm"), which may include setting an initial covariance matrix for the IAA algorithm, for example, based on a previously determined covariance matrix, e.g., as described below.

In one example, radar processor 836 may be configured to perform the warm-started IAA algorithm according to one or more of the following operations:

TABLE 4

| Operation | Description | Implementation |
|---|---|---|
| 1 $R_{xx}^{-1}$ = prev col $R_{xx}^{-1}$ | Initialize inverse COV matrix from neighbor column | |
| 2 For ii = 1 : n_iter | IAA iterations loop | |
| 3 For k = 1 : $N_{grid}$ | Spectrum update loop | |
| 4 $w_k = \frac{R_{xx}^{-1} a(\theta_k)}{a(\theta_k)^H R_{xx}^{-1} a(\theta_k)}$ | MVDR BF | |
| 5 $p_k = \lvert w_k^H x \rvert^2$ | Spectrum estimation | |
| 6 $R_{xx}$ = A diag (p)$A^H$ | Update COV matrix estimation | $R_{xx} = \sum_{k=1}^{N_{grid}} p_k a_k a_k^H$ |
| 7 $R_{xx}^{-1}$ | Matrix inversion | |

For example, the improved IAA algorithm may implement some or all of the operations of the algorithm of Table 4, and/or one or more additional or alternative operations.

In some demonstrative aspects, the initialized IAA algorithm may include setting an initial covariance matrix, denoted $$R_{xx}^{-1}$$

for the IAA algorithm, for example, for a spectrum estimation of a current column and/or row, e.g., as shown in line 1 of Table 4. For example, the initial covariance matrix may be based on an inverse of a previously determined covariance matrix, for example, of a neighbor column and/or row, e.g., as described above.

In some demonstrative aspects, the modified IAA algorithm may include iteratively estimating the covariance matrix Rxx, for example, as shown in lines 2-7 of Table 4.

In some demonstrative aspects, the improved IAA algorithm may include iteratively estimating a power spectrum, denoted $p_k$, for example, based on the estimated covariance matrix, and a weight vector, denoted $w_k$, of the steering matrix, e.g., as shown in lines 4-5 of Table 4. For example, the estimation of the power spectrum $p_k$ may be based on a MVDR BF, or any other type of BF estimation.

In some demonstrative aspects, the initialized IAA algorithm may include estimating the covariance matrix Rxx, for example, based on a diagonal matrix of powers of the estimated spectrum $p_k$, e.g., a shown in lines 6 of Table 4.

In some demonstrative aspects, the modified IAA algorithm may include inverting of the covariance matrix Rxx, e.g., as shown in line 7 of Table 4.

In some demonstrative aspects, when the spectrum estimation $p_k$ is obtained, e.g., as shown in line 5 of Table 4, the COV matrix may be re-estimated again, e.g., as shown in line 6 of Table 4, and so on, for example, until reaching a suitable convergence criterion.

In some demonstrative aspects, the initialized IAA algorithm may be based on iterative estimation and inversion of the COV matrix, e.g., for each column/row. However, the use of the previously determined covariance matrix may allow significant reduction in the number of iterations until convergence, e.g., by a factor of 5 or any other factor, for example, to about 1-2 iterations.

In some demonstrative aspects, the reduced number of iterations for processing each row and/or column of the 2D array antenna, e.g., according to the modified IAA algorithm, may provide a technical advantage of reduced computational complexity.

Figure 25:
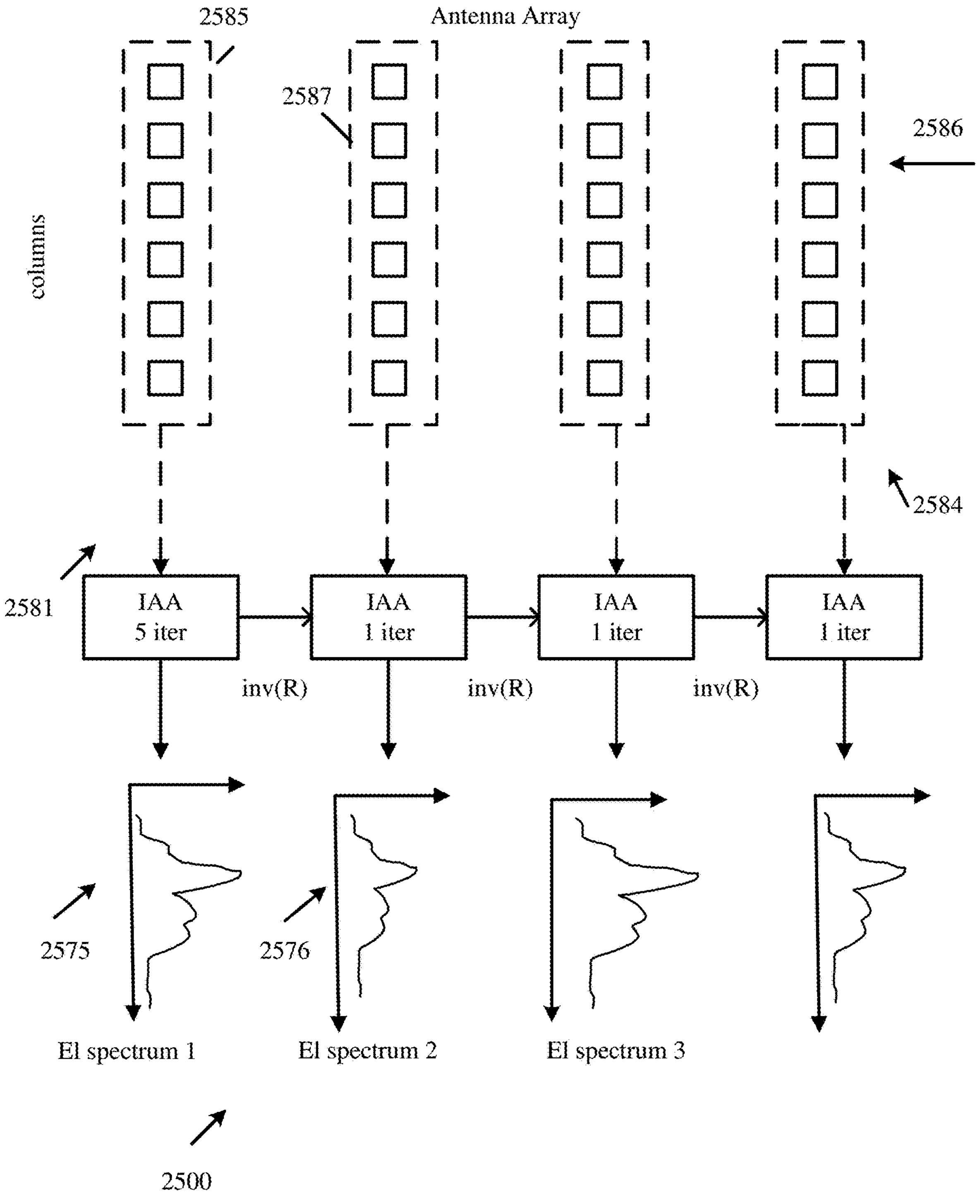
FIG. 25 is a schematic illustration of an AoA-estimation processing scheme, in accordance with some demonstrative aspects.

Reference is made to FIG. 25, which schematically illustrates an AoA-estimation processing scheme 2500, in accordance with some demonstrative aspects.

In some demonstrative aspects, as shown in FIG. 25, an antenna array 2581 may be configured as a 2D array including a plurality of 1D Rx antenna columns 2584 and a plurality of 1D Rx antenna rows 2586. For example, MIMO radar antenna 881 (FIG. 8) may be configured according to the 2D array configuration of antenna array 2581.

In some demonstrative aspects, a radar processor, e.g., radar processor 836 (FIG. 8), may be configured to determine an elevation spectrum of radar signals received by antenna array 2581, for example, based on a plurality of 1D elevation spectrums corresponding to the plurality of 1D Rx antenna columns 2584.

In some demonstrative aspects, the radar processor, e.g., radar processor 836 (FIG. 8), may be configured to estimate a covariance matrix with respect to a first column 2585 of the Rx antenna columns 2584, for example, by performing a plurality of iterations, e.g., 5 iterations, for example, according to the operations in lines 2-3 of Table 3.

In some demonstrative aspects, the radar processor, e.g., radar processor 836 (FIG. 8), may be configured to determine an elevation spectrum 2575 for the first column 2585, for example, by applying the IAA algorithm with the estimated covariance matrix, according to the operations in lines 4-7 of Table 3.

In one example, an inverse of the COV matrix estimation may be maintained, for example, for processing of a next column of the Rx antenna columns 2584, e.g., as described below.

In some demonstrative aspects, the radar processor, e.g., radar processor 836 (FIG. 8), may be configured to determine an elevation spectrum 2576 for a second column 2587, which is adjacent to first column 2585. For example, the radar processor, e.g., radar processor 836, may set an initial covariance matrix for the IAA algorithm, for example, based on the previously determined inverse of the covariance matrix, e.g., for column 2585.

In one example, estimation of the Elevation spectrum of the second column 2587 may be performed by running only a single iteration of the IAA algorithm, for example, while using the inverse COV matrix of the first column 2585. For example, the modified IAA algorithm may be performed for 1-2 iterations or any other number of iterations, and a last inverse of the COV matrix of second column 2587 may be saved for processing of a next column.

In some demonstrative aspects, the radar processor, e.g., radar processor 836 (FIG. 8), may be configured to determine elevation spectrums of other columns of the plurality of 1D Rx antenna columns 2584, for example, by performing a reduced number of iterations, e.g., even 1-2 iterations. For example, these iterations may use one or more previously determined covariance matrices, e.g., of columns 2555, 2557 and/or of any other columns.

In some demonstrative aspects, the radar processor, e.g., radar processor 836 (FIG. 8), may be configured to determine an elevation spectrum, for example, for an m-th column, and share a COV matrix estimation of the elevation spectrum of the m-th column, for example, with one or more other, e.g., one or more adjacent columns on one side of the m-th 1D Rx antenna column, e.g., the columns m–i, i>0, on a left-hand side of the m-th 1D Rx antenna column, and/or one or more adjacent columns on another side of the m-th column e.g., the columns m+j, j>0, on a right-hand side of the m-th 1D Rx antenna column.

In some demonstrative aspects, the radar processor, e.g., radar processor 836 (FIG. 8), may be configured to determine a plurality of elevation spectrums for a plurality of 1D Rx antenna columns, for example, based on the IAA algorithm, for example, according to one or more operations of the Table 3. For example, the radar processor, e.g., radar processor 836 (FIG. 8), may propagate a plurality of covariance matrix estimations, e.g., corresponding to the plurality of 1D Rx antenna columns, for example, by propagating a covariance matrix estimation for a particular 1D Rx antenna column to one or more neighbor 1D Rx antenna columns, e.g., on the left and/or right of the particular 1D Rx antenna column. According to these aspects, the radar processor, e.g., radar processor 836 (FIG. 8), may be configured to determine a spectrum estimation of a particular 1D Rx antenna column, which may have adjacent 1D Rx antenna columns, for which covariance matrices were previously estimated. For example, an initial covariance matrix for the particular 1D Rx antenna column may be determined based on an average of the previously estimated covariance matrices of the adjacent 1D Rx antenna columns.

In some demonstrative aspects, the radar processor, e.g., radar processor 836 (FIG. 8), may be configured to determine elevation spectrums for the 1D Rx antenna columns 2584, e.g., at a first processing step; and to determine azimuth spectrums for the 1D Rx antenna rows 2586, e.g., at a second processing step, for example, using operations of the initialized IAA algorithm of Table 4 and/or the IAA algorithm of Table 4.

In some demonstrative aspects, the radar processor, e.g., radar processor 836 (FIG. 8), may be configured to determine azimuth spectrums for the 1D Rx antenna rows 2586, e.g., at a first processing step; and to determine elevation spectrums for the 1D Rx antenna columns 2584, e.g., at a second processing step, for example, using operations of the initialized IAA algorithm of Table 4 and/or the IAA algorithm of Table 3.

In some demonstrative aspects, radar processor 836 (FIG. 8) may set an initial covariance matrix for a column/row, for example, based on a previously determined covariance matrix for a neighbor column/row, for example, based on a similarity of estimated spectrums of two neighbor columns/rows, e.g., as describe below.

In some demonstrative aspects, a similarity analysis may be performed, for example, with respect to spectrums estimated on two neighbor columns. For example, for simplicity of analysis it may be assumed that elevation BF on columns may be performed using a DAS BF algorithm, e.g., instead of the IAA algorithm.

In some demonstrative aspects, a far field 2D steering vector, denoted a, for a single target may be defined, e.g., as follows:

$$a(\theta_{el}, \theta_{az}, n, m) = \exp\left(j2\pi\frac{d_{el}}{\lambda} n \sin(\theta_{el})\right) \exp\left(j2\pi\frac{d_{az}}{\lambda} m \cos(\theta_{el}) \sin(\theta_{az})\right) \tag{20}$$

wherein, $\theta_{el}$ denotes an elevation angle, $\theta_{ez}$ denotes an azimuth angle, and n and m devote row and column antenna element indices, respectively.

In some demonstrative aspects, an Rx signal, denoted S, reflected from two targets, may be defined, e.g., as follows:

$$s(n, m) = c_1\ a_1(\theta_{el1}, \theta_{az1}, n, m) + c_2\ a_2(\theta_{el2}, \theta_{az2}, n, m) \tag{21}$$

wherein $a_1$ and $a_2$ denote two far field 2D steering vectors for the two targets, respectively, and wherein $c_1$ and $c_2$ denote two complex coefficients, e.g., representing amplitudes and/or phases, of the two targets, respectively.

In some demonstrative aspects, the DAS BF algorithm may be applied to an m-th antenna column to provide a beamforming output, denoted z, e.g., as follows:

$$\begin{aligned} z(\theta_{bf}, m) = \sum_n s(n, m) * w_n \exp\left(-j2\pi\frac{d_{el}}{\lambda} n (\sin(\theta_{elbf}))\right) = \\ c_1 \exp\left(j2\pi\frac{d_{az}}{\lambda} m \cos(\theta_{el_1}) \sin(\theta_{az_1})\right) \\ \sum_n w_n \exp\left(j2\pi\frac{d_{el}}{\lambda} n (\sin(\theta_{el_1}) - \sin(\theta_{elbf}))\right) + \\ c_2 \exp\left(j2\pi\frac{d_{az}}{\lambda} m \cos(\theta_{el_2}) \sin(\theta_{az_2})\right) \\ \sum_n w_n \exp\left(j2\pi\frac{d_{el}}{\lambda} n (\sin(\theta_{el_2}) - \sin(\theta_{elbf}))\right), \end{aligned} \tag{22}$$

wherein $w_n$ denotes a windowing function, and λ denotes a wavelength of the Rx signal.

In some demonstrative aspects, the sum in Equation 22 may be rewritten, e.g., as follows:

$$\sum_n w_n \exp\left(j2\pi\frac{d_{el}}{\lambda} n (\sin(\theta_{el1}) - \sin(\theta_{elbf}))\right) = W(u_1 - u_{bf}) \tag{23}$$

wherein W(u) denotes a beam pattern in a spatial spectrum domain, e.g., u=sin(θ).

In some demonstrative aspects, for a rectangular windowing function, the beam pattern may be synchronized. For example, a simplified expression for the BF output signal z may be determined, e.g., as follows:

$$z(u_{bf}, m) = c_1 \exp\left(j2\pi\frac{d_{az}}{\lambda} m\cos(\theta_{el_1})\sin(\theta_{az_1})\right)W(u_1 - u_{bf}) + c_2 \exp\left(j2\pi\frac{d_{az}}{\lambda} m\cos(\theta_{el_2})\sin(\theta_{az_2})\right)W(u_2 - u_{bf}) \quad (24)$$

In some demonstrative aspects, a COV matrix, denoted R, may be estimated by the IAA algorithm, for example, based on a power spectrum, denoted p, e.g., as follows:

$$(R = A\,\mathrm{diag}(p)A^H) \quad (25)$$

In some demonstrative aspects, an elevation power spectrum, denoted $p_{el}$, may be determined, for example, based on the BF output signal z, e.g., as follows:

$$p_{el}(u_{bf}, m) = z(u_{bf}, m) * z(u_{bf}, m)^* = |c_1|^2 W(u_1 - u_{bf})^2 + |c_2|^2 W(u_2 - u_{bf})^2 + 2Re\left(c_1c_2^* \exp\left(j2\pi\frac{d_{az}}{\lambda} m\cos(\theta_{el_1})\sin(\theta_{az_1}) - \cos(\theta_{el_2})\sin(\theta_{az_2})\right)\right) W(u_1 - u_{bf})W(u_2 - u_{bf})\Big) \quad (26)$$

In some demonstrative aspects, a difference, denoted $\Delta(u_{bf})$, between two spectrums of two adjacent antenna columns, e.g., a first spectrum of an antenna column m and a second spectrum of an adjacent antenna column m+i, may be determined, e.g., as follows:

$$\Delta(u_{bf}) = p_{el}(u_{bf}, m+1) - p_{el}(u_{bf}, m) = 2Re\Big(c_1c_2^* * W(u_1 - u_{bf})W(u_2 - u_{bf}) * \left(\exp\left(j2\pi\frac{d_{az}}{\lambda}(m+1)(\cos(\theta_{el_1})\sin(\theta_{az_1}) - \cos(\theta_{el_2})\sin(\theta_{az_2}))\right) - \exp\left(j2\pi\frac{d_{az}}{\lambda} m(\cos(\theta_{el_1})\sin(\theta_{az_1}) - \cos(\theta_{el_2})\sin(\theta_{az_2}))\right)\right)\Big) \quad (27)$$

In some demonstrative aspects, the angle θ may be substituted by the following expression:

$$\phi = (\cos(\theta_{el_1})\sin(\theta_{az_1}) - \cos(\theta_{el_2})\sin(\theta_{az_2})) \quad (28)$$

$$\Delta(u_{bf}) = 2Re\left(c_1c_2^* * W(u_1 - u_{bf})\, W(u_2 - u_{bf}) * \left(\exp\left(j2\pi\frac{d_{az}}{\lambda} m\,\phi\right)\right)\left(1 - \exp\left(j2\pi\frac{d_{az}}{\lambda}\phi\right)\right)\right)$$

to result in:

In some demonstrative aspects, one or more scenarios may be analyzed to estimate a behavior of the difference $\Delta(u_{bf})$ between the two spectrums of the two adjacent antenna columns, e.g., as descried below.

In some demonstrative aspects, in one or more use cases or scenarios, the difference $\Delta(u_{bf})$ between two spectrums of two adjacent antenna columns may be substantially equal to zero.

In one example, the difference $\Delta(u_{bf})$ between two spectrums of two adjacent antenna columns may be equal to zero, for example, when the targets are at different elevations, e.g., $\theta_{el_1} \neq \theta_{el_2}$.

For example, the difference $\Delta(u_{bf})$ may be equal to zero, e.g., when $W(u_1-u_{bf})W(u_2-u_{bf}) \rightarrow 0$, then $\Delta \rightarrow 0$.

In another example, the difference $\Delta(u_{bf})$ between two spectrums of two adjacent antenna columns may be equal to zero, for example, when targets are at relatively close elevations and relatively close azimuths, e.g., $\theta_{el_1} \cong \theta_{el_2}$ and $\theta_{az_1} \cong \theta_{az_2}$.

For example, the difference $\Delta(u_{bf})$ may be equal to zero, e.g., when:

$$\phi = \cos(\theta_{el_1})(\sin(\theta_{az_1}) - \sin(\theta_{az_2})) \rightarrow 0, \text{ then } \left(1 - \exp\left(j2\pi\frac{d_{az}}{\lambda}\phi\right)\right) \rightarrow 0.$$

In some demonstrative aspects, in one or more use cases or scenarios, the difference $\Delta(u_{bf})$ between two spectrums of two adjacent antenna columns may not be equal to zero.

In one example, the difference $\Delta(u_{bf})$ between two spectrums of two adjacent antenna columns may not be equal to zero, for example, when targets are at close elevation angles and different azimuth angles, e.g., $\theta_{el_1} \cong \theta_{el_2}$ and $\theta_{az_1} \neq \theta_{az_2}$: $|\phi|>0$.

In one example, according to a worst case scenario, for example, when the two elevation angles are equal, and the azimuth angles have a difference of 90 degrees, e.g., $\theta_{el_1} = \theta_{el_2} = 0$ and $\theta_{az_1} = 0$ deg and $\theta_{az_2} = 90$ deg, for example, when $$\frac{d_{az}}{\lambda} = 0.5 \text{ and } c_1 = c_2,$$

then $\phi=1$, and the difference $\Delta(u_{bf})$ may be defined, e.g., as follows:

$$\Delta = 2Re\left(c_1c_2^* * W(u_1 - u_{bf})W(u_1 - u_{bf}) * \left(2\exp\left(j2\pi\frac{d_{az}}{\lambda} m\right)\right)\right) = -2|c_1|^2 W(u_1 - u_{bf})^2 \quad (29)$$

For example, the elevation spectrum may be defined, e.g., as follows:

$$p_{el}(u_{bf}, m) = 2|c_1|^2 W(u_1 - u_{bf})^2 \text{ and } p_{el}(u_{bf}, m+1) = 0 \quad (30)$$

In some demonstrative aspects, one or more simulations may be performed, for example, to determine performance of the modified IAA algorithm, for example, in the worst-case scenario, e.g., when the elevation angles are close or equal, and the azimuth angles are different.

Figure 26A:
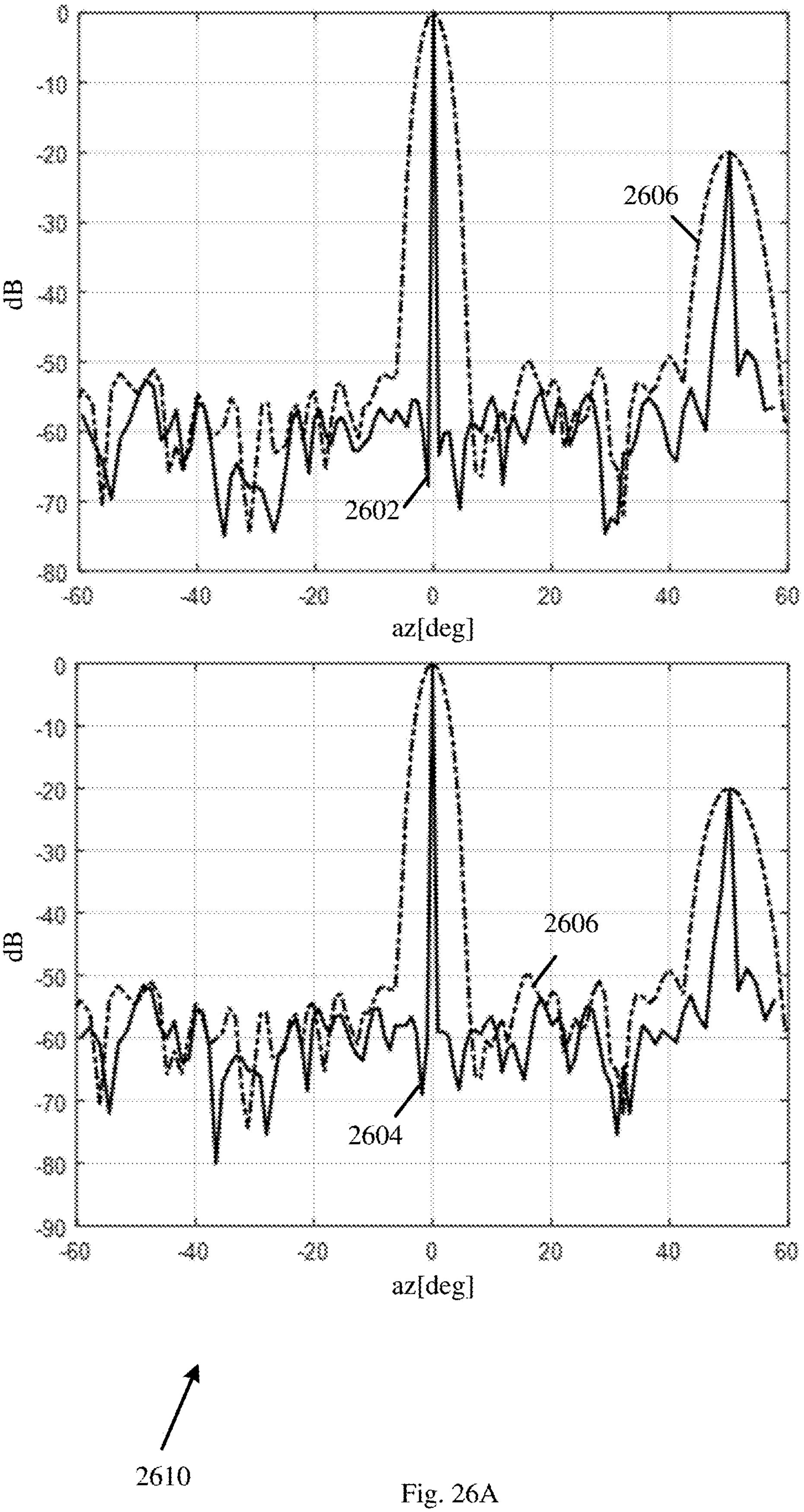
FIG. 26A is a schematic illustration of graphs depicting azimuth spectrums.
Figure 26B:
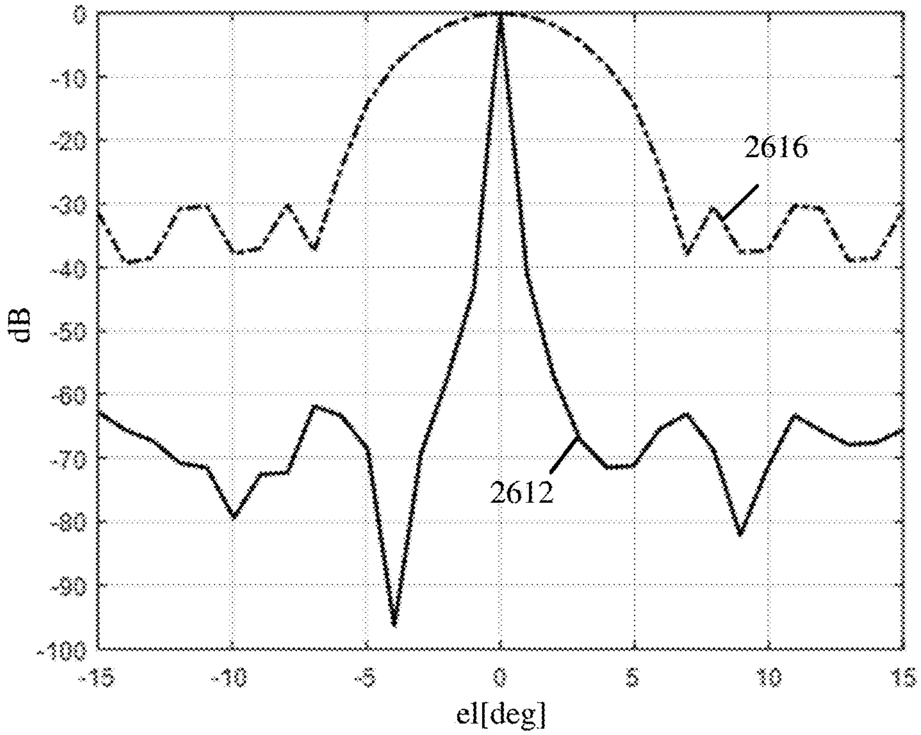
FIG. 26B is a schematic illustration of graphs depicting elevation spectrums, in accordance with some demonstrative aspects.
Figure 26B:
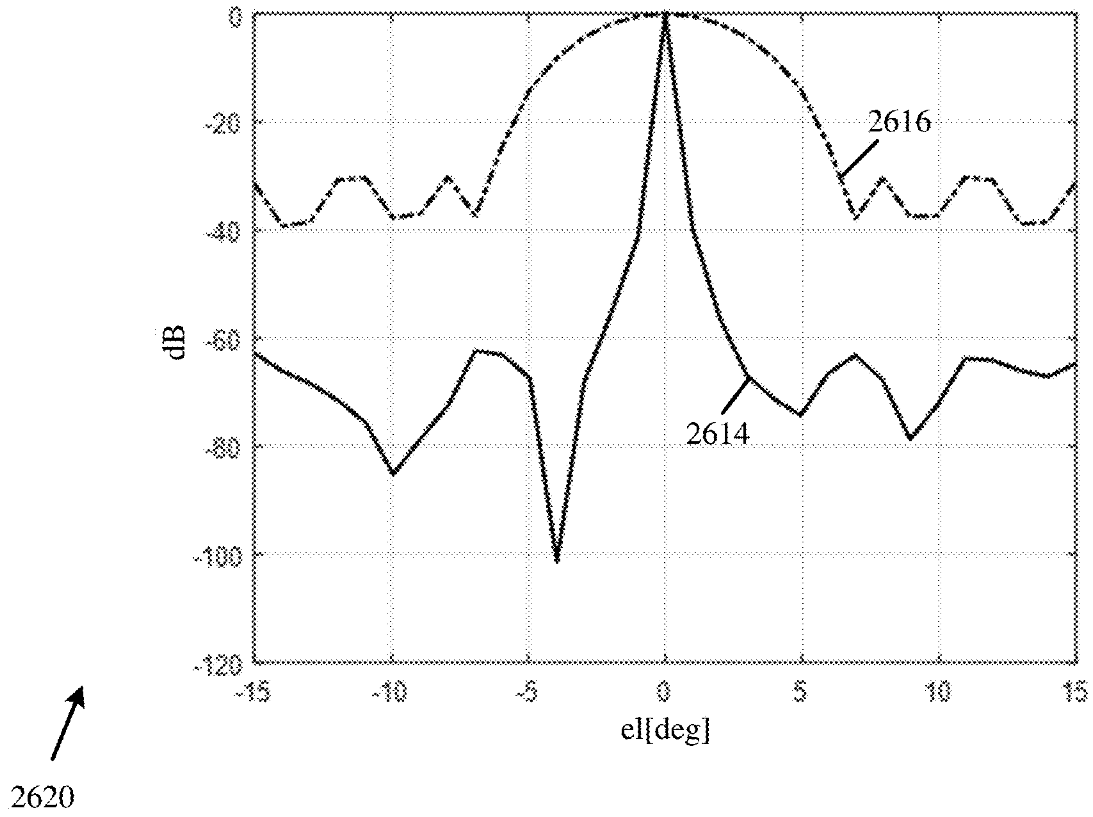

Reference is made to FIG. 26A, which schematically illustrates graphs 2610 depicting azimuth spectrums, and to FIG. 26B, which schematically illustrates graphs 2620 depicting elevation spectrums, in accordance with some demonstrative aspects.

In one example, the graphs of FIGS. 26A and 26B depict simulation results for an antenna array having a size of 16 rows and 48 columns at a first scenario including two targets having a same elevation angle and different azimuth angles. For example, the two targets may have the following attributes:

target 1—El=0, Az=0, RCS=30 dB (range=15 m), random phase target 2—El=0, Az=50, RCS=10 dB (range=15 m), random phase In one example, a curve 2602 depicts an azimuth spectrum based on the IAA algorithm. For example, curve 2602 may represent simulation results of the antenna array, when all antenna columns and rows are processed using the IAA algorithm, for example, according to the operations of Table 3, e.g., using 5 iterations of the IAA algorithm for each column/row.

In one example, a curve 2604 depicts an azimuth spectrum based on the modified IAA algorithm, for example, according to operations of Table 4, for example, using only 1 iteration of the IAA algorithm, e.g., based on a previously determined covariance matrix. For example, curve 2604 may represent simulation results of the antenna array, when the first antenna column is processed according to the IAA algorithm, and all the other antenna columns are processed according to the modified IAA algorithm, e.g., using a single iteration, for example, according to the operations of Table 4.

In one example, a curve 2606 depicts an azimuth spectrum, for example, based on the DAS BF algorithm.

In some demonstrative aspects, as may be seen from a comparison between curve 2604 and curve 2602 the modified IAA algorithm may provide results similar to the IAA algorithm, for example, with a reduced computation complexity resulting form the use of only one iteration, e.g., instead of 5 iterations.

In some demonstrative aspects, as shown in FIG. 26B, a curve 2612 depicts an elevation spectrum based on the IAA algorithm. For example, curve 2612 may represent simulation results of the antenna array, when all antenna columns and rows are processed using the IAA algorithm, for example, according to the operations of Table 3, e.g., using 5 iterations of the IAA algorithm for each column/row.

In one example, a curve 2614 depicts an elevation spectrum based on the modified IAA algorithm, for example, according to operations of Table 4, for example, using only 1 iteration of the IAA algorithm, e.g., based on a previously determined covariance matrix. For example, curve 2614 may represent simulation results of the antenna array, when the first antenna row is processed according to the IAA algorithm, and all the other antenna rows are processed according to the modified IAA algorithm, e.g., using a single iteration, for example, according to the operations of Table 4.

In one example, a curve 2616 depicts an elevation spectrum, for example, based on the DAS BF algorithm.

In some demonstrative aspects, as may be seen from a comparison between curve 2614 and curve 2612 the modified IAA algorithm may provide results similar to the IAA algorithm, for example, with a reduced computation complexity resulting form the use of only one iteration, e.g., instead of 5 iterations.

Figure 27A:
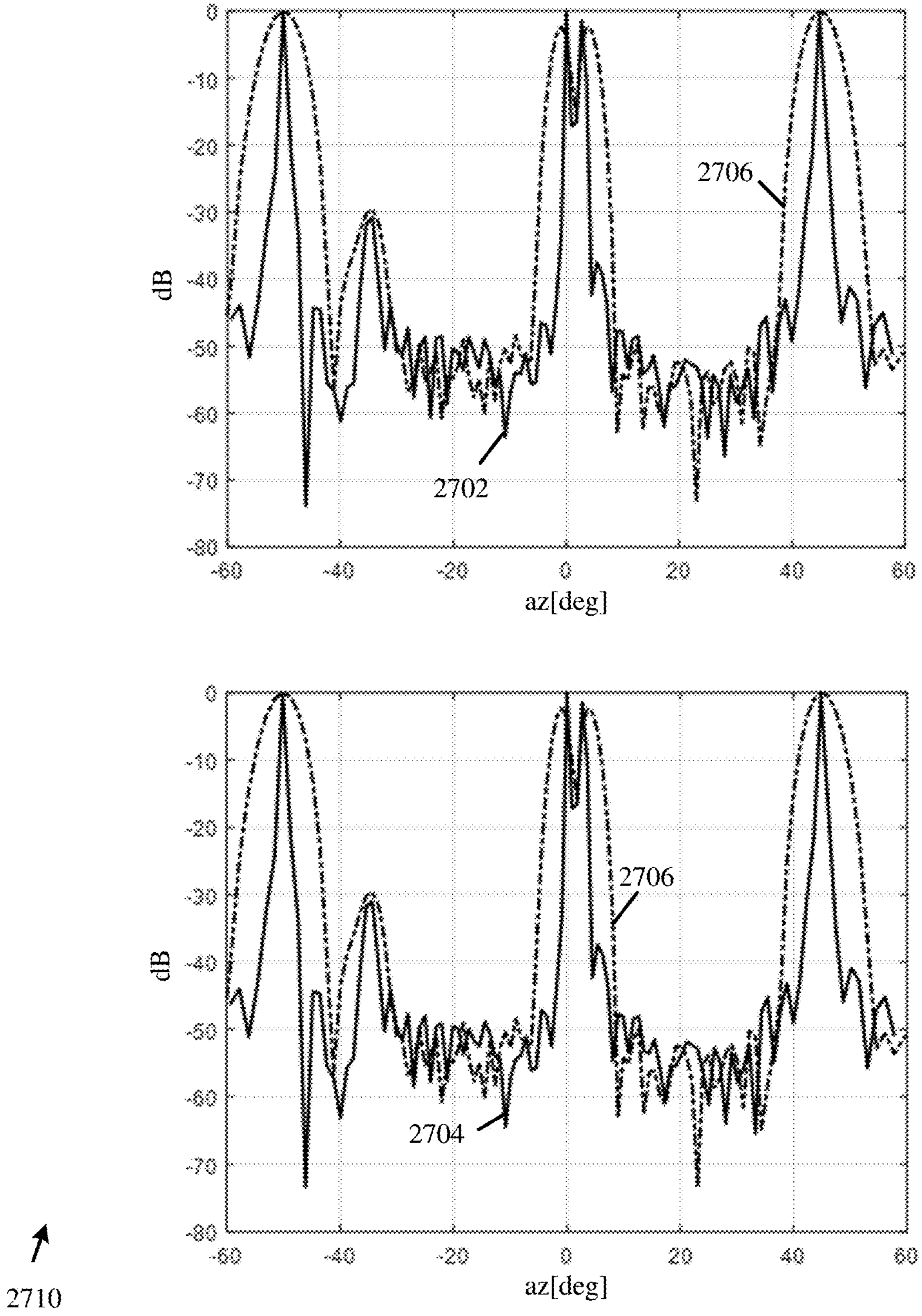
FIG. 27A is a schematic illustration of graphs depicting azimuth spectrums.
Figure 27B:
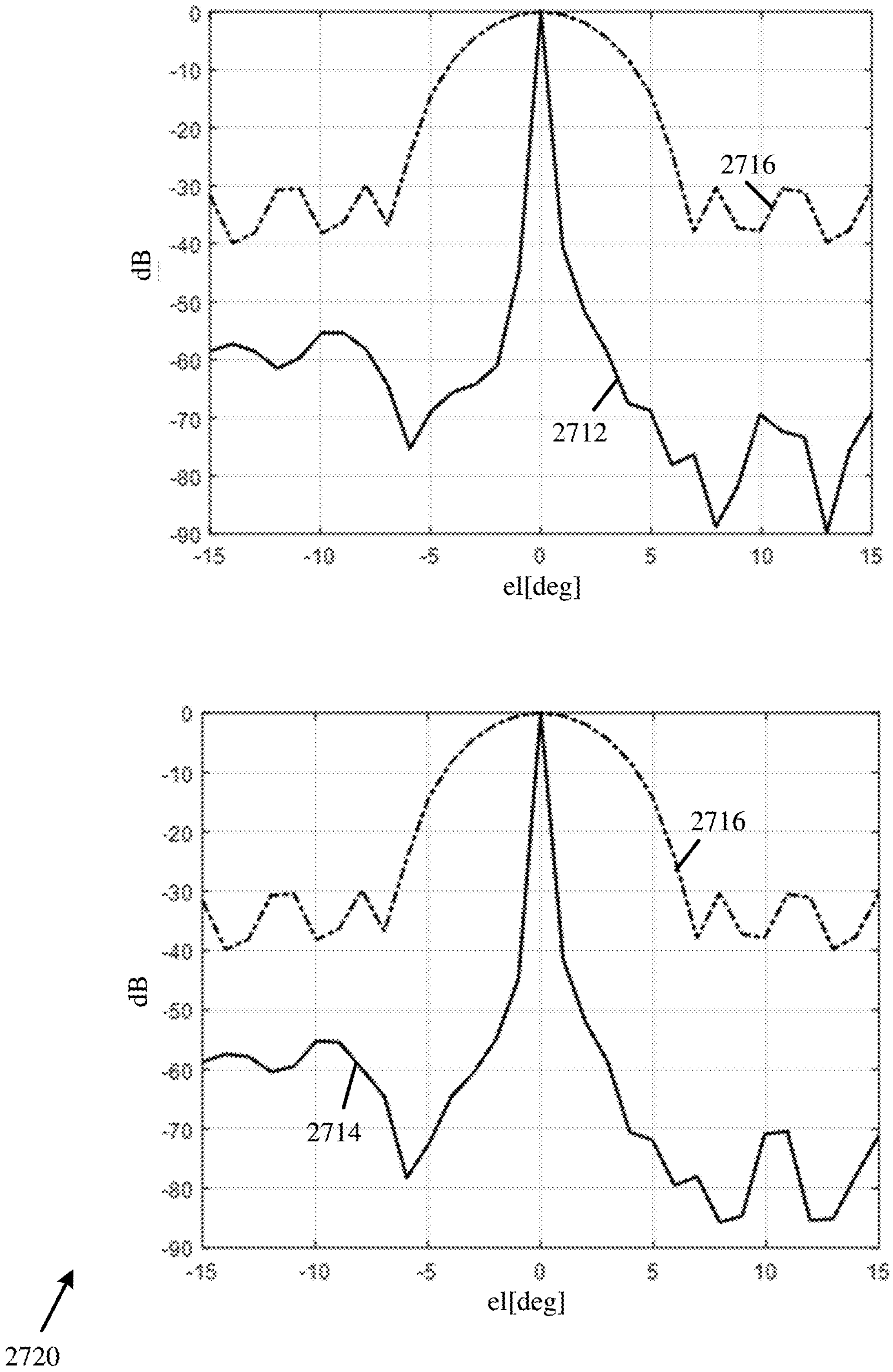
FIG. 27B is a schematic illustration of graphs depicting elevation spectrums, in accordance with some demonstrative aspects.

Reference is made to FIG. 27A, which schematically illustrates graphs 2710 depicting azimuth spectrums, and to FIG. 27B, which schematically illustrates graphs 2720 depicting elevation spectrums, in accordance with some demonstrative aspects.

In one example, the graphs of FIGS. 27A and 27B depict simulation results for an antenna array having a size of 16 rows and 48 columns at a second scenario including five targets having the same elevation angles and different azimuth angles. For example, the five targets may have the following attributes:

target 1—El=0, Az=−50, RCS=30 dB, random phase target 2—El=0, Az=−35, RCS=0 dB, random phase target 3—El=0, Az=0, RCS=30 dB, random phase target 4—El=0, Az=3, RCS=30 dB, random phase target 5—El=0, Az=45, RCS=10 dB, random phase In one example, a curve 2702 depicts an azimuth spectrum based on the IAA algorithm. For example, curve 2702 may represent simulation results of the antenna array, when all antenna columns and rows are processed using the IAA algorithm, for example, according to the operations of Table 3, e.g., using 5 iterations of the IAA algorithm for each column/row.

In one example, a curve 2704 depicts an azimuth spectrum based on the modified IAA algorithm, for example, according to operations of Table 4, for example, using only 1 iteration of the IAA algorithm, e.g., based on a previously determined covariance matrix. For example, curve 2704 may represent simulation results of the antenna array, when the first antenna column is processed according to the IAA algorithm, and all the other antenna columns are processed according to the modified IAA algorithm, e.g., using a single iteration, for example, according to the operations of Table 4.

In one example, a curve 2706 depicts an azimuth spectrum, for example, based on the DAS BF algorithm.

In some demonstrative aspects, as may be seen from a comparison between curve 2704 and curve 2702 the modified IAA algorithm may provide results similar to the IAA algorithm, for example, with a reduced computation complexity resulting form the use of only one iteration.

In some demonstrative aspects, as shown in FIG. 27B, a curve 2712 depicts an elevation spectrum based on the IAA algorithm. For example, curve 2712 may represent simulation results of the antenna array, when all antenna columns and rows are processed using the IAA algorithm, for example, according to the operations of Table 3, e.g., using 5 iterations of the IAA algorithm for each column/row.

In one example, a curve 2714 depicts an elevation spectrum based on the modified IAA algorithm, for example, according to operations of Table 4, for example, using only 1 iteration of the IAA algorithm, e.g., based on a previously determined covariance matrix. For example, curve 2714 may represent simulation results of the antenna array, when the first antenna row is processed according to the IAA algorithm, and all the other antenna rows are processed according to the modified IAA algorithm, e.g., using a single iteration, for example, according to the operations of Table 4.

In one example, a curve 2716 depicts an elevation spectrum, for example, based on the DAS BF algorithm.

In some demonstrative aspects, as may be seen from a comparison between curve 2714 and curve 2712 the modified IAA algorithm may provide results similar to the IAA algorithm, for example, with a reduced computation complexity resulting form the use of only one iteration, e.g., instead of 5 iterations.

Figure 28:
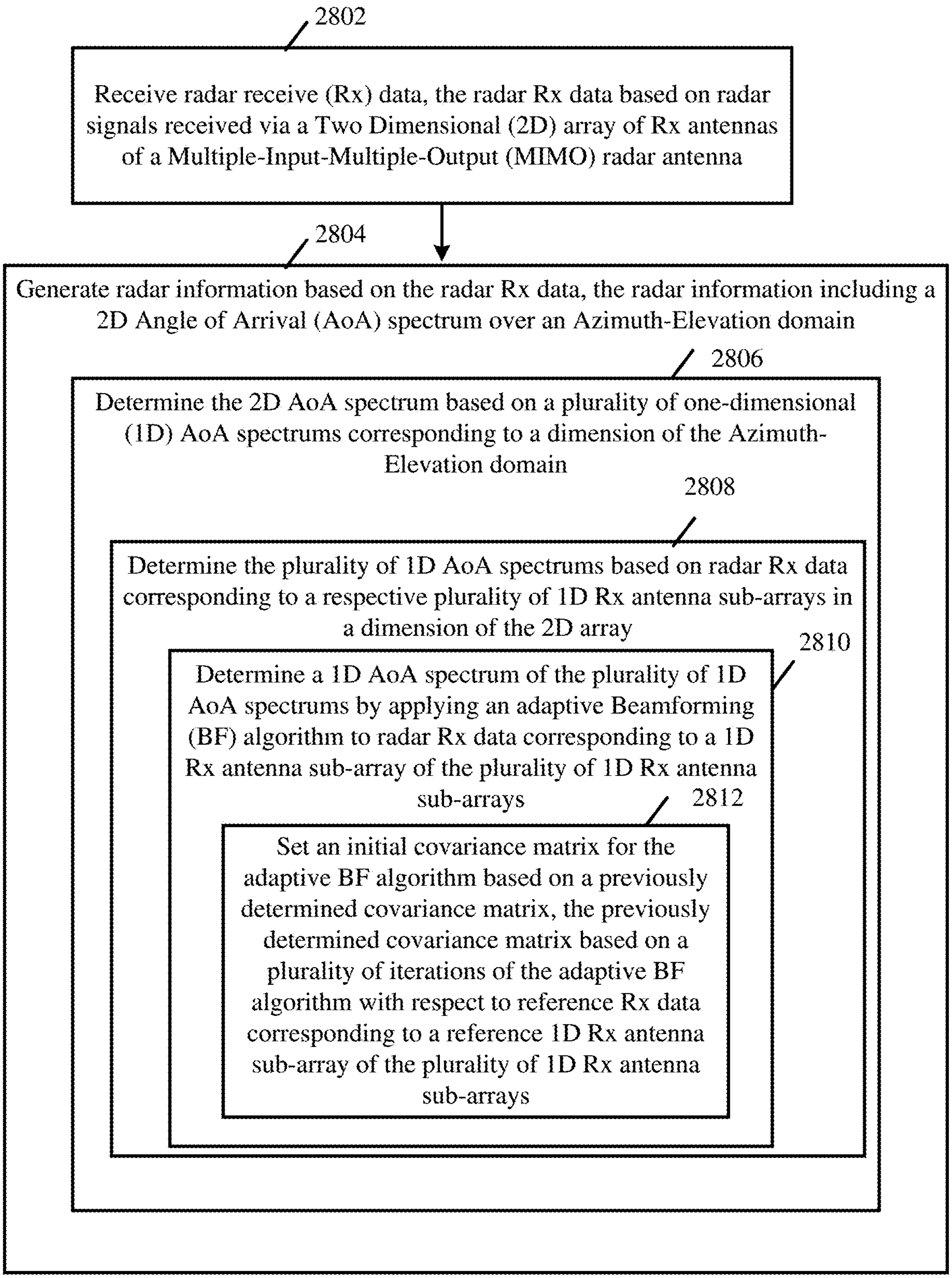
FIG. 28 is a schematic flow-chart illustration of a method of determining a 2D AoA spectrum, in accordance with some demonstrative aspects.

Reference is made to FIG. 28, which schematically illustrates a method of determining a 2D AoA spectrum, in accordance with some demonstrative aspects. For example, one or more of the operations of the method of FIG. 28 may be performed by a radar processor, e.g., radar processor 836 (FIG. 8).

As indicated at block 2802, the method may include receiving radar Rx data, the radar Rx data based on radar signals received via a 2D array of Rx antennas of a MIMO radar antenna. For example, radar processor 836 (FIG. 8) may receive, e.g., via input 832 (FIG. 8), the radar Rx data 811 (FIG. 8) based on the radar signals received via the 2D array of Rx antennas 816 (FIG. 8), e.g., as described above.

As indicated at block 2804, the method may include generating radar information based on the radar Rx data, the radar information including a 2D AoA spectrum over an Azimuth-Elevation domain. For example, radar processor 836 (FIG. 8) may generate radar information 813 (FIG. 8) including the 2D AoA spectrum over the Azimuth-Elevation domain based on the radar Rx data 811 (FIG. 8), e.g., as described above.

As indicated at block 2806, generating the radar information may include determining the 2D AoA spectrum based on a plurality of 1D AoA spectrums corresponding to a dimension of the Azimuth-Elevation domain. For example, radar processor 836 (FIG. 8) may determine the 2D AoA spectrum based on the plurality of 1D AoA spectrums corresponding to the dimension of the Azimuth-Elevation domain, e.g., as described above.

As indicated at block 2808, determining the 2D AoA spectrum based on the plurality of 1D AoA spectrums may include determining the plurality of 1D AoA spectrums based on radar Rx data corresponding to a respective plurality of 1D Rx antenna sub-arrays in a dimension of the 2D array. For example, radar processor 836 (FIG. 8) may determine the plurality of 1D AoA spectrums based on the radar Rx data 811 (FIG. 1) corresponding to the respective plurality of 1D Rx antenna sub-arrays in the dimension of the 2D array, e.g., as described above.

As indicated at block 2810, determining the plurality of 1D AoA spectrums may include determining a 1D AoA spectrum of the plurality of 1D AoA spectrums by applying an adaptive BF algorithm to radar Rx data corresponding to a 1D Rx antenna sub-array of the plurality of 1D Rx antenna sub-arrays. For example, radar processor 836 (FIG. 8) may determine the 1D AoA spectrum by applying the adaptive BF algorithm to radar Rx data corresponding to the 1D Rx antenna sub-array of the plurality of 1D Rx antenna sub-arrays, e.g., as described above.

As indicated at block 2812, determining the 1D AoA spectrum may include setting an initial covariance matrix for the adaptive BF algorithm based on a previously determined covariance matrix, which is based on a plurality of iterations of the adaptive BF algorithm with respect to reference Rx data corresponding to a reference 1D Rx antenna sub-array of the plurality of 1D Rx antenna sub-arrays. For example, radar processor 836 (FIG. 8) may set the initial covariance matrix for the adaptive BF algorithm based on the previously determined covariance matrix, which is based on the plurality of iterations of the adaptive BF algorithm with respect to reference Rx data corresponding to the reference 1D Rx antenna sub-array of the plurality of 1D Rx antenna sub-arrays, e.g., as described above.

Referring to FIG. 8, in some demonstrative aspects, radar processor 834 may be configured to generate the radar information 813 including radar data (also referred to as "processed radar information"), for example, based on radar Rx data 811, e.g., as described below.

In some demonstrative aspects, the radar data may correspond, for example, to a plurality of range-Doppler values on a range-Doppler map, e.g., as described below.

In some demonstrative aspects, radar processor 834 may be configured to determine the radar data, for example, by applying to the radar Rx data 811 a Cross Correlation (XCORR) operation and/or any other operation, function and/or algorithm.

In some demonstrative aspects, the radar data may include, for example, information of a radar frame, e.g., as described below. In other aspects, the aspects, the radar data may include any other type and/or format of radar data, e.g., intermediate data, and/or processed data, which may be based on the radar Rx data 811.

In some demonstrative aspects, the radar data may be in the form of a radar frame, which may correspond to a plurality of range values, a plurality of Doppler values, a plurality of Rx channels, and a plurality of Tx channels, e.g., as described below.

In some demonstrative aspects, the plurality of range values may include a plurality of range bins, which may be configured based on a setting and/or implementation of a radar device implementing radar processor 834, e.g., radar device 101 (FIG. 1).

In some demonstrative aspects, the plurality of Doppler values may include a plurality of Doppler bins (Chirps), which may be configured based on a setting and/or implementation of the radar device implementing radar processor 834, e.g., radar device 101 (FIG. 1).

In some demonstrative aspects, the plurality of Rx channels may correspond to the plurality of Rx antennas 816 and/or Rx chains 831.

In some demonstrative aspects, the plurality of Tx channels may correspond to the plurality of Tx antennas 814 and/or Tx chains 810.

In some demonstrative aspects, radar processor 834 may be configured to determine the radar information 813 to include radar target information, for example, by processing the radar data, e.g., as described below.

In some demonstrative aspects, the target information may include, for example, information with respect to objects in an environment of radar frontend 804. For example, the target information may include a class, a location, an orientation, a velocity, an intention, a perceptional understanding of the environment, and/or any other information corresponding to the object in the environment.

In some demonstrative aspects, there may be a need to address one or more technical issues, for example, when processing the radar data, for example, to determine the target information, e.g., as described below.

In some demonstrative aspects, different objects in the environment may have different characteristic features. For example, a first type of an object, for example, an infrastructure object, e.g., a building, may be characterized by a shape and a location, while a second type of object, for example, vehicle may be characterized by a speed, a direction, a shape and a location.

In some demonstrative aspects, radar processor 834 may be configured to generate radar information 813 including different types of parameters for different types of objects.

In some demonstrative aspects, radar processor 834 may be configured to generate a first type of radar information corresponding to a first type of an object, and a second type of radar information corresponding to a second type of an object.

In one example, radar processor 834 may be configured to generate a first type of radar information corresponding to an infrastructure object, e.g., a building. For example, the radar information corresponding to the infrastructure object may include an estimation of a shape and/or location of the infrastructure object.

In another example, radar processor 834 may be configured to generate a second type of radar information corresponding to a fast moving object, e.g., a fast moving car. For example, the radar information corresponding to the fast moving object may include an estimation of a position of the fast moving object, and/or a velocity vector of the fast moving object.

In some demonstrative aspects, there may be one or more disadvantages, inefficiencies, and/or technical problems when determining the radar target information by implementing a same, e.g., a single, algorithm set for all types of objects of interest.

For example, it may be useful to use a same particular algorithm set for all objects, for example, for specific types of targets for a specific system and/or use case. For example, a particular algorithm set may be useful for an air traffic radar, which may be interested only in airplane objects.

In some demonstrative aspects, implementing the same algorithm set for different types of targets may result in degraded performance and/or a degraded efficiency.

In some demonstrative aspects, there may be one or more disadvantages, inefficiencies, and/or technical problems of an implementation utilizing complex logic, which may be configured to provide a high level of precision, e.g., regardless of the type of objects being processed. For example, such an implementation of complex logic may be suboptimal in terms of processing power. For example, the implementation of the complex logic may consume a large amount of processing power, in a way, which may not be feasible for commercial products.

In some demonstrative aspects, radar processor 834 may be configured to implement a region-based mapping scheme, which may be configured to support processing the radar data based on characteristic features of different types of objects, e.g., as described below.

In some demonstrative aspects, the region-based mapping scheme may support a technical solution for determining the target information with an improved level of accuracy and/or efficiency, e.g., as described below.

In some demonstrative aspects, radar processor 834 may be configured to divide processed radar information, e.g., 4D cube information, into a plurality of regions, which may be defined, for example, with respect to different types of objects, e.g., as described below.

In some demonstrative aspects, radar processor 834 may be configured to divide the processed radar information, e.g., the 4D cube information, into a plurality of 2-dimensional (2D) regions, e.g., as described below. In other aspects, radar processor 834 may be configured to divide processed radar information, e.g., 4D cube information, into any other plurality of regions, e.g., regions of any other dimensions.

In some demonstrative aspects, radar processor 834 may be configured to divide the processed radar information, e.g., the 4D cube information, into a plurality of 2D range-Doppler regions on the range-Doppler map, e.g., as described below. In other aspects, radar processor 834 may be configured to divide the processed radar information, e.g., 4D cube information, into any other plurality of regions, e.g., on any other map and/or with respect to any other dimensions.

In some demonstrative aspects, the plurality of regions may be configured and/or defined, for example, such that different regions may be expected to include targets of different types.

For example, the plurality of regions may be configured and/or defined, for example, such that a first type of targets may be expected to be found in a first region, and/or a second type of targets may be expected to be found in a second region, e.g., as described below.

In some demonstrative aspects, the plurality of regions may include, for example, a static-object region, which may be expected to include static objects, e.g., an infrastructure object, buildings, and the like, e.g., as described below.

In some demonstrative aspects, the plurality of regions may include, for example, a slow-moving-object region, which may be expected to include slow moving objects, e.g., pedestrians, a slow-moving vehicle, and the like, e.g., as described below.

In some demonstrative aspects, the plurality of regions may include, for example, a fast-moving-close-range-object region, which may be expected to include fast-moving close objects, e.g., cars, motorcycles, trucks and the like, e.g., as described below.

In some demonstrative aspects, the plurality of regions may include, for example, a fast-moving-far-range region, which may be expected to include fast-moving far objects, e.g., cars, trucks and the like, e.g., as described below In other aspects, any other additional or alternative regions may be defined with respect to any other additional or alternative types of objects.

In some demonstrative aspects, radar processor 834 may be configured to implement and/or support implementation of different radar processing logic and/or radar processing algorithms for processing radar information in the plurality of regions, e.g., as described below.

In some demonstrative aspects, the ability to selectively apply different radar processing logic and/or radar processing algorithms, for example, based on the region-based mapping scheme, may provide a technical advantage of improved performance and/or increased accuracy of the generated target information.

In some demonstrative aspects, the ability to selectively apply different radar processing logic and/or radar processing algorithms, for example, based on the region-based mapping scheme, may support implementation of a flexible software-defined solution for processing the radar information.

In some demonstrative aspects, radar processor 834 may be configured to apply different processing methods and/or algorithms to different regions, e.g., as described below.

In some demonstrative aspects, radar processor 834 may be configured to apply to processed radar information in a first region one or more first processing methods and/or algorithms, which may be configured for a first type of targets expected to be found in the first region, e.g., as described below.

In some demonstrative aspects, radar processor 834 may be configured to apply to processed radar information in a second region one or more second processing methods and/or algorithms, which may be configured for a second type of targets expected to be found in the second region. For example, the one or more second processing methods and/or algorithms may be different from the one or more first processing methods and/or algorithms. In one example, the one or more second processing methods and/or algorithms may include one or more processing methods and/or algorithms, which are not included in the one or more first processing methods and/or algorithms. In another example, the one or more second processing methods and/or algorithms may not include one or more processing methods and/or algorithms, which are included in the one or more first processing methods and/or algorithms. In another example, the one or more first processing methods and/or algorithms may include a particular processing method and/or algorithm utilizing one or more first settings and/or parameters, and the one or more second processing methods and/or algorithms may include the same particular processing method and/or algorithm utilizing one or more second settings and/or parameters, e.g., different from the one or more first settings and/or parameters.

In some demonstrative aspects, the assignment of different radar processing logic and/or radar processing algorithms to the different regions may be based, for example, on a-priori data, which may include, for example, radar limitations of radar front end 804, and/or behavior of real-life objects.

In other aspects, the assignment of different radar processing logic and/or radar processing algorithms to the different regions may be based on any other additional or alternative criteria and/or information.

In some demonstrative aspects, definition of the plurality of the regions, and/or the assignment of different radar processing logic and/or radar processing algorithms to the regions may be pre-configured, for example, during manufacturing and/or installation.

In other aspects, definition of one or more of the regions and/or the assignment of one or more radar processing logic and/or radar processing algorithms to the regions may be configured and/or updated in real-time, e.g., on the fly, based on one or more criteria and/or parameters.

In some demonstrative aspects, radar processor 834 may be configured modify and/or update the definition of one or more of the regions and/or the assignment of one or more radar processing logic and/or radar processing algorithms to the regions, for example, based on radar limitations of radar front end 804, e.g., a limited SNR, a spatial resolution, and/or any other condition, criteria and/or parameter.

In some demonstrative aspects, radar processor 834 may be configured to generate radar target information by processing the radar data, for example, according to the region-based mapping scheme, e.g., as described below.

In some demonstrative aspects, the region-based mapping scheme may include a mapping between a plurality of range-Doppler regions on the Range-Doppler map and a plurality of radar processing algorithms, e.g., as described below.

In some demonstrative aspects, the region-based mapping scheme may be configured, for example, to define for a range-Doppler region at least one radar processing algorithm of the plurality of radar processing algorithms, e.g., as described below.

In some demonstrative aspects, radar processor 834 may be configured to process the radar data, for example, by processing radar data corresponding to range-Doppler values within the range-Doppler region according to the at least one radar processing algorithm defined for the range-Doppler region, e.g., as described below.

In some demonstrative aspects, the region-based mapping scheme may be configured to define a first radar processing algorithm for a first range-Doppler region, and/or to define a second radar processing algorithm for a second range-Doppler region. For example, the second radar processing algorithm may be different from the first radar processing algorithm, e.g., as described below.

In some demonstrative aspects, radar processor 834 may be configured to process radar data corresponding to one or more range-Doppler values within the first range-Doppler region according to the first radar processing algorithm, and to process radar data corresponding to one or more range-Doppler values within the second range-Doppler region according to the second radar processing algorithm, e.g., as described below.

In some demonstrative aspects, radar processor 834 may be configured to selectively process radar data corresponding to range-Doppler values from one or more selected range-Doppler regions of the plurality of range-Doppler regions, e.g., as described below.

In some demonstrative aspects, radar processor 834 may be configured to selectively process radar data corresponding to range-Doppler values from a first region, while selecting not to process radar data corresponding to range-Doppler values from one or more second regions.

In some demonstrative aspects, radar processor 834 may be configured to selectively prioritize processing of radar data corresponding to range-Doppler values from a first region, for example, before processing radar data corresponding to range-Doppler values from one or more second regions.

In one example, radar processor 834 may be configured to select to prioritize processing of radar data corresponding to range-Doppler values from a slow-moving-object region and/or a fast-moving-close-range-object region, for example, when using low computational resources, e.g., which may not support processing of the radar data corresponding to range-Doppler values from all regions. For example, the slow-moving-object region and/or the fast-moving-close-range-object region may include targets having a higher risk of collision.

In other aspects, radar processor 834 may be configured to selectively process and/or prioritize processing of radar data corresponding to range-Doppler values of any other additional or alternative regions, for example, based on any other criteria or condition.

In some demonstrative aspects, the region-based mapping scheme may define a mapping of a static-object region to a radar processing algorithm configured for static objects, e.g., as described below.

In some demonstrative aspects, the static-object region may include range-Doppler values having a very slow velocity, for example, a zero velocity, a near-zero velocity, or any other velocity below a "slow velocity" threshold, e.g., as described below.

In other aspects, the static-object region may be defined to include any other additional or alternative range-Doppler values, e.g., based on any other suitable criteria. apply to radar data corresponding to one or more of the range-Doppler values in the static-object region a radar processing algorithm configured for static objects, for example, a super-resolution algorithm, e.g., as described below. In other aspects, any other additional or alternative types of radar processing algorithms may be applied for processing the radar data corresponding to range-Doppler values in the static-object region.

In one example, the use of the super-resolution algorithm for the static objects may enable better separation between objects, and therefore, may be applied to areas with dense static targets.

Figure 29:
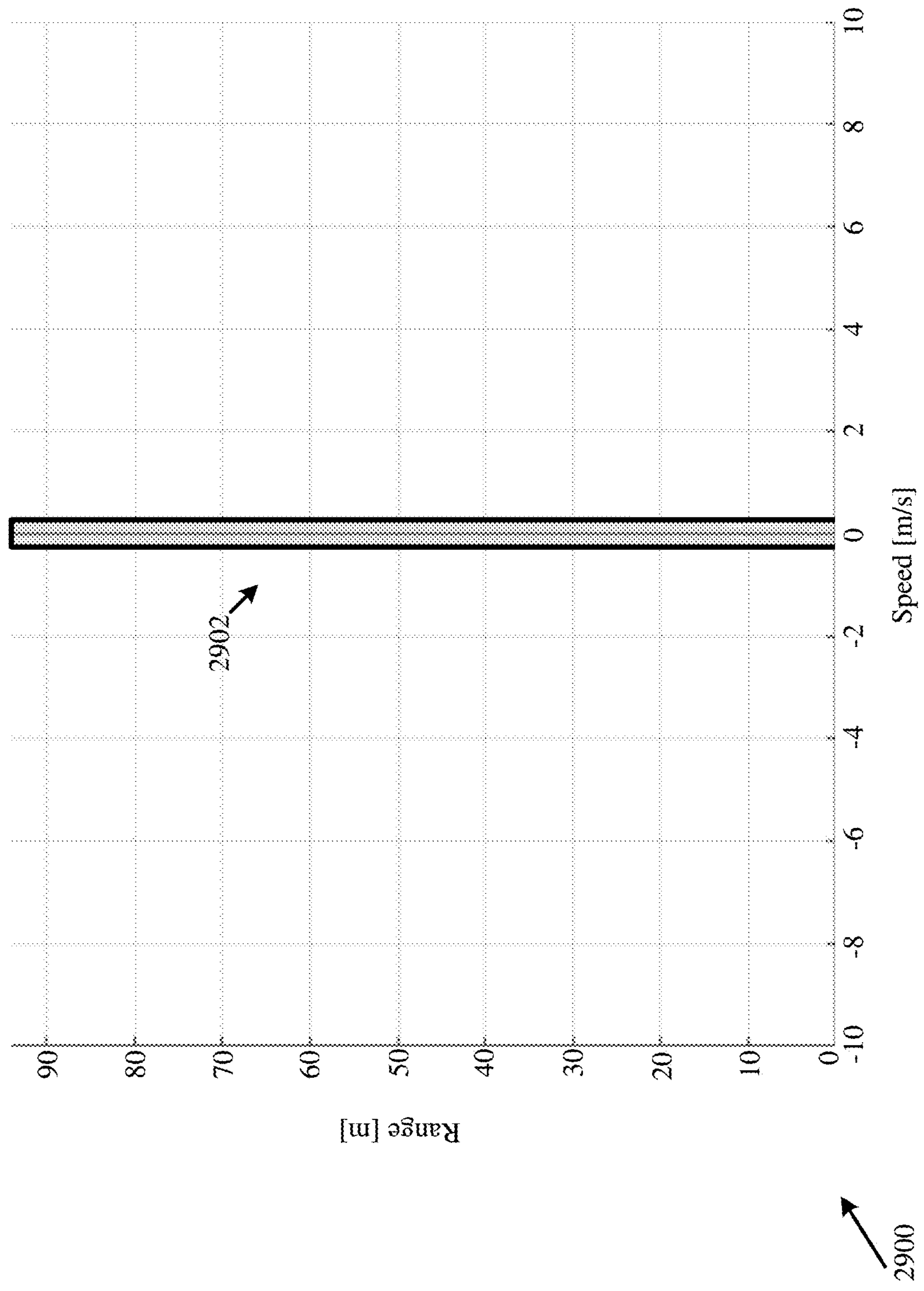
FIG. 29 is a schematic illustration of illustrates a static-object region on a Range-Doppler map, in accordance with some demonstrative aspects.

Reference is made to FIG. 29, which schematically illustrates a static-object region 2902 on a Range-Doppler map 2900, in accordance with some demonstrative aspects.

In one example, the X-axis of Range-Doppler map 2900 depicts a radial velocity of a target with respect to a radar frontend, e.g., radar frontend 804 (FIG. 8), and the Y-axis of Range-Doppler map 2900 depicts a distance of the target from the radar frontend.

In some demonstrative aspects, as shown in FIG. 29, the static-object region 2902 may include range-Doppler values having a zero velocity.

In one example, static-object region 2902 may be defined on Range-Doppler map 2900, for example, with respect to a static radar. According to this example, as shown in FIG. 29, the static-object region 2902 may be defined to include the range-Doppler values corresponding to a zero or near-zero velocity.

In some demonstrative aspects, for example, in case of a moving radar, the static-object region 2902 may be defined, for example, based on a speed of the moving radar.

In some demonstrative aspects, static-object region 2902 may be expected to include, for example, static objects, e.g., buildings, signs, infrastructure objects, and/or the like.

In some demonstrative aspects, the range-Doppler values in the static-object region 2902 may be divided into range-Doppler values corresponding to static objects, and a clutter of "echo" range-Doppler values including undesired echoes in the radar image, e.g., as described below.

In some demonstrative aspects, the clutter of echo range-Doppler values may include, for example, range-Doppler values resulting from echoes from a road, which may appear with low SNR at close distances, echoes from a vehicle, on which the radar is mounted, and/or the like.

In some demonstrative aspects, radar processor 834 (FIG. 8) may be configured to identify radar data corresponding to the clutter of echo range-Doppler values, and to optionally remove some or all radar data corresponding to the clutter of echo range-Doppler values from further radar processing, e.g., as the radar data corresponding to the clutter of echo range-Doppler values may not be important for the radar processing.

In some demonstrative aspects, the static objects may be considered as distributed objects and/or may not be limited by size and/or shape.

In some demonstrative aspects, a shape and/or position of the static objects may be estimated, for example, even without further estimating other parameters of the static objects, e.g., a center of mass, a speed, and the like, which may be of less importance.

In some demonstrative aspects, a radar processor, e.g., radar processor 834 (FIG. 8), may be configured to apply one or more super resolution algorithms to process radar data corresponding to range-Doppler values in the static-object region 2902. For example, a static environment may be expected to be typically very dense. Accordingly, applying the super resolution algorithms may support an improved degree of separation between adjacent objects, e.g., buildings or other static objects in a dense environment.

In some demonstrative aspects, a radar processor, e.g., radar processor 834 (FIG. 8), may be configured to apply to radar data corresponding to range-Doppler values of one or more predefined types of objects in the static-object region 2902 one or more particular radar processing algorithms, which may be configured for these predefined types of objects.

In some demonstrative aspects, a radar processor, e.g., radar processor 834 (FIG. 8), may be configured to differentiate between a first type of static objects, e.g., having a first size, a first shape and/or a first location, and a second type of static objects, e.g., having a second size, a second shape, and/or a second location.

In some demonstrative aspects, a radar processor, e.g., radar processor 834 (FIG. 8), may be configured to differentiate between a first type of objects and a second type of objects, for example, based on sizes and positions of the objects.

In one example, a radar processor of a vehicle, e.g., radar processor 834 (FIG. 8), may be configured to identify a bridge scenario in an environment including one or more bridges.

For example, the radar processor, e.g., radar processor 834 (FIG. 8), may be configured to process radar data corresponding to the range-Doppler values in the static-object region 2902, e.g., according to a super resolution algorithm, which may be configured to differentiate between radar data of range-Doppler values corresponding to different types of objects, for example, even if the objects are located at close positions.

For example, the radar processor, e.g., radar processor 834 (FIG. 8), may be configured to process the radar data corresponding to range-Doppler values in the static-object region 2902 to differentiate between radar data of range-Doppler values corresponding to a bridge, for example, by identifying radar data of range-Doppler values corresponding to a large static object in an elevated location, e.g., relative to a level of the vehicle; and radar data of range-Doppler values corresponding to other static objects, which may be at substantially the same position of the bridge, for example, by identifying radar data of range-Doppler values corresponding to a small static object on a road level, e.g., the same level as the vehicle.

Referring back to FIG. 8, in some demonstrative aspects, radar processor 834 may be configured to implement a region-based mapping scheme defining a mapping of a slow-moving-object region to a radar processing algorithm configured for slow-moving objects, e.g., as described below.

In some demonstrative aspects, the slow-moving-object region may include range-Doppler values having a velocity below a predefined velocity threshold and a range below a predefined range threshold, e.g., as described below.

In other aspects, the slow-moving-object region may be defined to include any other additional or alternative range-Doppler values, e.g., based on any other suitable criteria.

In some demonstrative aspects, radar processor 834 may be configured to apply to radar data corresponding to one or more of the range-Doppler values in the slow-moving-object region a radar processing algorithm, which may be configured for slow-moving objects, for example, a hazard-detection algorithm, e.g., as described below.

In one example, the hazard-detection algorithm may be configured to locate a relatively small obstacle, which may be in a front of the radar device.

Figure 30:
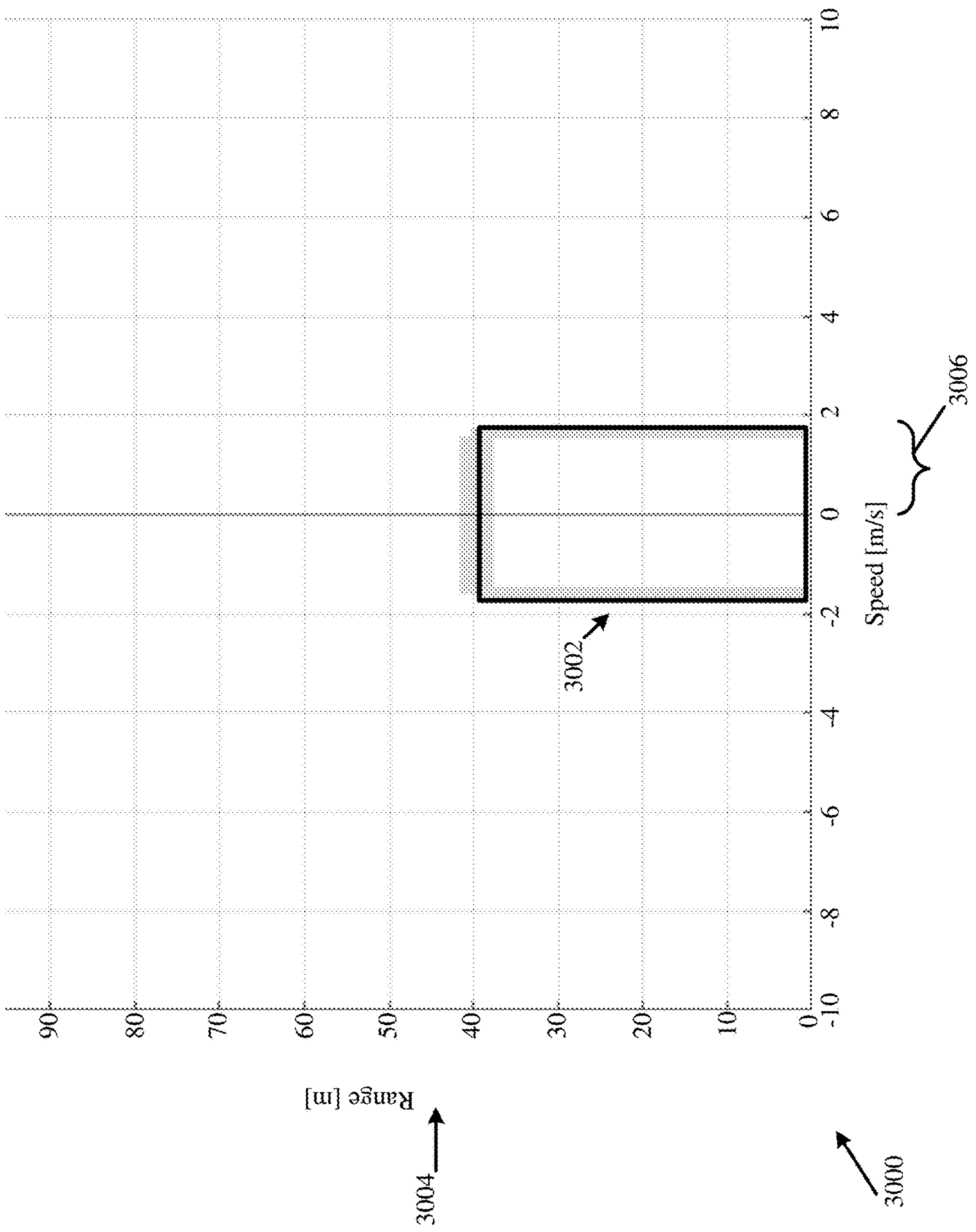
FIG. 30 is a schematic illustration of a slow-moving-object region on a Range-Doppler map, in accordance with some demonstrative aspects.

Reference is made to FIG. 30, which schematically illustrates a slow-moving-object region 3002 on a Range-Doppler map 3000, in accordance with some demonstrative aspects.

In one example, slow-moving-object region 3002 may be defined on Range-Doppler map 3000, for example, with respect to a static radar. According to this example, as shown in FIG. 30, the slow-moving-object region 3002 may be defined to include the range-Doppler values with speeds in a range defined relative to a zero velocity.

In some demonstrative aspects, for example, in case of a moving radar, the slow-moving-object region 3002 may be defined, for example, based on a speed of the moving radar.

In one example, the X-axis of Range-Doppler map 3000 depicts a radial velocity of a target with respect to a radar frontend, e.g., radar frontend 804 (FIG. 8), and the Y-axis Range-Doppler map 3000 depicts a distance of the target from the radar frontend.

In some demonstrative aspects, as shown in FIG. 30, the slow-moving-object region 3002 may include range-Doppler values having a velocity, e.g., an absolute velocity, below a predefined velocity threshold 3006 and a range below a predefined range threshold 3004.

In one example, as shown in FIG. 30, the slow-moving-object region 3002 may include range-Doppler values having a velocity, e.g., an absolute velocity, less than about 2 meters per second (m/s), and a range below about 40 meters.

In other aspects, the slow-moving-object region 3002 may be defined according to any other predefined range threshold and/or predefined velocity threshold.

In some demonstrative aspects, slow-moving-object region 3002 may be expected to include, for example, slow moving objects in a short range from a vehicle, e.g., pedestrians, animals, and the like.

In one example, the slow moving objects, e.g., pedestrians and/or animals, may be slow moving "weak" targets, which may have a low Radar Cross Section (RCS). Accordingly, the slow moving objects are expected to be detected at relatively short ranges.

In some demonstrative aspects, pedestrians and/or animals may be treated as a point target at a spatial domain, while having a wider Doppler signature, e.g., due to movements of different parts of the body.

In some demonstrative aspects, a radar processor, e.g., radar processor 834 (FIG. 8), may be configured to implement one or more complex tracking algorithms, for example, to track the slow-moving-objects in the slow-moving-object region 3002, for example, in order to handle pedestrian and/or animal movements, which may be assumed to be chaotic and/or unexpected.

Referring back to FIG. 8, in some demonstrative aspects, radar processor 834 may be configured to implement a region-based mapping scheme defining a mapping of a fast-moving-close-range-object region to a radar processing algorithm configured for fast-moving close objects, e.g., as described below.

In some demonstrative aspects, the fast-moving-close-range-object region may include range-Doppler values having a velocity, e.g., an absolute velocity, above a predefined velocity threshold, and a range below a predefined close range threshold, e.g., as described below.

In other aspects, the fast-moving-close-range-object region may be defined to include any other additional or alternative range-Doppler values, e.g., based on any other suitable criteria. apply to radar data corresponding to one or more of the range-Doppler values in the fast-moving-close-range-object region a radar processing algorithm, which may be configured for fast-moving close objects, for example, a lane-assignment algorithm, e.g., as described below.

In one example, the lane-assignment algorithm may be configured to place a fast-moving close object, e.g., a car, on a specific lane, e.g., with high accuracy, which may enable an improved tracking on the fast-moving close object.

Figure 31:
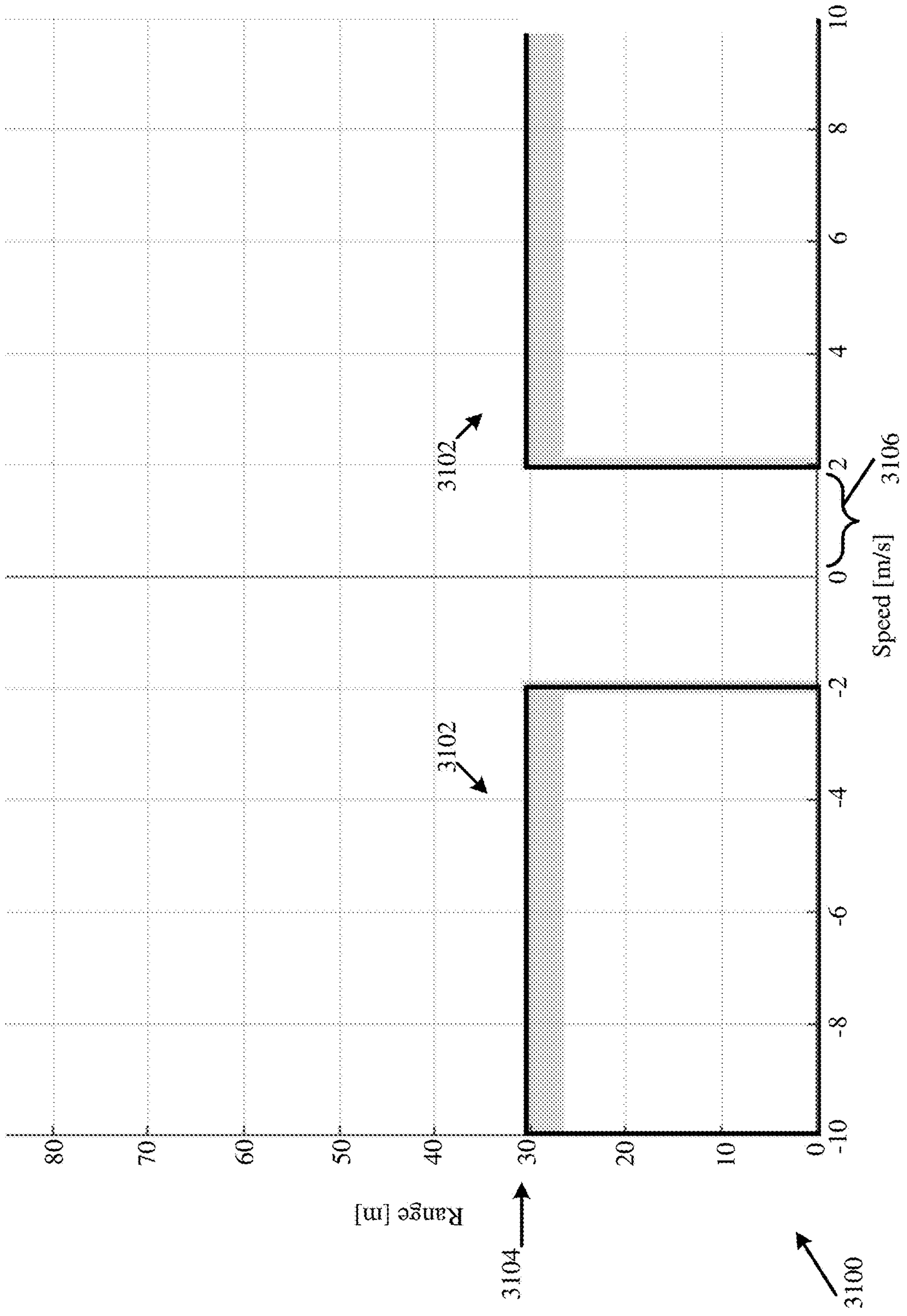
FIG. 31 is a schematic illustration of a fast-moving-close-range-object region on a Range-Doppler map, in accordance with some demonstrative aspects.

Reference is made to FIG. 31, which schematically illustrates a fast-moving-close-range-object region 3102 on a Range-Doppler map 3100, in accordance with some demonstrative aspects.

In one example, fast-moving-close-range-object region 3102 may be defined on Range-Doppler map 3100, for example, with respect to a static radar. According to this example, as shown in FIG. 31, the fast-moving-close-range-object region 3102 may be defined to include the range-Doppler values with speeds in a range defined relative to a zero velocity.

In some demonstrative aspects, for example, in case of a moving radar, the fast-moving-close-range-object region 3102 may be defined, for example, based on a speed of the moving radar.

In one example, the X-axis of Range-Doppler map 3100 depicts a radial velocity of a target with respect to a radar frontend, e.g., radar frontend 804 (FIG. 8), and the Y-axis of Range-Doppler map 3100 depicts a distance of the target from the radar frontend.

In some demonstrative aspects, as shown in FIG. 31, the fast-moving-close-range-object region 3102 may include range-Doppler values having a velocity, e.g., an absolute velocity, above a predefined velocity threshold 3106, and a range below a predefined close range threshold 3104.

In one example, as shown in FIG. 31, the fast-moving-close-range-object region 3102 may include range-Doppler values having a velocity, e.g., an absolute velocity, above 2 m/s, and/or a range below 30 meters.

In other aspects, the fast-moving-close-range-object region 3102 may be defined according to any other predefined range threshold and/or predefined velocity threshold.

In some demonstrative aspects, close-range-object region 3102 may be expected to include, for example, fast-moving close objects, e.g., other vehicles, such as cars, motorcycles, trucks, and/or the like, which may be close to the vehicle, e.g., a front of the vehicle when the frontend 804 (FIG. 8) is on the front of the vehicle.

In some demonstrative aspects, a radar processor, e.g., radar processor 834 (FIG. 8), may be configured to apply to radar data corresponding to the range-Doppler values in the close-range-object region 3102 one or more processing algorithms, which may be configured to identify a shape of a detected object in the close-range-object region 3102, and/or to classify the detected object in the close-range-object region 3102, e.g., as described below.

In some demonstrative aspects, multiple detections from a detected target, e.g., from each detected target, may be expected, for example, since the radar data corresponding to the range-Doppler values may be based on radar sampling of the close-range-object region 3102 in spherical coordinates.

In some demonstrative aspects, a radar processor in a vehicle, e.g., radar processor 834 (FIG. 8), may be configured to utilize the multiple detections of a fast-moving close object in the close-range-object region 3102, for example, to create a bounding box for the fast-moving close object.

In some demonstrative aspects, the radar processor, e.g., radar processor 834 (FIG. 8), may be configured to utilize the bounding box to define a raw classification of the detected object, e.g., a car, a truck, a motorcycle, or the like, for example, based on a size and/or shape of the bounding box.

In some demonstrative aspects, a radar processor, e.g., radar processor 834 (FIG. 8), may be configured to implement one or more reduced-complexity tracking algorithms, for example, to track the fast-moving close objects in the close-range-object region 3102, for example, in order to handle vehicle movements, which may be assumed to be in relatively straight lines.

Referring back to FIG. 8, in some demonstrative aspects, radar processor 834 may be configured to implement a region-based mapping scheme defining a mapping of a fast-moving-far-range object region to a radar processing algorithm configured for fast-moving far objects, e.g., as described below.

In some demonstrative aspects, the fast-moving-far-range-object region may include range-Doppler values having a velocity, e.g., an absolute velocity, above a predefined velocity threshold, and a range above a predefined far range threshold, e.g., as described below.

In other aspects, the fast fast-moving-far-range-object region may be defined to include any other additional or alternative range-Doppler values, e.g., based on any other suitable criteria.

In some demonstrative aspects, radar processor 834 may be configured to apply to radar data corresponding to one or more of the range-Doppler values in the fast-moving-far-range-object region a radar processing algorithm configured for fast-moving far objects, for example, a high-resolution algorithm, e.g., as described below.

In one example, the high-resolution algorithm may be configured to provide an increased level of resolution, for example, to allow to separate between adjacent far objects, and/or to find a precise location of fast-moving-far-range objects.

Figure 32:
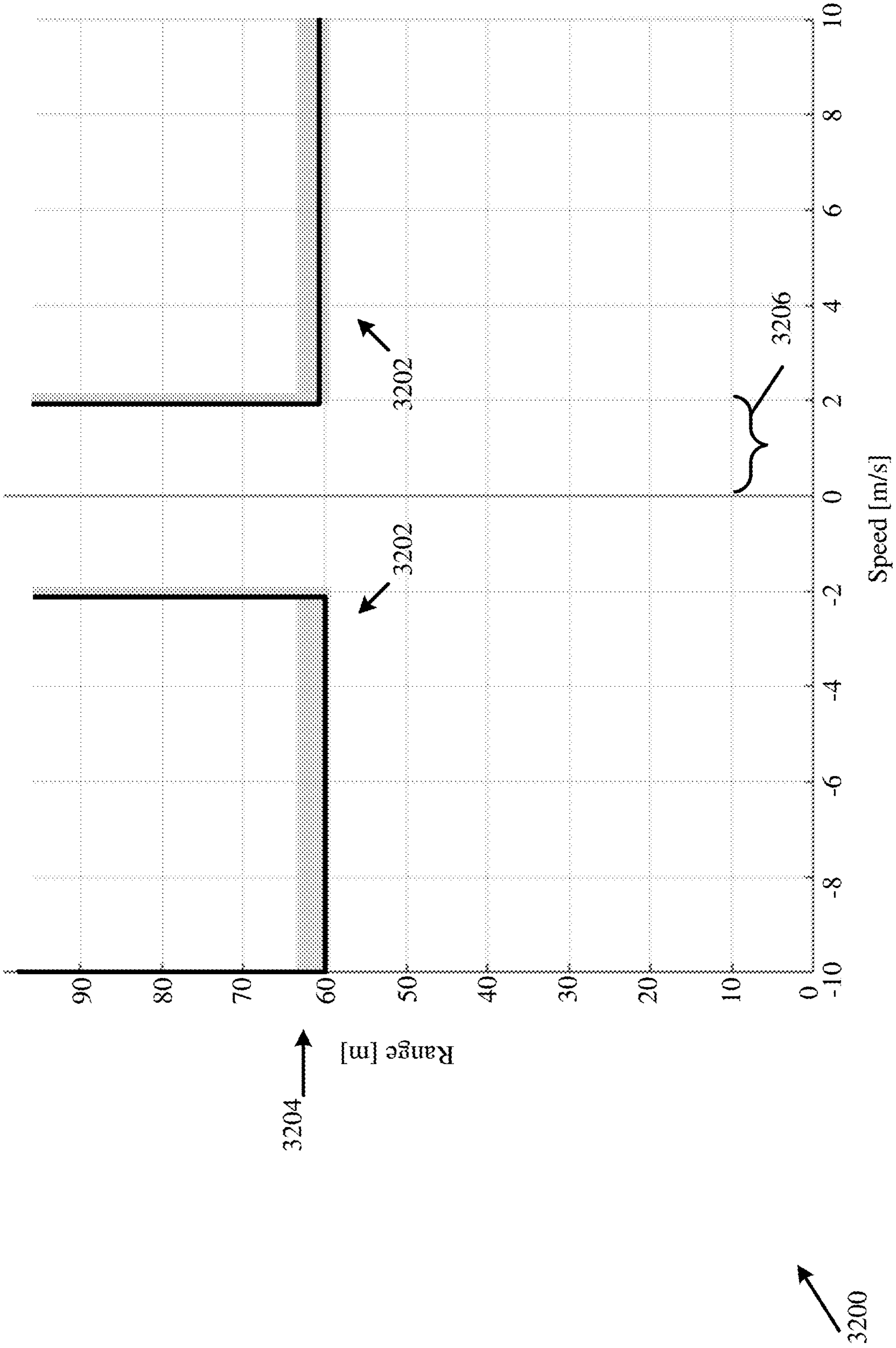
FIG. 32 is a schematic illustration of a fast-moving-far-range-object region on a Range-Doppler map, in accordance with some demonstrative aspects.

Reference is made to FIG. 32, which schematically illustrates a fast-moving-far-range-object region 3202 on a Range-Doppler map 3200, in accordance with some demonstrative aspects.

In one example, fast-moving-far-range-object region 3202 may be defined on Range-Doppler map 3200, for example, with respect to a static radar. According to this example, as shown in FIG. 32, the fast-moving-far-range-object region 3202 may be defined to include the range-Doppler values with speeds in a range defined relative to a zero velocity.

In some demonstrative aspects, for example, in case of a moving radar, the fast-moving-far-range-object region 3202 may be defined, for example, based on a speed of the moving radar.

In one example, the X-axis of Range-Doppler map 3200 depicts a radial velocity of a target with respect to a radar frontend, e.g., radar frontend 804 (FIG. 8), and the Y-axis of Range-Doppler map 3200 depicts a distance of the target from the radar frontend.

In some demonstrative aspects, as shown in FIG. 32, the fast-moving-far-range-object region 3202 may include range-Doppler values having a velocity, e.g., an absolute velocity, above a predefined velocity threshold 3206, and a range above a predefined far range threshold 3204.

In one example, the fast-moving-far-range-object region 3202 may include range-Doppler values having a velocity, e.g., an absolute velocity, above 2 m/s, and a range above 60 meters.

In other aspects, the fast-moving-far-range-object region 3202 may be defined according to any other predefined range threshold and/or predefined velocity threshold.

In some demonstrative aspects, fast-moving-far-range-object region 3202 may be expected to include, for example, fast-moving far objects, e.g., other vehicles, such as cars and/or trucks, which may be far from the vehicle.

In some demonstrative aspects, a reduced number of detections, e.g., a single detection, may be expected from a detected target in the fast-moving-far-range-object region 3202, for example, since fast-moving far objects may be too far to provide multiple spatial samples. Accordingly, this reduced number of detections may not be sufficient to provide details on a size and/or shape of the detected target in the fast-moving-far-range-object region 3202.

In some demonstrative aspects, a radar processor, e.g., radar processor 834 (FIG. 8), may be configured to implement one or more high resolution algorithms to process radar data corresponding to range-Doppler values in the fast-moving-far-range-object region 3202. For example, the high resolution algorithms may be applied to process the radar data corresponding to the range-Doppler values in fast-moving-far-range-object region 3202, for example, to increase a resolution to a degree, which may allow separating between adjacent fast-moving far objects, and/or finding a precise location of a fast-moving far object.

Figure 33:
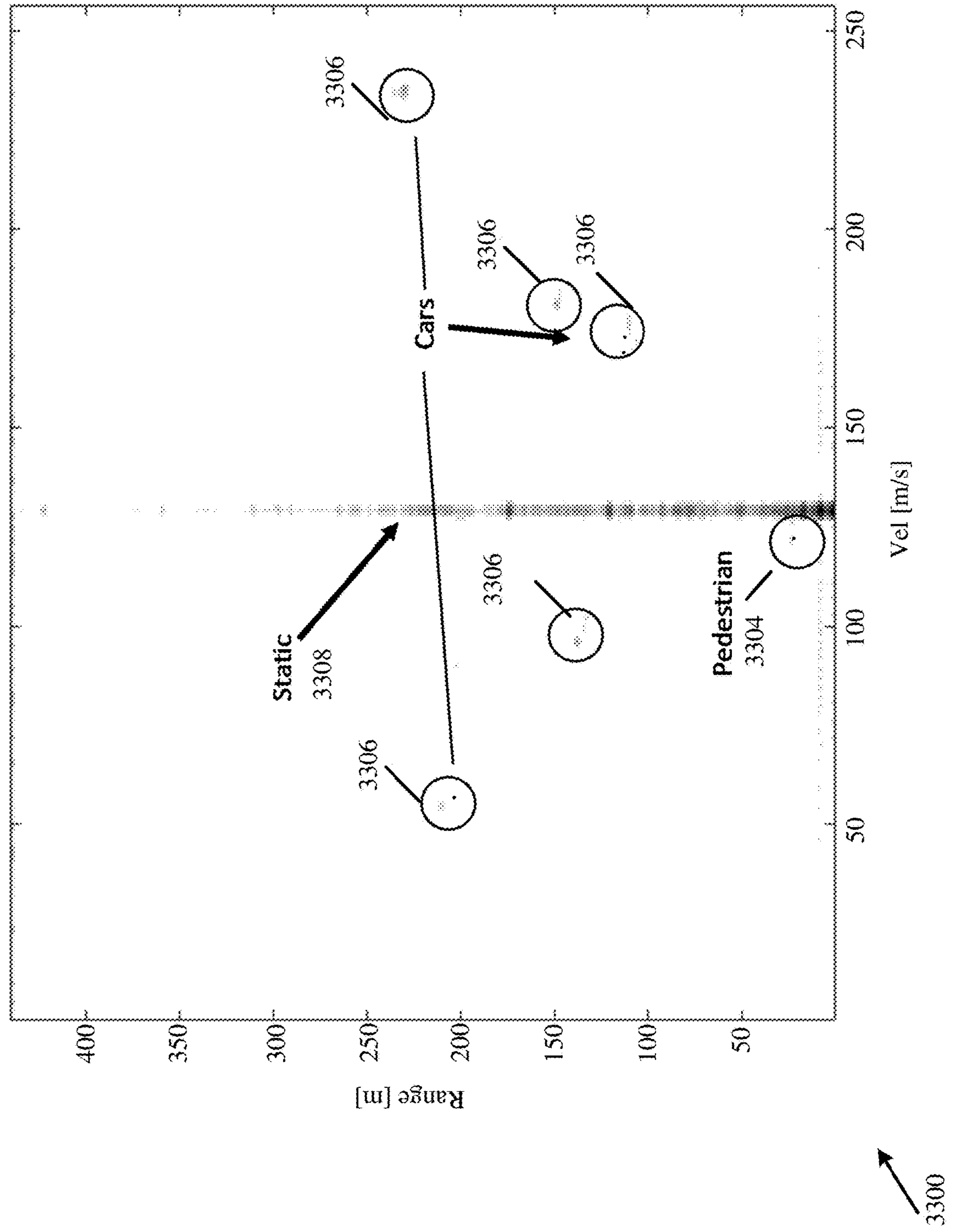
FIG. 33 is a schematic illustration of a Range-Doppler map, in accordance with some demonstrative aspects.

Reference is made to FIG. 33, which schematically illustrates a Range-Doppler map 3300, in accordance with some demonstrative aspects.

In one example, Range-Doppler map 3300 may be captured by a radar frontend, e.g., radar frontend 804 (FIG. 8), which may be mounted on a moving vehicle, e.g., vehicle 100 (FIG. 1), and may correspond to an environment in front of the vehicle.

In some demonstrative aspects, a radar processor, e.g., radar processor 834 (FIG. 8), may be configured to process Range-Doppler map 3300, for example, to determine radar target information corresponding to the environment, e.g., in front of the vehicle 100 (FIG. 1).

In one example, the X-axis of Range-Doppler map 3300 depicts a radial velocity of a target with respect to the radar frontend, e.g., radar frontend 804 (FIG. 8), and the Y-axis of Range-Doppler map 3300 depicts a distance of the target from the radar frontend.

In some demonstrative aspects, as shown in FIG. 33, Range-Doppler map 3300 may include a plurality of detections, which may be mapped to a plurality of regions, e.g., as described below.

In some demonstrative aspects, as shown in FIG. 33, a first plurality of range-Doppler values 3306 may be detected in a fast-moving-close-range-object region. For example, radar processor 834 (FIG. 8) may be configured to map range-Doppler values 3306 to the fast-moving-close-range-object region. For example, based on the mapping of the range-Doppler values 3306 to the fast-moving-close-range-object region, radar processor 834 (FIG. 8) may be configured to process radar data corresponding to range-Doppler values 3306 as radar data corresponding to range-Doppler values corresponding to fast moving close objects, e.g., cars.

In some demonstrative aspects, as shown in FIG. 33, a second plurality of range-Doppler values 3304 may be detected in a slow-moving-object region. For example, radar processor 834 (FIG. 8) may be configured to map range-Doppler values 3304 to the slow-moving-object region. For example, based on the mapping of the range-Doppler values 3304 to the slow-moving-object region, radar processor 834 (FIG. 8) may be configured to process radar data corresponding to range-Doppler values 3304 as radar data corresponding to range-Doppler values corresponding to slow moving objects, e.g., pedestrians.

In some demonstrative aspects, as shown in FIG. 33, a third plurality of range-Doppler values 3308 may be detected in a static-object region. For example, radar processor 834 (FIG. 8) may be configured to map range-Doppler values 3308 to the static-object region. For example, based on the mapping of the range-Doppler values 3308 to the static-object region, radar processor 834 (FIG. 8) may be configured to process radar data corresponding to range-Doppler values 3308 as radar data corresponding to range-Doppler values corresponding to static objects, e.g., buildings and/or infrastructure objects.

In some demonstrative aspects, radar processor 834 (FIG. 8) may generate radar target information based on the mapping of the range-Doppler values to the regions in Range-Doppler map 3300.

For example, radar processor 834 (FIG. 8) may process radar data corresponding to the range-Doppler values in Range-Doppler map 3300, for example, by processing radar data corresponding to range-Doppler values 3306, according to one or more first radar processing algorithms corresponding to the fast-moving-close-range-object region. In one example, radar processor 834 (FIG. 8) may process radar data corresponding to range-Doppler values 3306 according to a lane-assignment algorithm.

For example, radar processor 834 (FIG. 8) may process the radar data corresponding to range-Doppler values in Range-Doppler map 3300, for example, by processing radar data corresponding to range-Doppler values 3304, according to one or more second radar processing algorithms corresponding to the slow-moving-object region. In one example, radar processor 834 (FIG. 8) may process radar data corresponding to range-Doppler values 3304 according to a hazard-detection algorithm.

For example, radar processor 834 (FIG. 8) may process radar data corresponding to the range-Doppler values in Range-Doppler map 3300, for example, by processing radar data corresponding to range-Doppler values 3308, according to one or more third radar processing algorithms corresponding to the static-object region. In one example, radar processor 834 (FIG. 8) may process radar data corresponding to range-Doppler values 3308 according to a super resolution algorithm.

Figure 34:
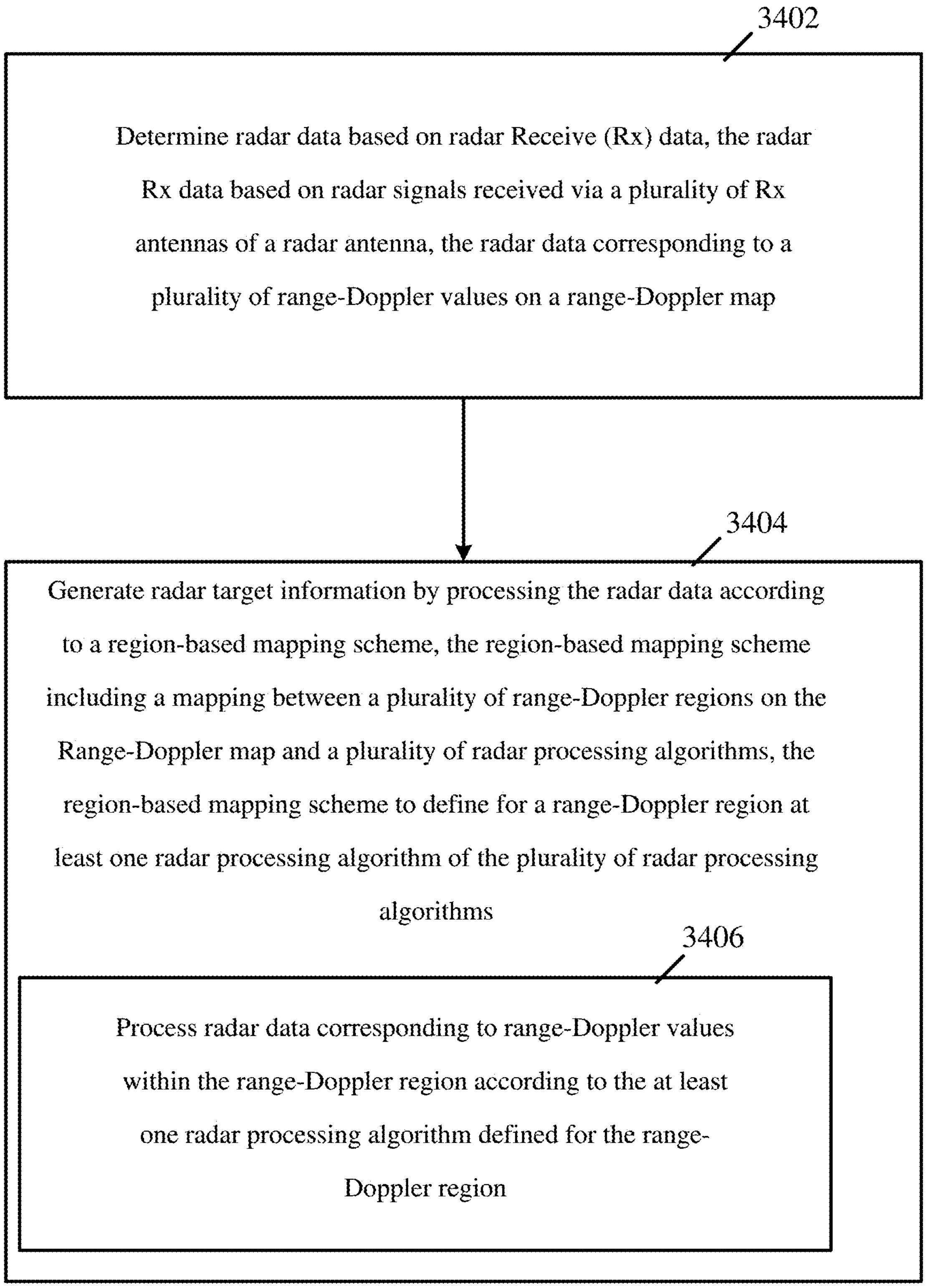
FIG. 34 a schematic flow-chart illustration of a method of generating radar target information according to a region-based mapping scheme, in accordance with some demonstrative aspects.

Reference is made to FIG. 34, which schematically illustrates a method of generating radar target information according to a region-based mapping scheme, in accordance with some demonstrative aspects. For example, one or more of the operations of the method of FIG. 34 may be performed by one or more elements of a radar device, e.g., radar device 101 (FIG. 1), a radar processor, e.g., radar processor 834 (FIG. 8), and/or a processor, e.g., processor 832 (FIG. 8).

As indicated at block 3402, the method may include determining radar data based on radar Rx data, the radar Rx data based on radar signals received via a plurality of Rx antennas of a radar antenna, the radar data corresponding to a plurality of range-Doppler values on a range-Doppler map. For example, radar processor 834 (FIG. 8) may determine the radar data based on the radar Rx data 811 (FIG. 8), which may be based on radar signals received via the plurality of Rx antennas 816 (FIG. 8), e.g., as described above.

As indicated at block 3404, the method may include generating radar target information by processing the radar data according to a region-based mapping scheme. For example, the region-based mapping scheme may include a mapping between a plurality of range-Doppler regions on the Range-Doppler map and a plurality of radar processing algorithms. For example, the region-based mapping scheme may be configured to define for a range-Doppler region at least one radar processing algorithm of the plurality of radar processing algorithms. For example, radar processor 834 (FIG. 8) may generate the radar target information by processing the radar data according to the region-based mapping scheme including the mapping between the plurality of range-Doppler regions on the range-Doppler map and the plurality of radar processing algorithms, e.g., as described above.

As indicated at block 3406, processing the radar data according to the region-based mapping scheme may include processing radar data corresponding to range-Doppler values within the range-Doppler region according to the at least one radar processing algorithm defined for the range-Doppler region. For example, radar processor 834 (FIG. 8) may process the radar data corresponding to the range-Doppler values within the range-Doppler region according to the at least one radar processing algorithm defined for the range-Doppler region, e.g., as described above.

Figure 35:
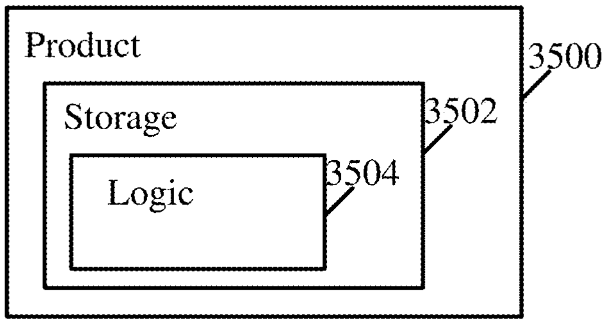
FIG. 35 is a schematic illustration of a product of manufacture, in accordance with some demonstrative aspects.

Reference is made to FIG. 35, which schematically illustrates a product of manufacture 3500, in accordance with some demonstrative aspects. Product 3500 may include one or more tangible computer-readable ("machine-readable") non-transitory storage media 3502, which may include computer-executable instructions, e.g., implemented by logic 3504, operable to, when executed by at least one computer processor, enable the at least one computer processor to implement one or more operations and/or functionalities described with reference to the FIGS. 1-34, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 3500 and/or storage media 3502 may include one or more types of computer-readable storage media capable of storing data, including volatile memory, non-volatile memory, removable or non-removable memory, erasable or non-erasable memory, writeable or re-writeable memory, and the like. For example, storage media 3502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 3504 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 3504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising an input to receive radar receive (Rx) data, the radar Rx data based on radar signals received via a radar antenna, e.g., a Multiple-Input-Multiple-Output (MIMO) radar antenna; and a radar processor to generate radar information based on the radar Rx data, wherein the radar processor is configured to determine radar data corresponding to a plurality of range-Doppler bins based on the radar Rx data, the radar processor is configured to select for a range-Doppler bin of the plurality of range-Doppler bins a selected Angle of Arrival (AoA) spectrum estimation algorithm from a plurality of AoA spectrum estimation algorithms based on a range value and a Doppler value corresponding to the range-Doppler bin, and to process radar data of the range-Doppler bin according to the selected AoA spectrum estimation algorithm to generate AoA spectrum information of the range-Doppler bin.

Example 2 includes the subject matter of Example 1, and optionally, wherein the radar processor is configured to select a first AoA spectrum estimation algorithm from the plurality of AoA spectrum estimation algorithms for processing radar data of a first range-Doppler bin, and to select a second AoA spectrum estimation algorithm from the plurality of AoA spectrum estimation algorithms for processing radar data of a second range-Doppler bin, the second AoA spectrum estimation algorithm different from the first AoA spectrum estimation algorithm.

Example 3 includes the subject matter of Example 1 or 2, and optionally, wherein the input is to receive environment information corresponding to an environment in which the radar signals are communicated, the processor configured to select the selected AoA spectrum estimation algorithm for the range-Doppler bin based on the environment information.

Example 4 includes the subject matter of Example 3, and optionally, wherein the environment information comprises driving scenario information corresponding to a driving scenario in which the radar signals are communicated, the processor configured to select the selected AoA spectrum estimation algorithm for the range-Doppler bin based on the driving scenario information.

Example 5 includes the subject matter of Example 3 or 4, and optionally, wherein the environment information comprises weather condition information corresponding to a weather condition of the environment, the processor configured to select the selected AoA spectrum estimation algorithm for the range-Doppler bin based on the weather condition information.

Example 6 includes the subject matter of any one of Examples 3-5, and optionally, wherein the environment information comprises multipath information corresponding to presence of multipath effects in the environment, the processor configured to select the selected AoA spectrum estimation algorithm for the range-Doppler bin based on the multipath information.

Example 7 includes the subject matter of any one of Examples 1-6, and optionally, wherein the input is to receive system resource information corresponding to system resources of the radar processor, the processor configured to select the selected AoA spectrum estimation algorithm for the range-Doppler bin based on the system resource information.

Example 8 includes the subject matter of Example 7, and optionally, wherein the system resource information comprises at least one of hardware availability information or temperature information, the hardware availability information corresponding to an availability of system resources for the radar processor, the temperature information corresponding to a temperature of one or more system resources.

Example 9 includes the subject matter of any one of Examples 1-8, and optionally, wherein the input is to receive performance information corresponding to one or more performance parameters of the plurality of AoA spectrum estimation algorithms, the processor configured to select the selected AoA spectrum estimation algorithm for the range-Doppler bin based on the performance information.

Example 10 includes the subject matter of Example 9, and optionally, wherein, for an AoA spectrum estimation algorithm of the plurality of AoA spectrum estimation algorithms, the one or more performance parameters comprise at least one of a sparsity parameter, a spectrum size parameter, or a false detection parameter, the sparsity parameter corresponding to a sparsity level of an AoA spectrum estimated by the AoA spectrum estimation algorithm, the spectrum size parameter representing a size of the AoA spectrum, the false detection parameter representing a probability of false detections of the AoA spectrum estimation algorithm.

Example 11 includes the subject matter of any one of Examples 1-10, and optionally, wherein the input is to receive radar operation-mode information corresponding to at least one operation mode of the radar processor, the processor configured to select the selected AoA spectrum estimation algorithm for the range-Doppler bin based on the radar operation-mode information.

Example 12 includes the subject matter of Example 11, and optionally, wherein the at least one operation mode comprises at least one of a range operation mode, a Doppler operation mode, or a far/near field operation mode, the range operation mode representing a range at which the radar processor is to detect targets, the Doppler operation mode representing a maximal speed of targets to be detected by the radar processor, the far/near field operation mode representing whether the radar processor is to operate in a far-field region or a near-field region.

Example 13 includes the subject matter of any one of Examples 1-12, and optionally, wherein the input is to receive preference information to indicate a preferred AoA spectrum estimation algorithm of the plurality of AoA spectrum estimation algorithms, the processor configured to select the selected AoA spectrum estimation algorithm for the range-Doppler bin based on the preference information.

Example 14 includes the subject matter of any one of Examples 1-13, and optionally, wherein the radar processor is configured to determine, based on input information from the input, an AoA estimation profile for estimation of the AoA spectrum information of the range-Doppler bin, and to select the selected AoA spectrum estimation algorithm based on the AoA estimation profile.

Example 15 includes the subject matter of Example 14, and optionally, wherein the radar processor is configured to determine, based on first input information from the input, a first AoA estimation profile for estimation of AoA spectrum information of a first range-Doppler bin; to select a first AoA spectrum estimation algorithm for the first range-Doppler bin based on the first AoA estimation profile; to determine, based on second input information from the input, a second AoA estimation profile for estimation of AoA spectrum information of a second range-Doppler bin; and to select a second AoA spectrum estimation algorithm for the second range-Doppler bin based on the second AoA estimation profile, the second AoA spectrum estimation algorithm different from the first AoA spectrum estimation algorithm.

Example 16 includes the subject matter of Example 14 or 15, and optionally, wherein the AoA estimation profile comprises one or more settings of one or more algorithm-specific metrics corresponding to the plurality of AoA spectrum estimation algorithms.

Example 17 includes the subject matter of Example 16, and optionally, wherein the one or more algorithm-specific metrics comprise a performance metric corresponding to a performance of an AoA spectrum estimation algorithm of the plurality of AoA spectrum estimation algorithms.

Example 18 includes the subject matter of Example 17, and optionally, wherein the performance metric comprises at least one of a resolution parameter corresponding to a resolution of an AoA spectrum estimated by the AoA spectrum estimation algorithm, a Side Lobe Level (SLL) parameter corresponding to an SLL of the AoA spectrum, or a false detection probability parameter corresponding to a false detection probability of targets by the AoA spectrum estimation algorithm.

Example 19 includes the subject matter of any one of Examples 16-18, and optionally, wherein the one or more algorithm-specific metrics comprise a computational metric corresponding to a utilization of one or more computational resources by an AoA spectrum estimation algorithm of the plurality of AoA spectrum estimation algorithms.

Example 20 includes the subject matter of Example 19, and optionally, wherein the computational metric comprises at least one of a complexity parameter corresponding to a computational complexity of the AoA spectrum estimation algorithm, a hardware parameter corresponding to a hardware requirement of the AoA spectrum estimation algorithm, or a latency parameter corresponding to a latency of the AoA spectrum estimation algorithm.

Example 21 includes the subject matter of any one of Examples 16-20, and optionally, wherein the one or more algorithm-specific metrics comprise a sparsity metric corresponding to a sparsity level of an AoA spectrum estimated by an AoA spectrum estimation algorithm of the plurality of AoA spectrum estimation algorithms.

Example 22 includes the subject matter of any one of Examples 16-21, and optionally, wherein the one or more algorithm-specific metrics comprise one or more target detection metrics corresponding to one or more types of targets supported for detection by an AoA spectrum estimation algorithm of the plurality of AoA spectrum estimation algorithms.

Example 23 includes the subject matter of Example 22, and optionally, wherein the one or more target detection metrics comprise at least one of a multipath parameter corresponding to a multipath mitigation capability of the AoA spectrum estimation algorithm, a target speed parameter corresponding to a maximal target speed to be detected by the AoA spectrum estimation algorithm, or a near/far field parameter corresponding to whether the AoA spectrum estimation algorithm supports detection of targets in a far-field region or in a near-field region.

Example 24 includes the subject matter of any one of Examples 14-23, and optionally, wherein the input information comprises at least one of environment information corresponding to an environment in which the radar signals are communicated, system resource information corresponding to system resources for the radar processor, performance information corresponding to one or more performance parameters of the plurality of AoA spectrum estimation algorithms, radar operation-mode information corresponding to at least one operation-mode of the radar processor, or preference information to indicate a preferred AoA spectrum estimation algorithm of the plurality of AoA spectrum estimation algorithms Example 25 includes the subject matter of any one of Examples 14-24, and optionally, comprising a memory to store mapping information to map a plurality of AoA estimation profiles to the plurality of AoA spectrum estimation algorithms, the processor configured to select the selected AoA spectrum estimation algorithm for the range-Doppler bin based on the mapping information.

Example 26 includes the subject matter of Examples 14-25, and optionally, comprising a memory to store algorithm-specific information corresponding to the plurality of AoA estimation algorithms, the algorithm-specific information defining a plurality of sets of algorithm-specific metrics for the plurality of AoA estimation algorithms, the processor configured to select the selected AoA spectrum estimation algorithm based on a correlation between the AoA estimation profile and the plurality of sets of algorithm-specific metrics.

Example 27 includes the subject matter of any one of Examples 1-26, and optionally, wherein the plurality of AoA estimation algorithms comprises at least one of a Delay and Sum (DAS) algorithm, a Super Resolution (SR) algorithm, a low-complexity SR algorithm, an SR algorithm with multipath mitigation, a Beam space (BS) SR algorithm, or a Sparse Bayesian Learning (SBL) algorithm.

Example 28 includes the subject matter of any one of Examples 1-27, and optionally, comprising the MIMO radar antenna comprising a plurality of Rx antennas and a plurality of Transmit (Tx) antennas, and a plurality of Rx chains to generate the radar Rx data based on the radar signals received via the plurality of Rx antennas.

Example 29 includes an apparatus comprising a radar processor, the radar processor comprising an input to receive radar receive (Rx) data, the radar Rx data based on radar signals received via a plurality of Rx antennas of a Multiple-Input-Multiple-Output (MIMO) radar antenna; and a radar processor to generate radar information by applying an Iterative Adaptive Approach (IAA) algorithm to the radar Rx data, the IAA algorithm configured for a multi-path scenario, in which the radar signals comprise multipath signals from a plurality of paths between the MIMO antenna and a radar object, wherein the IAA algorithm configured such that the radar information comprises an Angle of Arrival (AoA) spectrum having, for the radar object, no more than two amplitude peaks, which are above −20 Decibel (dB), corresponding to the multipath signals.

In one example, the apparatus of Example 29 may include, for example, one or more additional elements, and/or may perform one or more additional operations and/or functionalities, for example, as described with respect to Examples 1, 39, 61 and/or 74.

Example 30 includes the subject matter of Example 29, and optionally, wherein the no more than two amplitude peaks comprise a first amplitude peak corresponding to a direct path between the MIMO antenna and the radar object, and no more than a second amplitude peak corresponding to an indirect path comprising a path from the MIMO radar antenna to the radar object via a reflector, and from the radar object to the MIMO radar antenna via the reflector.

Example 31 includes the subject matter of Example 29 or 30, and optionally, wherein the radar processor is configured to apply the IAA algorithm to the radar Rx data based on a steering matrix comprising a plurality of different-angle steering vectors, a different-angle steering vector of the plurality of different-angle steering vectors comprising a steering vector corresponding to a Transmit (Tx)-Rx (Tx-Rx) angle combination of a Tx angle and an Rx angle, which is different from the Tx angle.

Example 32 includes the subject matter of Example 31, and optionally, wherein the steering matrix comprises a plurality of same-angle steering vectors corresponding to a respective plurality of angle values, a same-angle steering vector corresponding to an angle value comprising a steering vector corresponding to a Tx-Rx combination of a Tx angle equal to the angle value and an Rx angle equal to the angle value.

Example 33 includes the subject matter of Example 32, and optionally, wherein the plurality of different-angle steering vectors correspond to a plurality of selected Tx-Rx angle combinations from a plurality of possible Tx-Rx combinations based on the plurality of angle values.

Example 34 includes the subject matter of Example 33, and optionally, wherein the radar processor is configured to determine the plurality of selected Tx-Rx angle combinations by applying a one-dimensional beamforming algorithm to the radar Rx data.

Example 35 includes the subject matter of Example 34, and optionally, wherein the radar processor is configured to determine a one-dimensional beamforming AoA spectrum based on the radar Rx data, to identify in the one-dimensional beamforming AoA spectrum a plurality of peaks above a predefined threshold, and to determine the plurality of selected Tx-Rx angle combinations based on the plurality of peaks.

Example 36 includes the subject matter of any one of Examples 32-35, and optionally, wherein the steering matrix comprises a first count, denoted K, of same-angle steering vectors, followed by a second count, denoted Ks, of different-angle steering vectors, the radar processor configured to determine an IAA spectrum by applying the IAA algorithm to the radar Rx data based on the steering matrix, and to determine the AoA spectrum to include first K elements of the IAA spectrum.

Example 37 includes the subject matter of Example 32, and optionally, wherein the plurality of different-angle steering vectors correspond to all possible Tx-Rx combinations based on the plurality of angle values.

Example 38 includes the subject matter of any one of Examples 29-37, and optionally, comprising the MIMO radar antenna, and a plurality of PHY chains to generate the radar Rx data based on the radar signals received via the plurality of Rx antennas.

Example 39 includes an apparatus comprising a radar processor, the radar processor comprising an input to receive radar receive (Rx) data, the radar Rx data comprising a radar frame based on radar Rx signals received via a Multiple-Input-Multiple-Output (MIMO) radar antenna comprising an Rx array and a Transmit (Tx) array; and a radar processor to generate radar information based on the radar Rx data, the radar processor configured to determine radar data corresponding to a plurality of range-Doppler bins based on the radar Rx data, wherein the radar processor is configured to process radar data of a range-Doppler bin of the plurality of range-Doppler bins according to a plurality of iterations of a Sparse Bayesian Learning (SBL) algorithm to generate Angle of arrival (AoA) spectrum information of the range-Doppler bin, wherein the radar processor is configured to perform an iteration of the SBL algorithm by performing one or more beamforming (BF) operations to determine BF information based on a first steering matrix, and performing one or more SBL operations to determine SBL information based on the BF information and a second steering matrix, the first steering matrix comprising one of a Tx steering matrix of the Tx array or an Rx steering matrix of the Rx array, the second steering matrix comprising an other one of the Tx steering matrix or the Rx steering matrix.

In one example, the apparatus of Example 39 may include, for example, one or more additional elements, and/or may perform one or more additional operations and/or functionalities, for example, as described with respect to Examples 1, 29, 61 and/or 74.

Example 40 includes the subject matter of Example 39, and optionally, wherein the one or more BF operations comprise a reconstruction operation to reconstruct the radar data of the range-Doppler bin based on the first steering matrix.

Example 41 includes the subject matter of Example 40, and optionally, wherein the one or more BF operations comprise an estimation operation to estimate a noise variance of the radar data of the range-Doppler bin based on the first steering matrix and reconstructed radar data of the range-Doppler bin.

Example 42 includes the subject matter of any one of Examples 39-41, and optionally, wherein the one or more SBL operations comprise a covariance estimation operation to estimate a covariance matrix for the SBL iteration based on the second steering matrix.

Example 43 includes the subject matter of Example 42, and optionally, wherein the one or more SBL operations comprise a radar data estimation operation to determine estimated AoA data of the range-Doppler bin based on the second steering matrix and an inverse of the covariance matrix.

Example 44 includes the subject matter of Example 43, and optionally, wherein the one or more SBL operations comprise a power spectrum operation to estimate a power spectrum based on the estimated AoA data of the range-Doppler bin.

Example 45 includes the subject matter of any one of Examples 39-44, and optionally, wherein the radar processor is configured to process the radar Rx data as radar Rx data of a virtual MIMO antenna, the virtual MIMO antenna based on a convolution of the Tx array and the Rx array, wherein the radar processor is configured to determine a plurality of antenna subarrays of the virtual MIMO antenna, and to apply the SBL algorithm to the plurality of antenna subarrays.

Example 46 includes the subject matter of Example 45, and optionally, wherein the radar processor is configured to sequentially apply the SBL algorithm to the plurality of antenna subarrays.

Example 47 includes the subject matter of Example 45, and optionally, wherein the radar processor is configured to apply the SBL algorithm to the plurality of antenna subarrays in parallel.

Example 48 includes the subject matter of Example 47, and optionally, wherein the radar processor is configured to determine a plurality of power spectrums corresponding to the plurality of antenna subarrays based on the second steering matrix.

Example 49 includes the subject matter of Example 48, and optionally, wherein the radar processor is configured to determine an average estimated power spectrum based on a weighted average of the plurality of power spectrums, wherein the one or more SBL operations comprise a power estimation operation to estimate a power spectrum corresponding to an antenna subarray based on the average estimated power spectrum.

Example 50 includes the subject matter of Example 49, and optionally, wherein the one or more SBL operations comprise a radar data estimation operation to estimate radar data corresponding to the antenna subarray based on the average estimated power spectrum.

Example 51 includes the subject matter of any one of Examples 45-50, and optionally, wherein the plurality of antenna subarrays of the virtual MIMO antenna comprises a plurality of respective rows of the virtual MIMO antenna, or a plurality of respective columns of the virtual MIMO antenna.

Example 52 includes the subject matter of any one of Examples 39-51, and optionally, wherein the radar processor is configured to process the radar data of the range-Doppler bin according to the plurality of iterations of the SBL algorithm to generate the AoA spectrum information of the range-Doppler bin based on a single snapshot of the radar frame.

Example 53 includes the subject matter of any one of Examples 39-52, and optionally, wherein the radar processor is configured to determine Rx data of a reduced virtual MIMO antenna by applying a singular value decomposition (SVD) to the radar Rx data, and to perform the plurality of iterations of the SBL algorithm based on the Rx data of the reduced virtual MIMO antenna.

Example 54 includes the subject matter of Example 53, and optionally, wherein the radar processor is configured to determine the Tx steering matrix and the Rx steering matrix based on the reduced virtual MIMO antenna.

Example 55 includes the subject matter of Example 53 or 54, and optionally, wherein the SVD comprises a singular SVD subspace-based dimensionality reduction algorithm.

Example 56 includes the subject matter of any one of Examples 39-55, and optionally, wherein the first steering matrix comprises the Tx steering matrix, and the second steering matrix comprises the Rx steering matrix.

Example 57 includes the subject matter of any one of Examples 39-55, and optionally, wherein the first steering matrix comprises the Rx steering matrix, and the second steering matrix comprises the Tx steering matrix.

Example 58 includes the subject matter of any one of Examples 39-57, and optionally, wherein the MIMO radar antenna comprises a uniform MIMO radar antenna.

Example 59 includes the subject matter of any one of Examples 39-57, and optionally, wherein the MIMO radar antenna comprises a non-uniform MIMO radar antenna.

Example 60 includes the subject matter of any one of Examples 39-59, and optionally, comprising the MIMO radar antenna comprising the Rx array comprising a plurality of Rx antennas and the Tx array comprising a plurality of Tx antennas, and a plurality of Rx chains to generate the radar Rx data based on the radar signals received via the plurality of Rx antennas.

Example 61 includes an apparatus comprising a radar processor, the radar processor comprising an input to receive radar receive (Rx) data, the radar Rx data based on radar signals received via a Two Dimensional (2D) array of Rx antennas of a Multiple-Input-Multiple-Output (MIMO) radar antenna; and a radar processor to generate radar information based on the radar Rx data, the radar information comprising a 2D Angle of Arrival (AoA) spectrum over an Azimuth-Elevation domain, the radar processor configured to determine the 2D AoA spectrum based on a plurality of one-dimensional (1D) AoA spectrums corresponding to a dimension of the Azimuth-Elevation domain, wherein the radar processor is configured to determine the plurality of 1D AoA spectrums based on radar Rx data corresponding to a respective plurality of 1D Rx antenna sub-arrays in a dimension of the 2D array, wherein the radar processor is configured to determine a 1D AoA spectrum of the plurality of 1D AoA spectrums by applying an adaptive Beamforming (BF) algorithm to radar Rx data corresponding to a 1D Rx antenna sub-array of the plurality of 1D Rx antenna sub-arrays, wherein the radar processor is configured to set an initial covariance matrix for the adaptive BF algorithm based on a previously determined covariance matrix, the previously determined covariance matrix based on a plurality of iterations of the adaptive BF algorithm with respect to reference Rx data corresponding to a reference 1D Rx antenna sub-array of the plurality of 1D Rx antenna sub-arrays.

In one example, the apparatus of Example 61 may include, for example, one or more additional elements, and/or may perform one or more additional operations and/or functionalities, for example, as described with respect to Examples 1, 29, 39, and/or 74.

Example 62 includes the subject matter of Example 61, and optionally, wherein the reference Rx data corresponding to the reference 1D Rx antenna sub-array comprises Rx data of a neighbor 1D Rx antenna array adjacent to the 1D Rx antenna sub-array.

Example 63 includes the subject matter of Example 61 or 62, and optionally, wherein the radar Rx data corresponding to the 1D Rx antenna sub-array comprises Rx data corresponding to a first range-Doppler bin, and wherein the reference Rx data corresponding to the reference 1D Rx antenna sub-array comprises Rx data corresponding to the 1D Rx antenna sub-array and corresponding to a second range-Doppler bin adjacent to the first range-Doppler bin.

Example 64 includes the subject matter of any one of Examples 61-63, and optionally, wherein the reference Rx data corresponding to the reference 1D Rx antenna sub-array comprises Rx data corresponding to the 1D Rx antenna sub-array in a previously processed frame of Rx data.

Example 65 includes the subject matter of any one of Examples 61-64, and optionally, wherein the radar processor is configured to set the initial covariance matrix for the adaptive BF algorithm based on a combination of a plurality of previously determined covariance matrices.

Example 66 includes the subject matter of any one of Examples 61-65, and optionally, wherein the radar processor is configured to determine the 2D AoA spectrum based on a first plurality of 1D AoA spectrums corresponding to a first dimension of the Azimuth-Elevation domain, and a second plurality of 1D AoA spectrums corresponding to a second dimension of the Azimuth-Elevation domain, wherein the radar processor is configured to determine the first plurality of 1D AoA spectrums based on radar Rx data corresponding to a respective plurality of first 1D Rx antenna sub-arrays in a first dimension of the 2D array, and to determine the second plurality of 1D AoA spectrums based on radar Rx data corresponding to a respective plurality of second 1D Rx antenna sub-arrays in a second dimension of the 2D array, wherein the radar processor is configured to determine a 1D AoA spectrum of the first plurality of 1D AoA spectrums by applying the adaptive BF algorithm to radar Rx data corresponding to a 1D Rx antenna sub-array of the plurality of first 1D Rx antenna sub-arrays, wherein the radar processor is configured to set the initial covariance matrix for the adaptive BF algorithm based on the previously determined covariance matrix, the previously determined covariance matrix based on a plurality of iterations of the adaptive BF algorithm with respect to reference Rx data corresponding to a reference 1D Rx antenna sub-array of the plurality of first 1D Rx antenna sub-arrays.

Example 67 includes the subject matter of Example 66, and optionally, wherein the radar processor is configured to determine a 1D AoA spectrum of the second plurality of 1D AoA spectrums by applying the adaptive BF algorithm with another initial covariance matrix to radar Rx data corresponding to a 1D Rx antenna sub-array of the plurality of second 1D Rx antenna sub-arrays, wherein the radar processor is configured to set the another initial covariance based on another previously determined covariance matrix, the another previously determined covariance matrix based on a plurality of iterations of the adaptive BF algorithm with respect to reference Rx data corresponding to a reference 1D Rx antenna sub-array of the plurality of second 1D Rx antenna sub-arrays.

Example 68 includes the subject matter of any one of Examples 61-67, and optionally, wherein the dimension of the Azimuth-Elevation domain is an Elevation dimension, and the plurality of 1D Rx antenna sub-arrays comprises a plurality of 1D Rx antenna columns in the 2D array.

Example 69 includes the subject matter of any one of Examples 61-67, and optionally, wherein the dimension of the Azimuth-Elevation domain is an Azimuth dimension, and the plurality of 1D Rx antenna sub-arrays comprises a plurality of 1D Rx antenna rows in the 2D array.

Example 70 includes the subject matter of any one of Examples 61-69, and optionally, wherein the adaptive BF algorithm comprises a super resolution spectrum analysis algorithm.

Example 71 includes the subject matter of any one of Examples 61-70, and optionally, wherein the adaptive BF algorithm comprises an Iterative Adaptive Approach (IAA) algorithm.

Example 72 includes the subject matter of any one of Examples 61-71, and optionally, wherein the initial covariance matrix for the adaptive BF algorithm is based on an inverse of the previously determined covariance matrix.

Example 73 includes the subject matter of any one of Examples 61-72, and optionally, comprising the MIMO radar antenna comprising the plurality of Rx antennas and a plurality of Transmit (Tx) antennas, and a plurality of Rx chains to generate the radar Rx data based on the radar signals received via the plurality of Rx antennas.

Example 74 includes an apparatus comprising a radar processor configured to determine radar data based on radar Receive (Rx) data, the radar Rx data based on radar signals received via a plurality of Rx antennas of a radar antenna, the radar data corresponding to a plurality of range-Doppler values on a range-Doppler map; and generate radar target information by processing the radar data according to a region-based mapping scheme, the region-based mapping scheme comprising a mapping between a plurality of range-Doppler regions on the Range-Doppler map and a plurality of radar processing algorithms, the region-based mapping scheme to define for a range-Doppler region at least one radar processing algorithm of the plurality of radar processing algorithms, wherein processing the radar data comprises processing radar data corresponding to range-Doppler values within the range-Doppler region according to the at least one radar processing algorithm defined for the range-Doppler region; and a memory to store data processed by the radar processor.

In one example, the apparatus of Example 74 may include, for example, one or more additional elements, and/or may perform one or more additional operations and/or functionalities, for example, as described with respect to Examples 1, 29, 39, and/or 61.

Example 75 includes the subject matter of Example 74, and optionally, wherein the region-based mapping scheme is to define a first radar processing algorithm for a first range-Doppler region, and to define a second radar processing algorithm for a second range-Doppler region, the second radar processing algorithm different from the first radar processing algorithm, wherein the radar processor is to process radar data corresponding to one or more range-Doppler values within the first range-Doppler region according to the first radar processing algorithm, and to process radar data corresponding to one or more range-Doppler values within the second range-Doppler region according to the second radar processing algorithm.

Example 76 includes the subject matter of Example 74 or 75, and optionally, wherein the region-based mapping scheme is to define a mapping of a static-object region to a radar processing algorithm configured for static objects.

Example 77 includes the subject matter of Example 76, and optionally, wherein the radar processing algorithm configured for static objects comprises a super-resolution algorithm.

Example 78 includes the subject matter of Example 76 or 77, and optionally, wherein the static-object region comprises range-Doppler values having a zero velocity.

Example 79 includes the subject matter of any one of Examples 74-78, and optionally, wherein the region-based mapping scheme is to define a mapping of a slow-moving-object region to a radar processing algorithm configured for slow-moving objects.

Example 80 includes the subject matter of Example 79, and optionally, wherein the radar processing algorithm configured for slow-moving objects comprises a hazard-detection algorithm.

Example 81 includes the subject matter of Example 79 or 80, and optionally, wherein the slow-moving-object region comprises range-Doppler values having a velocity below a predefined velocity threshold and a range below a predefined range threshold.

Example 82 includes the subject matter of any one of Examples 74-81, and optionally, wherein the region-based mapping scheme is to define a mapping of a fast-moving-close-range-object region to a radar processing algorithm configured for fast-moving close objects.

Example 83 includes the subject matter of Example 82, and optionally, wherein the radar processing algorithm configured for fast-moving close objects comprises a lane-assignment algorithm.

Example 84 includes the subject matter of Example 82 or 83, and optionally, wherein the fast-moving-close-range-object region comprises range-Doppler values having a velocity above a predefined velocity threshold and a range below a predefined close range threshold.

Example 85 includes the subject matter of any one of Examples 74-84, and optionally, wherein the region-based mapping scheme is to define a mapping of a fast-moving-far-range object region to a radar processing algorithm configured for fast-moving far objects.

Example 86 includes the subject matter of Example 85, and optionally, wherein the radar processing algorithm configured for the fast-moving far objects comprises a high-resolution algorithm.

Example 87 includes the subject matter of Example 85 or 86, and optionally, wherein the fast-moving-far-range-object region comprises range-Doppler values having a velocity above a predefined velocity threshold and a range above a predefined far range threshold.

Example 88 includes the subject matter of any one of Examples 74-87, and optionally, wherein the radar antenna comprises a Multiple-Input-Multiple-Output (MIMO) radar antenna comprising the plurality of Rx antennas and a plurality of Transmit (Tx) antennas, and a plurality of Rx chains to generate the radar Rx data based on the radar signals received via the plurality of Rx antennas.

Example 89 includes the subject matter of any one of Examples 1-88, and optionally, comprising a vehicle, the vehicle comprising a system controller to control one or more systems of the vehicle based on the radar information.

Example 90 includes an apparatus comprising means for executing any of the described operations of Examples 1-89.

Example 91 includes a machine-readable medium that stores instructions for execution by a processor to perform any of the described operations of Examples 1-89.

Example 92 includes an apparatus comprising a memory; and processing circuitry configured to perform any of the described operations of Examples 1-89.

Example 93 includes a method including any of the described operations of Examples 1-89.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:

an input to receive radar receive (Rx) data, the radar Rx data based on radar signals received via a plurality of Rx antennas of a Multiple-Input-Multiple-Output (MIMO) radar antenna; and a processor to generate radar information by applying an Iterative Adaptive Approach (IAA) algorithm to the radar Rx data, the IAA algorithm configured for a multi-path scenario, in which the radar signals comprise multipath signals from a plurality of paths between the MIMO antenna and a radar object, wherein the IAA algorithm is configured such that the radar information comprises an Angle of Arrival (AoA) spectrum having, for the radar object, no more than two amplitude peaks, which are above −20 Decibel (dB), corresponding to the multipath signals.

2. The apparatus of claim 1, wherein the no more than two amplitude peaks comprise a first amplitude peak corresponding to a direct path between the MIMO antenna and the radar object, and no more than a second amplitude peak corresponding to an indirect path between the MIMO antenna and the radar object.

3. The apparatus of claim 2, wherein the indirect path between the MIMO antenna and the radar object comprises a path from the MIMO radar antenna to the radar object via a reflector, and from the radar object to the MIMO radar antenna via the reflector.

4. The apparatus of claim 1, wherein the processor is configured to apply the IAA algorithm to the radar Rx data based on a steering matrix comprising a plurality of different-angle steering vectors, wherein a different-angle steering vector of the plurality of different-angle steering vectors comprises a steering vector corresponding to a different-angle Transmit (Tx)-Rx (Tx-Rx) angle combination comprising a combination of a Tx angle and an Rx angle, which is different from the Tx angle.

5. The apparatus of claim 4, wherein the steering matrix comprises a plurality of same-angle steering vectors corresponding to a respective plurality of angle values, wherein a same-angle steering vector corresponding to an angle value comprises a steering vector corresponding to a same-angle Tx-Rx combination comprising a combination of a Tx angle equal to the angle value and an Rx angle equal to the angle value.

6. The apparatus of claim 5, wherein the plurality of different-angle steering vectors correspond to a plurality of Tx-Rx angle combinations, respectively.

7. The apparatus of claim 6, wherein the processor is to select the plurality of Tx-Rx angle combinations from a plurality of possible Tx-Rx combinations, wherein the plurality of possible Tx-Rx combinations is based on the plurality of angle values.

8. The apparatus of claim 7, wherein the processor is configured to select the plurality of Tx-Rx angle combinations from the plurality of possible Tx-Rx combinations based on a one-dimensional beamforming algorithm applied to the radar Rx data.

9. The apparatus of claim 8, wherein the processor is configured to determine a one-dimensional beamforming AoA spectrum by applying the one-dimensional beamforming algorithm to the radar Rx data, to identify in the one-dimensional beamforming AoA spectrum a plurality of peaks above a predefined threshold, and to select the plurality of Tx-Rx angle combinations based on the plurality of peaks.

10. The apparatus of claim 9, wherein the processor is configured to select the plurality of Tx-Rx angle combinations based on the plurality of peaks and one or more points in the one-dimensional beamforming AoA spectrum corresponding to one or more peaks.

11. The apparatus of claim 9, wherein the predefined threshold is −20 dB.

12. The apparatus of claim 5, wherein the steering matrix comprises a first count, denoted K, of same-angle steering vectors, followed by a second count, denoted Ks, of different-angle steering vectors.

13. The apparatus of claim 12, wherein the processor configured to determine an IAA spectrum by applying the IAA algorithm to the radar Rx data based on the steering matrix, and to determine the AoA spectrum to include first K elements of the IAA spectrum.

14. The apparatus of claim 5, wherein the plurality of different-angle steering vectors corresponds to all possible Tx-Rx combinations based on the plurality of angle values.

15. The apparatus of claim 1 comprising the MIMO radar antenna, and a plurality of Physical layer (PHY) chains to generate the radar Rx data based on the radar signals received via the plurality of Rx antennas.

16. A vehicle comprising:

a system controller configured to control one or more vehicular systems of the vehicle based on radar information; and a radar device configured to provide the radar information to the system controller, the radar device comprising:

a Multiple-Input-Multiple-Output (MIMO) radar antenna comprising a plurality of Transmit (Tx) antennas to transmit radar Tx signals, and a plurality of Receive (Rx) antennas to receive radar Rx signals; and a processor to generate the radar information based on radar Rx data, the radar Rx data based on the radar Rx signals, wherein the processor is configured to:

generate processed radar data by applying an Iterative Adaptive Approach (IAA) algorithm to the radar Rx data, the IAA algorithm configured for a multi-path scenario, in which the radar Rx signals comprise multipath signals from a plurality of paths between the MIMO antenna and a radar object, wherein the IAA algorithm is configured such that the processed radar data comprises an Angle of Arrival (AoA) spectrum having, for the radar object, no more than two amplitude peaks, which are above −20 Decibel (dB), corresponding to the multipath signals, wherein the radar information is based on the processed radar data.

17. The vehicle of claim 16, wherein the no more than two amplitude peaks comprise a first amplitude peak corresponding to a direct path between the MIMO antenna and the radar object, and no more than a second amplitude peak corresponding to an indirect path between the MIMO antenna and the radar object.

18. A product comprising one or more tangible computer-readable non-transitory storage media comprising instructions operable to, when executed by at least one processor, enable the at least one processor to:

generate radar information by applying an Iterative Adaptive Approach (IAA) algorithm to radar receive (Rx) data, the radar Rx data based on radar signals received via a plurality of Rx antennas of a Multiple-Input-Multiple-Output (MIMO) radar antenna, the IAA algorithm configured for a multi-path scenario, in which the radar signals comprise multipath signals from a plurality of paths between the MIMO antenna and a radar object, wherein the IAA algorithm is configured such that the radar information comprises an Angle of Arrival (AoA) spectrum having, for the radar object, no more than two amplitude peaks, which are above −20 Decibel (dB), corresponding to the multipath signals; and provide an output based on the radar information.

19. The product of claim 18, wherein the no more than two amplitude peaks comprise a first amplitude peak corresponding to a direct path between the MIMO antenna and the radar object, and no more than a second amplitude peak corresponding to an indirect path between the MIMO antenna and the radar object.

20. The product of claim 18, wherein the instructions, when executed, cause the at least one processor to apply the IAA algorithm to the radar Rx data based on a steering matrix comprising a plurality of different-angle steering vectors, wherein a different-angle steering vector of the plurality of different-angle steering vectors comprises a steering vector corresponding to a different-angle Transmit (Tx)-Rx (Tx-Rx) angle combination comprising a combination of a Tx angle and an Rx angle, which is different from the Tx angle.

* * * * *